United States Patent
Lee

(10) Patent No.: US 12,382,083 B2
(45) Date of Patent: *Aug. 5, 2025

(54) IMAGE SIGNAL ENCODING/DECODING METHOD AND NON-TRANSITORY COMPUTER-READABLE MEDIUM

(71) Applicant: GUANGDONG OPPO MOBILE TELECOMMUNICATIONS CORP., LTD., Dongguan (CN)

(72) Inventor: Bae Keun Lee, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,824

(22) Filed: Jul. 10, 2023

(65) Prior Publication Data

US 2023/0421799 A1   Dec. 28, 2023

Related U.S. Application Data

(63) Continuation of application No. 17/541,922, filed on Dec. 3, 2021, now Pat. No. 11,758,176, which is a
(Continued)

(30) Foreign Application Priority Data

Sep. 21, 2018   (KR) .................. 10-2018-0114342
Sep. 21, 2018   (KR) .................. 10-2018-0114343
Sep. 21, 2018   (KR) .................. 10-2018-0114344

(51) Int. Cl.
*H04N 11/02*   (2006.01)
*H04N 19/176*   (2014.01)
*H04N 19/513*   (2014.01)

(52) U.S. Cl.
CPC .......... *H04N 19/513* (2014.11); *H04N 19/176* (2014.11)

(58) Field of Classification Search
CPC .................................................... H04N 19/513
(Continued)

(56) References Cited

U.S. PATENT DOCUMENTS 10,448,010 B2    10/2019   Chen et al.
10,462,488 B1 *  10/2019   Li .................. H04N 19/105
(Continued)

FOREIGN PATENT DOCUMENTS

CN    108432250 A    8/2018
EP    3806472 A1    4/2021
(Continued)

OTHER PUBLICATIONS

International Search Report in the international application No. PCT/KR2019/012290, mailed on Dec. 30, 2019.
(Continued)

*Primary Examiner* — Leron Beck
(74) *Attorney, Agent, or Firm* — BAYES PLLC

(57) ABSTRACT

An image decoding method according to the present disclosure comprises the steps of: generating a merge candidate list in a current block; specifying one of a plurality of merge candidates included in the merge candidate list; deriving a first affine seed vector and a second affine seed vector of the current block on the basis of a first affine seed vector and a second affine seed vector of the specified merge candidate; deriving an affine vector for a subblock in the current block, using the first affine seed vector and the second affine seed vector of the current block; and performing motion compensation prediction for the subblock on the basis of the affine vector.

9 Claims, 26 Drawing Sheets

Related U.S. Application Data continuation of application No. 17/204,306, filed on Mar. 17, 2021, now Pat. No. 11,223,845, which is a continuation of application No. PCT/KR2019/012290, filed on Sep. 20, 2019.

(58) Field of Classification Search
USPC .................................. 375/240.01–240.29
See application file for complete search history.

(56) References Cited

U.S. PATENT DOCUMENTS

| | | | |
|---|---|---|---|
| 2006/0083440 A1* | 4/2006 | Chen | H04N 23/698 382/284 |
| 2011/0242339 A1* | 10/2011 | Ogawa | H04N 23/6811 348/208.4 |
| 2013/0177072 A1 | 7/2013 | Shibahara et al. | |
| 2013/0266236 A1 | 10/2013 | Shibahara et al. | |
| 2015/0110177 A1 | 4/2015 | Shibahara et al. | |
| 2017/0347116 A1* | 11/2017 | Lin | H04N 19/157 |
| 2018/0098063 A1 | 4/2018 | Chen et al. | |
| 2018/0184126 A1* | 6/2018 | Zhang | H04N 19/157 |
| 2018/0192069 A1* | 7/2018 | Chen | H04N 19/176 |
| 2018/0270483 A1 | 9/2018 | Shibahara et al. | |
| 2018/0270500 A1* | 9/2018 | Li | H04N 19/52 |
| 2019/0037231 A1 | 1/2019 | Ikai | |
| 2019/0110064 A1* | 4/2019 | Zhang | H04N 19/54 |
| 2019/0238843 A1* | 8/2019 | Filippov | H04N 19/467 |
| 2019/0273943 A1* | 9/2019 | Zhao | H04N 19/139 |
| 2020/0007877 A1* | 1/2020 | Zhou | H04N 19/139 |
| 2021/0021809 A1* | 1/2021 | Kim | H04N 19/30 |

FOREIGN PATENT DOCUMENTS

| | | |
|---|---|---|
| EP | 3833021 A1 | 6/2021 |
| JP | 2019535192 A | 12/2019 |
| KR | 20140120253 A | 10/2014 |
| KR | 20180085526 A | 7/2018 |
| RU | 2607619 C2 | 1/2017 |
| WO | 2017130696 A1 | 8/2017 |
| WO | 2018061563 A1 | 4/2018 |
| WO | 2018135885 A1 | 7/2018 |
| WO | 2018155983 A1 | 8/2018 |

OTHER PUBLICATIONS

Yang H et al: "Description of Core Experiment 4 (CE4): Inter prediction and motion vector coding", 10. JVET Meeting; Oct. 4, 2018-Apr. 20, 2018; San Diego; (The Joint Video Exploration Team of ISO/IEC JTC1/SC29/ WG11 and ITU-T SG.16 ), May 28, 2018, 46 pages.

Zhou (Broadcom) M et al: "Non-CE4: A study on the affine merge mode", 11. JVET Meeting; Jul. 11, 2018-Jul. 18, 2018; Ljubljana; (The Joint Video Exploration Team of ISO/IEC JTC1/SC29/WG11 and ITU-T SG.16 ), Jul. 7, 2018, 10 pages.

Bordes P et al: "Description of SDR, HDR and 360° video coding technology proposal by Qualcomm and Technicolor—medium complexity version", 122. MPEG Meeting; Apr. 16, 2018-Apr. 20, 2018; San Diego; (Motion Picture Expert Group or ISO/IEC JTC1/SC29/WG11), Apr. 12, 2018, 83 pages.

Supplementary European Search Report in the European application No. 19861535.3, mailed on Jun. 4, 2021, 10 pages.
Written Opinion of the International Search Authority in the international application No. PCT/KR2019/012290, mailed on Dec. 30, 2019, 9 pages.
First Office Action of the U.S. Appl. No. 17/204,306, issued on May 25, 2021, 21 pages.
First Office Action of the European application No. 19861535.3, issued on Mar. 9, 2022, 6 pages.
Office Action of the Indian application No. 202117017761, issued on Feb. 21, 2022., 5 pages.
First Office Action of the Chilean application No. 202100671, issued on Jan. 20, 2022, 19 pages.
Second Office Action of the Chilean Application No. 202100671, issued on May 3, 2022, 19 pages.
First Office Action of the Canadian Application No. 3113054, issued on Apr. 13, 2022, 6 pages.
First Office Action of the Chinese application No. 202110443353.9, issued on Aug. 1, 2022.
Second Office Action of the European application No. 19861535.3, issued on Oct. 10, 2022.
Second Office Action of the Chinese application No. 202110443353.9, issued on Dec. 15, 2022.
First Office Action of the Russian application No. 2021110554, issued on Dec. 22, 2022.
Second Office Action of the Canadian application No. 3113054, issued on Jun. 8, 2023. 4 pages.
Non-Final Office Action of the U.S. Appl. No. 17/541,922, issued on Oct. 14, 2022. 20 pages.
First Office Action of the Mexican application No. MX/a/2021/003325, issued on Apr. 9, 2024, 9 pages with English translation.
First Office Action of the Vietnamese application No. 1-2021-01904, issued on Apr. 26, 2024, 4 pages with English translation.
Yang (Huawei) H et al: "Description of Core Experiment 4 (CE4): Inter prediction and motion vector coding", 11.JVET Meeting; Jul. 11, 2018-Jul. 18, 2018; Ljubljana; (The Joint Video Exploration Team of ISO/IEC JTC1/SC29/WG11 and ITU-T SG.16 ), No. JVET-K1024-v2, Aug. 9, 2018 (Aug. 9, 2018), XP030249799. p. 5, paragraph 1.3.4—p. 6, figure 3, 45 pages.
Supplementary European Search Report in the European application No. 23178535.3, mailed on Jul. 7, 2023. 11 pages.
Supplementary European Search Report in the European application No. 23178807.6, mailed on Jul. 7, 2023. 10 pages.
Supplementary European Search Report in the European application No. 23178805.0, mailed on Jul. 11, 2023. 8 pages.
Supplementary European Search Report in the European application No. 23178806.8, mailed on Jul. 11, 2023. 9 pages.
First Office Action of the Indonesian application No. P00202102761, issued on Jul. 13, 2023. 3 pages with English translation.
First Office Action of the Japanese application No. 2021-515161, issued on Sep. 22, 2023. 4 pages with English translation.
First Office Action of the Malaysian application No. PI2021001506, issued on Dec. 27, 2023, 3 pages.
Office Action of the Australian application No. 2019344978, issued on Mar. 15, 2024, 3 pages.
First Office Action of the Philippine application No. 12021550627, issued on Mar. 18, 2025, 9 pages.
First Office Action of the Korean application No. 10-2019-0116383, issued on Apr. 16, 2025, 14 pages pages with English translation.
First Office Action of the Australian application No. 2024227107, issued on Jun. 27, 2025, 3 pages.

\* cited by examiner

IMAGE SIGNAL ENCODING/DECODING METHOD AND NON-TRANSITORY COMPUTER-READABLE MEDIUM

CROSS-REFERENCE TO RELATED APPLICATIONS

The present disclosure is a continuation application of U.S. patent application Ser. No. 17/541,922, filed on Dec. 3, 2021, which is a continuation application of U.S. patent application Ser. No. 17/204,306, filed on Mar. 17, 2021, which is a continuation application of International Patent Application No. PCT/KR2019/012290, filed on Sep. 20, 2019, which claims priorities from Korean Patent Application No. 10-2018-0114342 filed on Sep. 21, 2018, Korean Patent Application No. 10-2018-0114343 filed on Sep. 21, 2018, and Korean Patent Application No. 10-2018-0114344 filed on Sep. 21, 2018, all of which are incorporated herein by reference in their entities.

TECHNICAL FIELD

The present disclosure relates to a video signal encoding and decoding method and an apparatus therefor.

BACKGROUND

As display panels are getting bigger and bigger, video services of further higher quality are required more and more. The biggest problem of high-definition video services is significant increase in data volume, and to solve this problem, studies for improving the video compression rate are actively conducted. As a representative example, the Motion Picture Experts Group (MPEG) and the Video Coding Experts Group (VCEG) under the International Telecommunication Union-Telecommunication (ITU-T) have formed the Joint Collaborative Team on Video Coding (JCT-VC) in 2009. The JCT-VC has proposed High Efficiency Video Coding (HEVC), which is a video compression standard having a compression performance about twice as high as the compression performance of H.264/AVC, and it is approved as a standard on Jan. 25, 2013. With rapid advancement in the high-definition video services, performance of the HEVC gradually reveals its limitations.

SUMMARY

An object of the present disclosure is to provide an inter prediction method using an affine model, and an apparatus for the same, in encoding/decoding a video signal.

Another object of the present disclosure is to provide a method of deriving an affine seed vector using a translational motion vector of a subblock, and an apparatus for performing the method, in encoding/decoding a video signal.

Another object of the present disclosure is to provide a method of deriving an affine seed vector by transforming a distance between a neighboring block and a current block to a power series of 2, and an apparatus for performing the method, in encoding/decoding a video signal.

The technical problems to be achieved in the present disclosure are not limited to the technical problems mentioned above, and unmentioned other problems may be clearly understood by those skilled in the art from the following description.

A method of decoding and encoding a video signal according to the present disclosure includes the steps of: generating a merge candidate list for a current block; specifying one among a plurality of merge candidates included in the merge candidate list; deriving a first affine seed vector and a second affine seed vector of the current block based on a first affine seed vector and a second affine seed vector of the specified merge candidate; deriving an affine vector for a subblock in the current block by using the first affine seed vector and the second affine seed vector of the current block; and when the neighboring block is included in a coding tree unit different from a coding tree unit of the current block, the first affine seed vector and the second affine seed vector of the merge candidate may be derived based on motion vectors of a bottom-left subblock and a bottom-right subblock of the neighboring block. At this point, the subblock is a region of a size smaller than that of the current block. In addition, the first affine seed vector and the second affine seed vector of the merge candidate may be derived based on motion information of a neighboring block adjacent to the current block.

Features briefly summarized above with respect to the present disclosure are merely exemplary aspects of the detailed description of the present disclosure that will be described below, and do not limit the scope of the present disclosure.

According to the present disclosure, there is an effect of improving prediction efficiency through an inter prediction method using an affine model.

According to the present disclosure, there is an effect of improving encoding efficiency by deriving an affine seed vector using a translational motion vector of a subblock.

According to the present disclosure, there is an effect of improving encoding efficiency by deriving an affine seed vector by transforming a distance between a neighboring block and a current block to a power series of 2.

The effects that can be obtained from the present disclosure are not limited to the effects mentioned above, and unmentioned other effects may be clearly understood by those skilled in the art from the following description.

DETAILED DESCRIPTION

Hereafter, an embodiment of the present disclosure will be described in detail with reference to the accompanying drawings.

Encoding and decoding of a video is performed by the unit of block. For example, an encoding/decoding process such as transform, quantization, prediction, in-loop filtering, reconstruction or the like may be performed on a coding block, a transform block, or a prediction block.

Hereinafter, a block to be encoded/decoded will be referred to as a 'current block'. For example, the current block may represent a coding block, a transform block or a prediction block according to a current encoding/decoding process step.

In addition, it may be understood that the term 'unit' used in this specification indicates a basic unit for performing a specific encoding/decoding process, and the term 'block' indicates a sample array of a predetermined size. Unless otherwise stated, the 'block' and 'unit' may be used to have the same meaning. For example, in an embodiment described below, it may be understood that a coding block and a coding unit have the same meaning.

Figure 1:
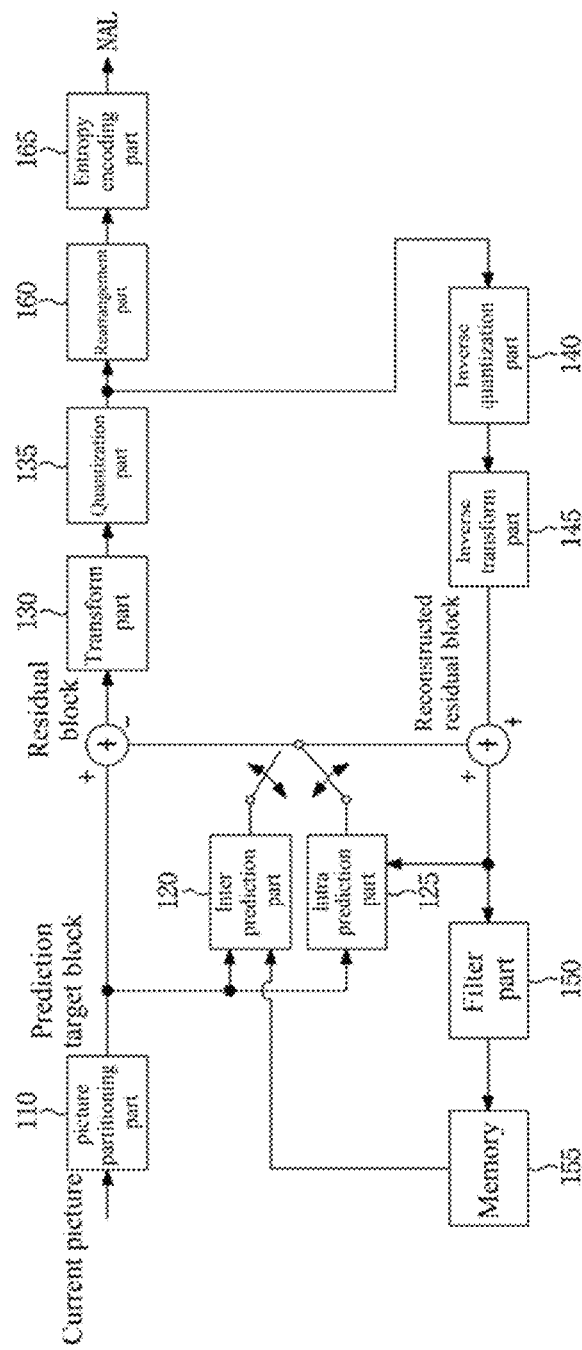
FIG. 1 is a block diagram showing a video encoder according to an embodiment of the present disclosure.

FIG. 1 is a block diagram showing a video encoder according to an embodiment of the present disclosure.

Referring to FIG. 1, a video encoding apparatus 100 may include a picture partitioning part 110, a prediction part 120 and 125, a transform part 130, a quantization part 135, a rearrangement part 160, an entropy coding part 165, an inverse quantization part 140, an inverse transform part 145, a filter part 150, and a memory 155.

Each of the components shown in FIG. 1 is independently shown to represent characteristic functions different from each other in a video encoding apparatus, and it does not mean that each component is formed by the configuration unit of separate hardware or single software. That is, each component is included to be listed as a component for convenience of explanation, and at least two of the components may be combined to form a single component, or one component may be divided into a plurality of components to perform a function. Integrated embodiments and separate embodiments of the components are also included in the scope of the present disclosure if they do not depart from the essence of the present disclosure.

In addition, some of the components are not essential components that perform essential functions in the present disclosure, but may be optional components only for improving performance. The present disclosure can be implemented by including only components essential to implement the essence of the present disclosure excluding components used for improving performance, and a structure including only the essential components excluding the optional components used for improving performance is also included in the scope of the present disclosure.

The picture partitioning part 110 may partition an input picture into at least one processing unit. At this point, the processing unit may be a prediction unit (PU), a transform unit (TU), or a coding unit (CU). The picture partitioning part 110 may partition a picture into a combination of a plurality of coding units, prediction units, and transform units, and encode a picture by selecting a combination of a coding unit, a prediction unit, and a transform unit based on a predetermined criterion (e.g., a cost function).

For example, one picture may be partitioned into a plurality of coding units. In order to partition the coding units in a picture, a recursive tree structure such as a quad tree structure may be used. A coding unit partitioned in different coding units using a video or the largest coding unit as a root may be partitioned to have as many child nodes as the number of partitioned coding units. A coding unit that is not partitioned any more according to a predetermined restriction become a leaf node. That is, when it is assumed that only square partitioning is possible for one coding unit, the one coding unit may be partitioned into up to four different coding units.

Hereinafter, in an embodiment of the present disclosure, the coding unit may be used as a meaning of a unit performing encoding or a meaning of a unit performing decoding.

The prediction unit may be one that is partitioned in a shape of at least one square, rectangle or the like of the same size within one coding unit, or it may be any one prediction unit, among the prediction units partitioned within one coding unit, that is partitioned to have a shape and/or size different from those of another prediction unit.

If the coding unit is not a smallest coding unit when a prediction unit that performs intra prediction based on the coding unit is generated, intra prediction may be performed without partitioning a picture into a plurality of prediction units N×N.

The prediction part 120 and 125 may include an inter prediction part 120 that performs inter prediction and an intra prediction part 125 that performs intra prediction. It may be determined whether to use inter prediction or to perform intra prediction for a prediction unit, and determine specific information (e.g., intra prediction mode, motion vector, reference picture, etc.) according to each prediction method. At this point, a processing unit for performing prediction may be different from a processing unit for determining a prediction method and specific content. For example, a prediction method and a prediction mode may be determined in a prediction unit, and prediction may be performed in a transform unit. A residual coefficient (residual block) between the generated prediction block and the original block may be input into the transform part 130. In addition, prediction mode information, motion vector information and the like used for prediction may be encoded by the entropy coding part 165 together with the residual coefficient and transferred to a decoder. When a specific encoding mode is used, an original block may be encoded as it is and transmitted to a decoder without generating a prediction block through the prediction part 120 and 125.

The inter prediction part 120 may predict a prediction unit based on information on at least one picture among pictures before or after the current picture, and in some cases, it may predict a prediction unit based on information on a partial area that has been encoded in the current picture. The inter prediction part 120 may include a reference picture interpolation part, a motion prediction part, and a motion compensation part.

The reference picture interpolation part may receive reference picture information from the memory 155 and generate pixel information of an integer number of pixels or less from the reference picture. In the case of a luminance pixel, a DCT-based 8-tap interpolation filter with a varying filter coefficient may be used to generate pixel information of an integer number of pixels or less by the unit of ¼ pixels. In the case of a color difference signal, a DCT-based 4-tap interpolation filter with a varying filter coefficient may be used to generate pixel information of an integer number of pixels or less by the unit of ⅛ pixels.

The motion prediction part may perform motion prediction based on the reference picture interpolated by the reference picture interpolation part. Various methods such as a full search-based block matching algorithm (FBMA), a three-step search (TSS), and a new three-step search algorithm (NTS) may be used as a method of calculating a motion vector. The motion vector may have a motion vector value of a unit of ½ or ¼ pixels based on interpolated pixels. The motion prediction part may predict a current prediction unit by varying the motion prediction method. Various methods such as a skip method, a merge method, an advanced motion vector prediction (AMVP) method, an intra-block copy method and the like may be used as the motion prediction method.

The intra prediction part 125 may generate a prediction unit based on the information on reference pixels around the current block, which is pixel information in the current picture. When a block in the neighborhood of the current prediction unit is a block on which inter prediction has been performed and thus the reference pixel is a pixel on which inter prediction has been performed, the reference pixel included in the block on which inter prediction has been performed may be used in place of reference pixel information of a block in the neighborhood on which intra prediction has been performed. That is, when a reference pixel is unavailable, at least one reference pixel among available reference pixels may be used in place of unavailable reference pixel information.

In the intra prediction, the prediction mode may have an angular prediction mode that uses reference pixel information according to a prediction direction, and a non-angular prediction mode that does not use directional information when performing prediction. A mode for predicting luminance information may be different from a mode for predicting color difference information, and intra prediction mode information used to predict luminance information or predicted luminance signal information may be used to predict the color difference information.

If the size of the prediction unit is the same as the size of the transform unit when intra prediction is performed, the intra prediction may be performed for the prediction unit based on a pixel on the left side, a pixel on the top-left side, and a pixel on the top of the prediction unit. However, if the size of the prediction unit is different from the size of the transform unit when the intra prediction is performed, the intra prediction may be performed using a reference pixel based on the transform unit. In addition, intra prediction using N×N partitioning may be used only for the smallest coding unit.

The intra prediction method may generate a prediction block after applying an Adaptive Intra Smoothing (AIS) filter to the reference pixel according to a prediction mode. The type of the AIS filter applied to the reference pixel may vary. In order to perform the intra prediction method, the intra prediction mode of the current prediction unit may be predicted from the intra prediction mode of the prediction unit existing in the neighborhood of the current prediction unit. When a prediction mode of the current prediction unit is predicted using the mode information predicted from the neighboring prediction unit, if the intra prediction modes of the current prediction unit is the same as the prediction unit in the neighborhood, information indicating that the prediction modes of the current prediction unit is the same as the prediction unit in the neighborhood may be transmitted using predetermined flag information, and if the prediction modes of the current prediction unit and the prediction unit in the neighborhood are different from each other, prediction mode information of the current block may be encoded by performing entropy coding.

In addition, a residual block including a prediction unit that has performed prediction based on the prediction unit generated by the prediction part 120 and 125 and residual coefficient information, which is a difference value of the prediction unit with the original block, may be generated. The generated residual block may be input into the transform part 130.

The transform part 130 may transform the residual block including the original block and the residual coefficient information of the prediction unit generated through the prediction part 120 and 125 using a transform method such as Discrete Cosine Transform (DCT), Discrete Sine Transform (DST), or transform skip. Whether to apply the DCT, the DST or the KLT to transform the residual block may be determined based on intra prediction mode information of a prediction unit used to generate the residual block.

The quantization part 135 may quantize values transformed into the frequency domain by the transform part 130. Quantization coefficients may vary according to the block or the importance of a video. A value calculated by the quantization part 135 may be provided to the inverse quantization part 140 and the rearrangement part 160.

The rearrangement part 160 may rearrange coefficient values for the quantized residual coefficients.

The rearrangement part 160 may change coefficients of a two-dimensional block shape into a one-dimensional vector shape through a coefficient scanning method. For example, the rearrangement part 160 may scan DC coefficients up to high-frequency domain coefficients using a zig-zag scan method, and change the coefficients into a one-dimensional vector shape. According to the size of the transform unit and the intra prediction mode, a vertical scan of scanning the coefficients of a two-dimensional block shape in the column direction and a horizontal scan of scanning the coefficients of a two-dimensional block shape in the row direction may be used instead of the zig-zag scan. That is, according to the size of the transform unit and the intra prediction mode, a scan method that will be used may be determined among the zig-zag scan, the vertical direction scan, and the horizontal direction scan.

The entropy coding part 165 may perform entropy coding based on values calculated by the rearrangement part 160. Entropy coding may use various encoding methods such as Exponential Golomb, Context-Adaptive Variable Length Coding (CAVLC), Context-Adaptive Binary Arithmetic Coding (CABAC), and the like.

The entropy coding part 165 may encode various information such as residual coefficient information and block type information of a coding unit, prediction mode information, partitioning unit information, prediction unit information and transmission unit information, motion vector information, reference frame information, block interpolation information, and filtering information input from the rearrangement part 160 and the prediction parts 120 and 125.

The entropy coding part 165 may entropy-encode the coefficient value of a coding unit input from the rearrangement part 160.

The inverse quantization part 140 and the inverse transform part 145 inverse-quantize the values quantized by the quantization part 135 and inverse-transform the values transformed by the transform part 130. The residual coefficient generated by the inverse quantization part 140 and the inverse transform part 145 may be combined with the prediction unit predicted through a motion estimation part, a motion compensation part, and an intra prediction part included in the prediction part 120 and 125 to generate a reconstructed block.

The filter part 150 may include at least one among a deblocking filter, an offset correction unit, and an adaptive loop filter (ALF).

The deblocking filter may remove block distortion generated by the boundary between blocks in the reconstructed picture. In order to determine whether or not to perform deblocking, whether or not to apply the deblocking filter to the current block may be determined based on the pixels included in several columns or rows included in the block. A strong filter or a weak filter may be applied according to the deblocking filtering strength needed when the deblocking filter is applied to a block. In addition, when vertical direction filtering and horizontal direction filtering are performed in applying the deblocking filter, horizontal direction filtering and vertical direction filtering may be processed in parallel.

The offset correction unit may correct an offset to the original video by the unit of pixel for a video on which the deblocking has been performed. In order to perform offset correction for a specific picture, it is possible to use a method of dividing pixels included in the video into a certain number of areas, determining an area to perform offset, and applying the offset to the area, or a method of applying an offset considering edge information of each pixel.

Adaptive Loop Filtering (ALF) may be performed based on a value obtained by comparing the reconstructed and filtered video and the original video. After dividing the pixels included in the video into predetermined groups, one filter to be applied to a corresponding group may be determined, and filtering may be performed differently for each group. A luminance signal, which is the information related to whether or not to apply ALF, may be transmitted for each coding unit (CU), and the shape and filter coefficient of an ALF filter to be applied may vary according to each block. In addition, an ALF filter of the same type (fixed type) may be applied regardless of the characteristic of a block to be applied.

The memory 155 may store the reconstructed block or picture calculated through the filter part 150, and the reconstructed and stored block or picture may be provided to the prediction part 120 and 125 when inter prediction is performed.

Figure 2:
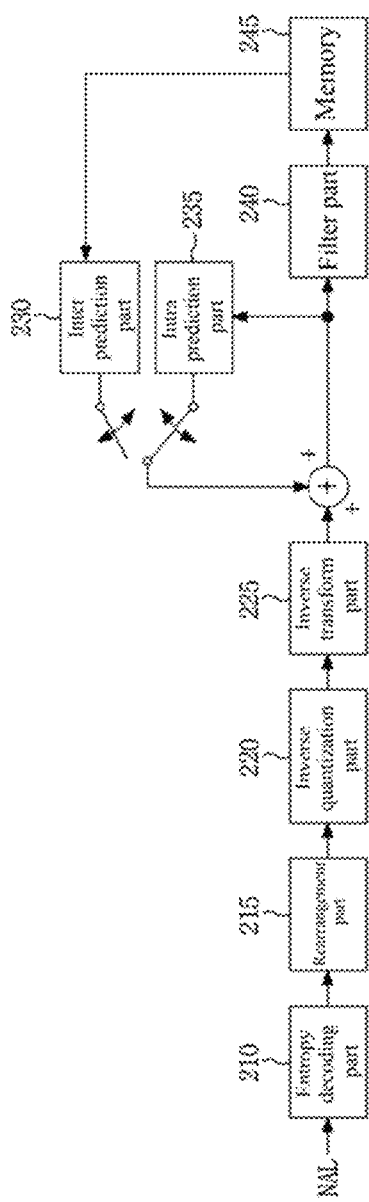
FIG. 2 is a block diagram showing a video decoder according to an embodiment of the present disclosure.

FIG. 2 is a block diagram showing a video decoder according to an embodiment of the present disclosure.

Referring to FIG. 2, a video decoder 200 may include an entropy decoding part 210, a rearrangement part 215, an inverse quantization part 220, an inverse transform part 225, a prediction part 230 and 235, a filter part 240, and a memory 245.

When a video bitstream is input from a video encoder, the input bitstream may be decoded in a procedure opposite to that of the video encoder.

The entropy decoding part 210 may perform entropy decoding in a procedure opposite to that of performing entropy coding in the entropy decoding part of the video encoder. For example, various methods corresponding to the method performed by the video encoder, such as Exponential Golomb, Context-Adaptive Variable Length Coding (CAVLC), and Context-Adaptive Binary Arithmetic Coding (CABAC), may be applied.

The entropy decoding part 210 may decode information related to intra prediction and inter prediction performed by the encoder.

The rearrangement part 215 may perform rearrangement on the bitstream entropy-decoded by the entropy decoding part 210 based on the rearrangement method performed by the encoder. The coefficients expressed in a one-dimensional vector shape may be reconstructed and rearranged as coefficients of two-dimensional block shape. The rearrangement part 215 may receive information related to coefficient scanning performed by the encoding part and perform reconstruction through a method of inverse-scanning based on the scanning order performed by the corresponding encoding part.

The inverse quantization part 220 may perform inverse quantization based on a quantization parameter provided by the encoder and a coefficient value of the rearranged block.

The inverse transform part 225 may perform inverse transform, i.e., inverse DCT, inverse DST, or inverse KLT, for the transform, i.e., DCT, DST, or KLT, performed by the transform part on a result of the quantization performed by the video encoder. The inverse transform may be performed based on a transmission unit determined by the video encoder. The inverse transform part 225 of the video decoder may selectively perform a transform technique (e.g., DCT, DST, KLT) according to a plurality of pieces of information such as a prediction method, a size of a current block, a prediction direction and the like.

The prediction part 230 and 235 may generate a prediction block based on information related to generation of a prediction block provided by the entropy decoder 210 and information on a previously decoded block or picture provided by the memory 245.

As described above, if the size of the prediction unit and the size of the transform unit are the same when intra prediction is performed in the same manner as the operation of the video encoder, intra prediction is performed on the prediction unit based on the pixel existing on the left side, the pixel on the top-left side, and the pixel on the top of the prediction unit. However, if the size of the prediction unit and the size of the transform unit are different when intra prediction is performed, intra prediction may be performed using a reference pixel based on a transform unit. In addition, intra prediction using N×N partitioning may be used only for the smallest coding unit.

The prediction part 230 and 235 may include a prediction unit determination part, an inter prediction part, and an intra prediction part. The prediction unit determination part may receive various information such as prediction unit information input from the entropy decoding part 210, prediction mode information of the intra prediction method, information related to motion prediction of an inter prediction method, and the like, identify the prediction unit from the current coding unit, and determine whether the prediction unit performs inter prediction or intra prediction. The inter prediction part 230 may perform inter prediction on the current prediction unit based on information included in at least one picture among pictures before or after the current picture including the current prediction unit by using information necessary for inter prediction of the current prediction unit provided by the video encoder. Alternatively, the inter prediction part 230 may perform inter prediction based on information on a partial area previously reconstructed in the current picture including the current prediction unit.

In order to perform inter prediction, it may be determined, based on the coding unit, whether the motion prediction method of the prediction unit included in a corresponding coding unit is a skip mode, a merge mode, a motion vector prediction mode (AMVP mode), or an intra-block copy mode.

The intra prediction part 235 may generate a prediction block based on the information on the pixel in the current picture. When the prediction unit is a prediction unit that has performed intra prediction, the intra prediction may be performed based on intra prediction mode information of the prediction unit provided by the video encoder. The intra prediction part 235 may include an Adaptive Intra Smoothing (AIS) filter, a reference pixel interpolation part, and a DC filter. The AIS filter is a part that performs filtering on the reference pixel of the current block, and may determine whether or not to apply the filter according to the prediction mode of the current prediction unit and apply the filter. AIS filtering may be performed on the reference pixel of the current block by using the prediction mode and AIS filter information of the prediction unit provided by the video encoder. When the prediction mode of the current block is a mode that does not perform AIS filtering, the AIS filter may not be applied.

When the prediction mode of the prediction unit is a prediction unit that performs intra prediction based on a pixel value obtained by interpolating the reference pixel, the reference pixel interpolation part may generate a reference pixel of a pixel unit having an integer value or less by interpolating the reference pixel. When the prediction mode of the current prediction unit is a prediction mode that generates a prediction block without interpolating the reference pixel, the reference pixel may not be interpolated. The DC filter may generate a prediction block through filtering when the prediction mode of the current block is the DC mode.

The reconstructed block or picture may be provided to the filter part 240. The filter part 240 may include a deblocking filter, an offset correction unit, and an ALF.

Information on whether a deblocking filter is applied to a corresponding block or picture and information on whether a strong filter or a weak filter is applied when a deblocking filter is applied may be provided by the video encoder. The deblocking filter of the video decoder may be provided with information related to the deblocking filter provided by the video encoder, and the video decoder may perform deblocking filtering on a corresponding block.

The offset correction unit may perform offset correction on the reconstructed video based on the offset correction type and offset value information applied to the video when encoding is performed.

The ALF may be applied to a coding unit based on information on whether or not to apply the ALF and information on ALF coefficients provided by the encoder. The ALF information may be provided to be included in a specific parameter set.

The memory 245 may store the reconstructed picture or block and use it as a reference picture or a reference block and may provide the reconstructed picture to an output unit.

Figure 3:
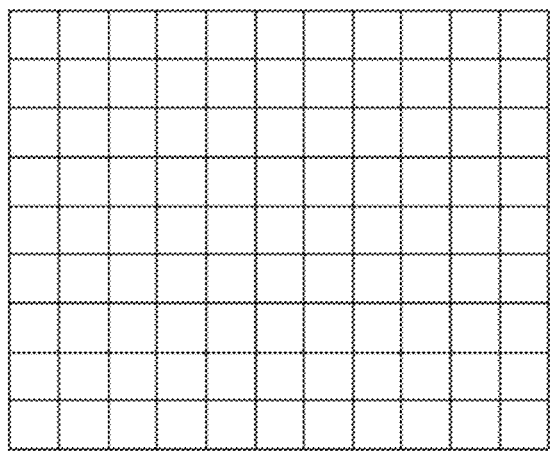
FIG. 3 is a view showing a basic coding tree unit according to an embodiment of the present disclosure.

FIG. 3 is a view showing a basic coding tree unit according to an embodiment of the present disclosure.

A coding block of a maximum size may be defined as a coding tree block. A picture is partitioned into a plurality of coding tree units (CTUs). The coding tree unit is a coding unit having a maximum size and may be referred to as a Large Coding Unit (LCU). FIG. 3 shows an example in which a picture is partitioned into a plurality of coding tree units.

The size of the coding tree unit may be defined at a picture level or a sequence level. To this end, information indicating the size of the coding tree unit may be signaled through a picture parameter set or a sequence parameter set.

For example, the size of the coding tree unit for the entire picture in a sequence may be set to 128×128. Alternatively, at the picture level, any one among 128×128 and 256×256 may be determined as the size of the coding tree unit. For example, the size of the coding tree unit may be set to 128×128 in a first picture, and the size of the coding tree unit may be set to 256×256 in a second picture.

Coding blocks may be generated by partitioning a coding tree unit. The coding block indicates a basic unit for performing encoding/decoding. For example, prediction or transform may be performed for each coding block, or a prediction encoding mode may be determined for each coding block. Here, the prediction encoding mode indicates a method of generating a prediction video. For example, the prediction encoding mode may include prediction within a screen (intra prediction), prediction between screens (inter prediction), current picture referencing (CPR) or intra-block copy (IBC), or combined prediction. For the coding block, a prediction block may be generated by using at least one prediction encoding mode among the intra prediction, the inter prediction, the current picture referencing, and the combined prediction.

Information indicating the prediction encoding mode of the current block may be signaled through a bitstream. For example, the information may be a 1-bit flag indicating whether the prediction encoding mode is an intra mode or an inter mode. Only when the prediction encoding mode of the current block is determined as the inter mode, the current picture referencing or the combined prediction may be used.

The current picture reference is for setting the current picture as a reference picture and obtaining a prediction block of the current block from an area that has already been encoded/decoded in the current picture. Here, the current picture means a picture including the current block. Information indicating whether the current picture reference is applied to the current block may be signaled through a bitstream. For example, the information may be a 1-bit flag. When the flag is true, the prediction encoding mode of the current block may be determined as the current picture reference, and when the flag is false, the prediction mode of the current block may be determined as inter prediction.

Alternatively, the prediction encoding mode of the current block may be determined based on a reference picture index. For example, when the reference picture index indicates the current picture, the prediction encoding mode of the current block may be determined as the current picture reference. When the reference picture index indicates a picture other than the current picture, the prediction encoding mode of the current block may be determined as inter prediction. That is, the current picture reference is a prediction method using information on an area in which encoding/decoding has been completed in the current picture, and inter prediction is a prediction method using information on another picture in which the encoding/decoding has been completed.

The combined prediction represents an encoding mode in which two or more among the intra prediction, the inter prediction, and the current picture referencing are combined. For example, when the combined prediction is applied, a first prediction block may be generated based on one among the intra prediction, the inter prediction, and the current picture referencing, and a second prediction block may be generated based on another one. When the first prediction block and the second prediction block are generated, a final prediction block may be generated through an average operation or a weighted sum operation of the first prediction block and the second prediction block. Information indicating whether or not the combined prediction is applied may be signaled through a bitstream. The information may be a 1-bit flag.

Figure 4:
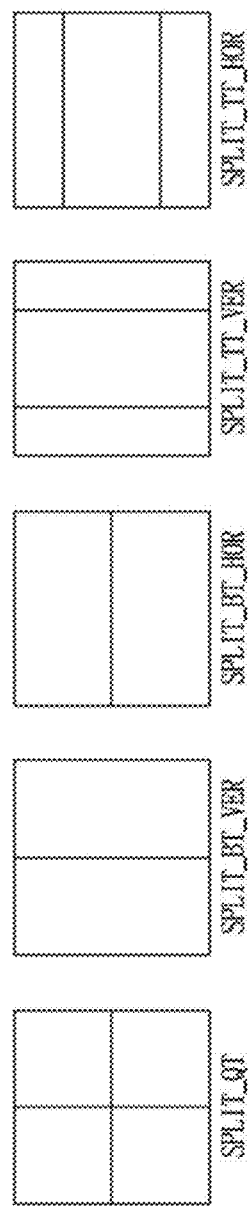
FIG. 4 is a view showing various partition types of a coding block.

FIG. 4 is a view showing various partition types of a coding block.

The coding block may be partitioned into a plurality of coding blocks based on quad tree partitioning, binary tree partitioning, or triple tree partitioning. The partitioned coding block may be partitioned again into a plurality of coding blocks based on the quad tree partitioning, the binary tree partitioning, or the triple tree partitioning.

The quad tree partitioning refers to a partitioning technique that partitions a current block into four blocks. As a result of the quad tree partitioning, the current block may be partitioned into four square-shaped partitions (see 'SPLIT_QT' of FIG. 4 (a)).

The binary tree partitioning refers to a partitioning technique that partitions a current block into two blocks. Partitioning a current block into two blocks along the vertical direction (i.e., using a vertical line crossing the current block) may be referred to as vertical direction binary tree partitioning, and partitioning a current block into two blocks along the horizontal direction (i.e., using a horizontal line crossing the current block) may be referred to as horizontal direction binary tree partitioning. As a result of the binary tree partitioning, the current block may be partitioned into two non-square shaped partitions. 'SPLIT_BT_VER' of FIG. 4 (b) shows a result of the vertical direction binary tree partitioning, and 'SPLIT_BT_HOR' of FIG. 4 (c) shows a result of the horizontal direction binary tree partitioning.

The triple tree partitioning refers to a partitioning technique that partitions a current block into three blocks. Partitioning a current block into three blocks along the vertical direction (i.e., using two vertical lines crossing the current block) may be referred to as vertical direction triple tree partitioning, and partitioning a current block into three blocks along the horizontal direction (i.e., using two horizontal lines crossing the current block) may be referred to as horizontal direction triple tree partitioning. As a result of the triple tree partitioning, the current block may be partitioned into three non-square shaped partitions. At this point, the width/height of a partition positioned at the center of the current block may be twice as large as the width/height of the other partitions. 'SPLIT_TT_VER' of FIG. 4 (d) shows a result of the vertical direction triple tree partitioning, and 'SPLIT_TT_HOR' of FIG. 4 (e) shows a result of the horizontal direction triple tree partitioning.

The number of times of partitioning a coding tree unit may be defined as a partitioning depth. The maximum partitioning depth of a coding tree unit may be determined at the sequence or picture level. Accordingly, the maximum partitioning depth of a coding tree unit may be different for each sequence or picture.

Alternatively, the maximum partitioning depth for each partitioning technique may be individually determined. For example, the maximum partitioning depth allowed for the quad tree partitioning may be different from the maximum partitioning depth allowed for the binary tree partitioning and/or the triple tree partitioning.

The encoder may signal information indicating at least one among the partitioning type and the partitioning depth of the current block through a bitstream. The decoder may determine the partitioning type and the partitioning depth of a coding tree unit based on the information parsed from the bitstream.

Figure 5:
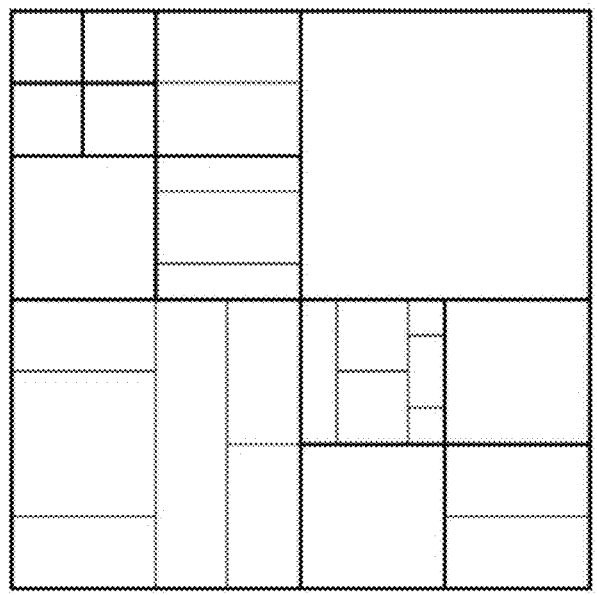
FIG. 5 is a view showing a partitioning pattern of a coding tree unit.

FIG. 5 is a view showing a partitioning pattern of a coding tree unit.

Partitioning a coding block using a partitioning technique such as quad tree partitioning, binary tree partitioning, and/or triple tree partitioning may be referred to as multi-tree partitioning.

Coding blocks generated by applying the multi-tree partitioning to a coding block may be referred to as lower coding blocks. When the partitioning depth of a coding block is k, the partitioning depth of the lower coding blocks is set to k+1.

Contrarily, for coding blocks having a partitioning depth of k+1, a coding block having a partitioning depth of k may be referred to as an upper coding block.

The partitioning type of the current coding block may be determined based on at least one among a partitioning type of an upper coding block and a partitioning type of a neighboring coding block. Here, the neighboring coding block is a coding block adjacent to the current coding block and may include at least one among a top neighboring block and a left neighboring block of the current coding block, and a neighboring block adjacent to the top-left corner. Here, the partitioning type may include at least one among whether or not a quad tree partitioning, whether or not a binary tree partitioning, binary tree partitioning direction, whether or not a triple tree partitioning, and triple tree partitioning direction.

In order to determine a partitioning type of a coding block, information indicating whether or not the coding block can be partitioned may be signaled through a bitstream. The information is a 1-bit flag of 'split_cu_flag', and when the flag is true, it indicates that the coding block is partitioned by a head (→quad) tree partitioning technique.

When split_cu_flag is true, information indicating whether the coding block is quad-tree partitioned may be signaled through a bitstream. The information is a 1-bit flag of split_qt_flag, and when the flag is true, the coding block may be partitioned into four blocks.

For example, in the example shown in FIG. 5, as a coding tree unit is quad-tree partitioned, four coding blocks having a partitioning depth of 1 are generated. In addition, it is shown that quad tree partitioning is applied again to the first and fourth coding blocks among the four coding blocks generated as a result of the quad tree partitioning. As a result, four coding blocks having a partitioning depth of 2 may be generated.

In addition, coding blocks having a partitioning depth of 3 may be generated by applying the quad tree partitioning again to a coding block having a partitioning depth of 2.

When quad tree partitioning is not applied to the coding block, whether binary tree partitioning or triple tree partitioning is performed on the coding block may be determined considering at least one among the size of the coding block, whether the coding block is positioned at the picture boundary, the maximum partitioning depth, and the partitioning type of a neighboring block. When it is determined to perform binary tree partitioning or triple tree partitioning on the coding block, information indicating the partitioning direction may be signaled through a bitstream. The information may be a 1-bit flag of mtt_split_cu_vertical_flag. Based on the flag, whether the partitioning direction is a vertical direction or a horizontal direction may be determined. Additionally, information indicating whether binary tree partitioning or triple tree partitioning is applied to the coding block may be signaled through a bitstream. The information may be a 1-bit flag of mtt_split_cu_binary_flag. Based on the flag, whether binary tree partitioning or triple tree partitioning is applied to the coding block may be determined.

For example, in the example shown in FIG. 5, it is shown that vertical direction binary tree partitioning is applied to a coding block having a partitioning depth of 1, vertical direction triple tree partitioning is applied to the left-side coding block among the coding blocks generated as a result of the partitioning, and vertical direction binary tree partitioning is applied to the right-side coding block.

Inter prediction is a prediction encoding mode that predicts a current block by using information of the previous picture. For example, a block at the same position as the current block in the previous picture (hereinafter, a collocated block) may be set as the prediction block of the current block. Hereinafter, a prediction block generated based on a block at the same position as the current block will be referred to as a collocated prediction block.

On the other hand, when an object existing in the previous picture has moved to another position in the current picture, the current block may be effectively predicted by using a motion of the object. For example, when the moving direction and the size of an object can be known by comparing the previous picture and the current picture, a prediction block (or a prediction video) of the current block may be generated considering motion information of the object. Hereinafter, the prediction block generated using motion information may be referred to as a motion prediction block.

A residual block may be generated by subtracting the prediction block from the current block. At this point, when there is a motion of an object, the energy of the residual block may be reduced by using the motion prediction block instead of the collocated prediction block, and therefore, compression performance of the residual block can be improved.

As described above, generating a prediction block by using motion information may be referred to as motion compensation prediction. In most inter prediction, a prediction block may be generated based on the motion compensation prediction.

The motion information may include at least one among a motion vector, a reference picture index, a prediction direction, and a bidirectional weight index. The motion vector represents the moving direction and the size of an object. The reference picture index specifies a reference picture of the current block among reference pictures included in a reference picture list. The prediction direction indicates any one among unidirectional L0 prediction, unidirectional L1 prediction, and bidirectional prediction (L0 prediction and L1 prediction). According to the prediction direction of the current block, at least one among motion information in the L0 direction and motion information in the L1 direction may be used. The bidirectional weight index specifies a weighting value applied to a L0 prediction block and a weighting value applied to a L1 prediction block.

Figure 6:
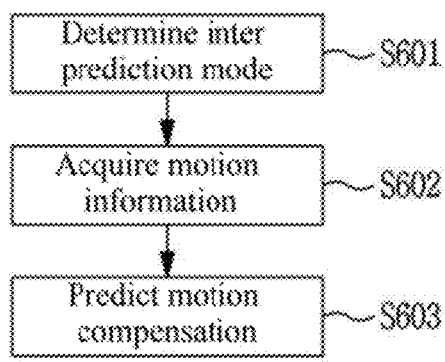
FIG. 6 is a flowchart illustrating an inter prediction method according to an embodiment of the present disclosure.

FIG. 6 is a flowchart illustrating an inter prediction method according to an embodiment of the present disclosure.

Referring to FIG. 6, the inter prediction method includes the steps of determining an inter prediction mode of a current block (S601), acquiring motion information of the current block according to the determined inter prediction mode (S602), and performing motion compensation prediction for the current block based on the acquired motion information (S603).

Here, the inter prediction mode represents various techniques for determining motion information of the current block, and may include an inter prediction mode that uses translational motion information and an inter prediction mode that uses affine motion information. For example, the inter prediction mode using translational motion information may include a merge mode and a motion vector prediction mode, and the inter prediction mode using affine motion information may include an affine merge mode and an affine motion vector prediction mode. The motion information of the current block may be determined based on a neighboring block adjacent to the current block or information parsed from a bitstream according to the inter prediction mode.

Hereinafter, the inter prediction method using affine motion information will be described in detail.

Figure 7:
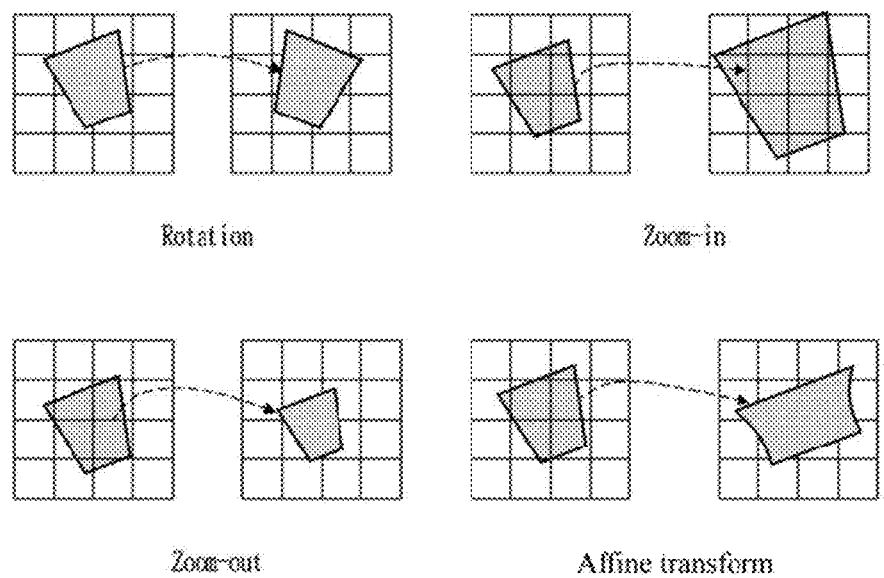
FIG. 7 is a view showing a nonlinear motion of an object.

FIG. 7 is a view showing a nonlinear motion of an object.

A nonlinear motion of an object may be generated in a video. For example, as shown in the example of FIG. 7, a nonlinear motion of an object, such as zoom-in, zoom-out, rotation, affine transform or the like of a camera, may occur. When a nonlinear motion of an object occurs, the motion of the object cannot be effectively expressed with a translational motion vector. Accordingly, encoding efficiency can be improved by using an affine motion instead of a translational motion in an area where a nonlinear motion of an object occurs.

Figure 8:
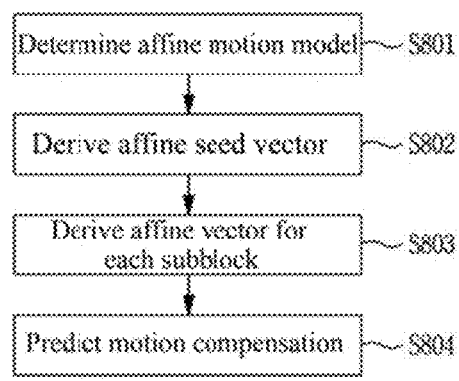
FIG. 8 is a flowchart illustrating an inter prediction method based on an affine motion according to an embodiment of the present disclosure.

FIG. 8 is a flowchart illustrating an inter prediction method based on an affine motion according to an embodiment of the present disclosure.

Whether an inter prediction technique based on an affine motion is applied to the current block may be determined based on the information parsed from a bitstream. Specifically, whether the inter prediction technique based on an affine motion is applied to the current block may be determined based on at least one among a flag indicating whether the affine merge mode is applied to the current block and a flag indicating whether the affine motion vector prediction mode is applied to the current block.

When the inter prediction technique based on an affine motion is applied to the current block, an affine motion model of the current block may be determined (S801). The affine motion model may be determined as at least one among a six-parameter affine motion model and a four-parameter affine motion model. The six-parameter affine motion model expresses an affine motion using six parameters, and the four-parameter affine motion model expresses an affine motion using four parameters.

Equation 1 expresses an affine motion using six parameters. The affine motion represents a translational motion for a predetermined area determined by affine seed vectors.

$$v_x = ax - by + e$$

$$v_y = cx + dy + f \qquad \text{[Equation 1]}$$

When an affine motion is expressed using six parameters, a complicated motion can be expressed. However, as the number of bits required for encoding each of the parameters increases, encoding efficiency may be lowered. Accordingly, the affine motion may be expressed using four parameters. Equation 2 expresses an affine motion using four parameters.

$$v_x = ax - by + e$$

$$v_y = bx + ay + f \qquad \text{[Equation 2]}$$

Information for determining an affine motion model of the current block may be encoded and signaled through a bitstream. For example, the information may be a 1-bit flag of 'affine_type_flag'. When the value of the flag is 0, it may indicate that a 4-parameter affine motion model is applied, and when the value of the flag is 1, it may indicate that a 6-parameter affine motion model is applied. The flag may be encoded by the unit of slice, tile, or block (e.g., by the unit of coding block or coding tree). When a flag is signaled at the slice level, an affine motion model determined at the slice level may be applied to all blocks belonging to the slice.

Alternatively, an affine motion model of the current block may be determined based on an affine inter prediction mode of the current block. For example, when the affine merge mode is applied, the affine motion model of the current block may be determined as a 4-parameter motion model. On the other hand, when the affine motion vector prediction mode is applied, information for determining the affine motion model of the current block may be encoded and signaled through a bitstream. For example, when the affine motion vector prediction mode is applied to the current block, the affine motion model of the current block may be determined based on the 1-bit flag of 'affine_type_flag'.

Next, an affine seed vector of the current block may be derived (S802). When a 4-parameter affine motion model is selected, motion vectors at two control points of the current block may be derived. On the other hand, when a 6-parameter affine motion model is selected, motion vectors at three control points of the current block may be derived. The motion vector at a control point may be referred to as an affine seed vector. The control point may include at least one among the top-left corner, the top-right corner, and the bottom-left corner of the current block.

Figure 9:
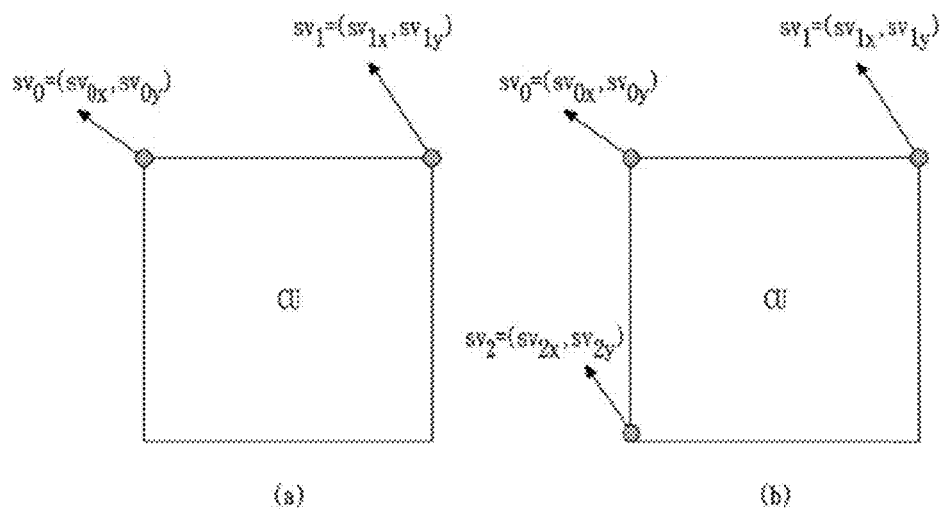
FIG. 9 is a view showing an example of affine seed vectors of each affine motion model.

FIG. 9 is a view showing an example of affine seed vectors of each affine motion model.

In the 4-parameter affine motion model, affine seed vectors may be derived for two among the top-left corner, the top-right corner, and the bottom-left corner. For example, as shown in the example of FIG. 9(a), when a 4-parameter affine motion model is selected, an affine vector may be derived using the affine seed vector sv0 for the top-left corner of the current block (e.g., top-left sample (x1, y1)) and the affine seed vector sv1 for the top-right corner of the current block (e.g., the top-right sample (x1, y1)). It is also possible to use an affine seed vector for the bottom-left corner instead of the affine seed vector for the top-left corner, or use an affine seed vector for the bottom-left corner instead of the affine seed vector for the top-right corner.

In the 6-parameter affine motion model, affine seed vectors may be derived for the top-left corner, the top-right corner, and the bottom-left corner. For example, as shown in the example of FIG. 9(b), when a 6-parameter affine motion model is selected, an affine vector may be derived using the affine seed vector sv0 for the top-left corner of the current block (e.g., top-left sample (x1, y1)), the affine seed vector sv1 for the top-right corner of the current block (e.g., the top-right sample (x1, y1)), and the affine seed vector sv2 for the top-left corner of the current block (e.g., top-left sample (x2, y2)).

In the embodiment described below, in the 4-parameter affine motion model, the affine seed vectors of the top-left control point and the top-right control point will be referred to as a first affine seed vector and a second affine seed vector, respectively. In the embodiments using the first affine seed vector and the second affine seed vector described below, at least one among the first affine seed vector and the second affine seed vector may be replaced by the affine seed vector of the bottom-left control point (a third affine seed vector) or the affine seed vector of the bottom-right control point (a fourth affine seed vector).

In addition, in the 6-parameter affine motion model, the affine seed vectors of the top-left control point, the top-right control point, and the bottom-left control point will be referred to as a first affine seed vector, a second affine seed vector, and a third affine seed vector, respectively. In the embodiments using the first affine seed vector, the second affine seed vector, and the third affine seed vector described below, at least one among the first affine seed vector, the second affine seed vector, and the third affine seed vector may be replaced by the affine seed vector of the bottom-right control point (a fourth affine seed vector).

An affine vector may be derived for each subblock by using the affine seed vectors (S803). Here, the affine vector represents a translational motion vector derived based on the affine seed vectors. The affine vector of a subblock may be referred to as an affine subblock motion vector or a subblock motion vector.

Figure 10:
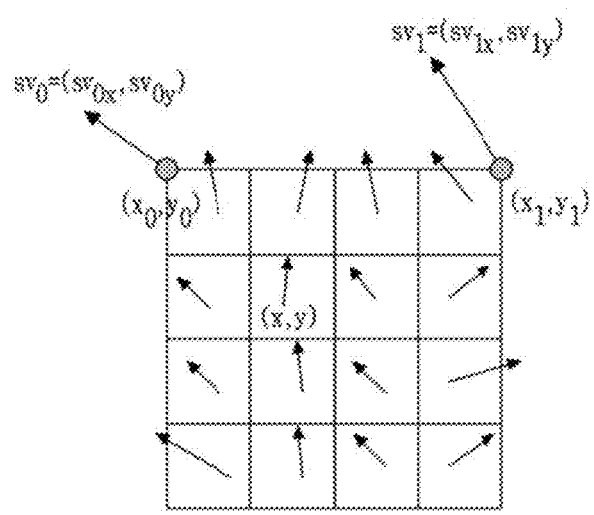
FIG. 10 is a view showing an example of affine vectors of subblocks in a 4-parameter motion model.

FIG. 10 is a view showing an example of affine vectors of subblocks in a 4-parameter motion model.

The affine vector of the subblock may be derived based on the position of the control point, the position of the subblock, and the affine seed vector. For example, Equation 3 shows an example of deriving an affine subblock vector.

$$v_x = \frac{(sv_{1x} - sv_{0x})}{(x_1 - x_0)}(x - x_0) - \frac{(sv_{1y} - sv_{0y})}{(x_1 - x_0)}(y - y_0) + sv_{0x} \qquad \text{[Equation 3]}$$

$$v_y = \frac{(sv_{1y} - sv_{0y})}{(x_1 - x_0)}(x - x_0) - \frac{(sv_{1x} - sv_{0x})}{(x_1 - x_0)}(y - y_0) + sv_{0y}$$

In Equation 3, (x, y) denotes the position of a subblock. Here, the position of a subblock indicates the position of a reference sample included in the subblock. The reference sample may be a sample positioned at the top-left corner of the subblock, or a sample of which at least one among the x-axis and y-axis coordinates is a center point. (x0, y0) denotes the position of the first control point, and (sv0x, sv0y) denotes the first affine seed vector. In addition, (x1, y1) denotes the position of the second control point, and (sv1x, sv1y) denotes the second affine seed vector.

When the first control point and the second control point correspond to the top-left corner and the top-right corner of the current block respectively, x1−x0 may be set to a value equal to the width of the current block.

Thereafter, motion compensation prediction for each subblock may be performed using the affine vector of each subblock (S804). As a result of performing the motion compensation prediction, a prediction block for each subblock may be generated. The prediction blocks of the subblocks may be set as the prediction blocks of the current block.

The affine seed vector of the current block may be derived based on the affine seed vector of a neighboring block adjacent to the current block. When the inter prediction mode of the current block is an affine merge mode, the affine seed vector of a merge candidate included in the merge candidate list may be determined as the affine seed vector of the current block. In addition, when the inter prediction mode of the current block is an affine merge mode, motion information including at least one among the reference picture index of the current block, a prediction flag of a specific direction, and a bidirectional weighting value may be set to be the same as that of the merge candidate.

The merge candidate may be derived based on a neighboring block of the current block. The neighboring block may include at least one among a spatial neighboring block spatially adjacent to the current block, and a temporal neighboring block included in a picture different from the current picture.

Figure 11:
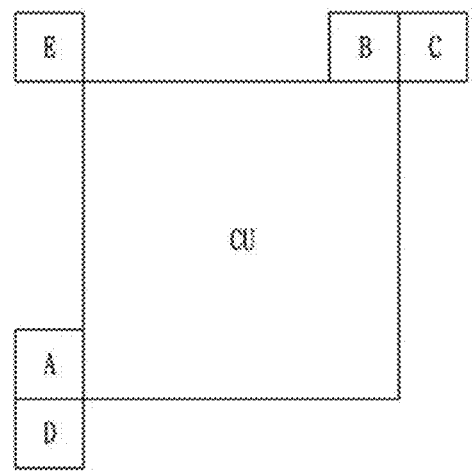
FIG. 11 is a view showing a neighboring block that can be used for deriving a merge candidate.

FIG. 11 is a view showing a neighboring block that can be used for deriving a merge candidate.

A neighboring block of the current block may include at least one among a neighboring block (A) adjacent to the left side of the current block, a neighboring block (B) adjacent to the top of the current block, a neighboring block (C) adjacent to the top-right corner of the current block, a neighboring block (D) adjacent to the bottom-left corner of the current block, and a neighboring block (E) adjacent to the top-left corner of the current block. When the coordinates of the top-left sample of the current block are (x0, y0), the left neighboring block A includes a sample at the position of (x0−1, y0+H−1), and the top neighboring block B includes a sample at the position of (x0+W−1, y0−1). Here, W and H denote the width and the height of the current block, respectively. The top-right neighboring block C includes a sample at the position of (x0+W, y0−1), and the bottom-left neighboring block D includes a sample at the position of (x0−1, y0+H). The top-left neighboring block E includes a sample at the position of (x0−1, y0−1).

When a neighboring block is encoded in the affine inter prediction mode, an affine seed vector of a merge candidate may be derived based on the affine seed vector of the neighboring block. Hereinafter, the neighboring block encoded in an affine inter prediction mode will be referred to as an affine neighboring block.

A merge candidate for the current block may be generated by searching neighboring blocks in a predefined scan order. The scan order may be predefined in the encoder and the decoder. For example, neighboring blocks may be searched in order of A, B, C, D and E. In addition, merge candidates may be sequentially derived from the searched affine neighboring blocks. Alternatively, the scan order may be adaptively determined based on at least one among the size, the shape, and the affine motion model of the current block. That is, the scan orders of blocks of which at least one among the size, the shape, and the affine motion model is different may be different from each other.

Alternatively, blocks positioned on the top of the current block are sequentially searched, and a merge candidate is derived from an affine neighboring block found first, and blocks positioned on the left side of the current block are sequentially searched, and a merge candidate may be derived from an affine neighboring block found first. Here, the neighboring blocks positioned on the top of the current block include at least one among neighboring block E, neighboring block B, and neighboring block C, and the blocks positioned on the left side of the current block may include at least one among block A and block D. At this point, neighboring block E may also be classified as a block positioned on the left side of the current block.

Although not shown, a merge candidate may be derived from a temporal neighboring block of the current block. Here, the temporal neighboring block may include a block at a position the same as that of the current block in a collocated picture or a block adjacent thereto. Specifically, when a temporal neighboring block of the current block is encoded in an affine inter prediction mode, a merge candidate may be derived based on an affine seed vector of a temporal merge candidate.

A merge candidate list including merge candidates may be generated, and an affine seed vector of one among the merge candidates included in the merge candidate list may be determined as an affine seed vector of the current block. To this end, index information for identifying any one of the merge candidates may be encoded and transmitted through a bitstream.

As another example, neighboring blocks are searched according to a scan order, and an affine seed vector of the current block may be derived from the affine seed vector of an affine neighboring block found first.

As described above, in the affine merge mode, an affine seed vector of the current block may be derived using an affine seed vector of a neighboring block.

When the inter prediction mode of the current block is an affine motion vector prediction mode, the affine seed vector of a motion vector prediction candidate included in a motion vector prediction candidate list may be determined as an affine seed vector prediction value of the current block. The affine seed vector of the current block may be derived by adding an affine seed vector difference value to the affine seed vector prediction value.

An affine seed vector prediction candidate may be derived based on a neighboring block of the current block. Specifically, neighboring blocks positioned on the top of the current block is searched according to a predetermined scan order, and a first affine seed vector prediction candidate may be derived from an affine neighboring block found first. In addition, neighboring blocks positioned on the left side of the current block is searched according to a predetermined scan order, and a second affine seed vector prediction candidate may be derived from an affine neighboring block found first.

Information for determining an affine seed vector difference value may be encoded and transmitted through a bitstream. The information may include size information indicating the magnitude of the affine seed vector difference value, and code information indicating a sign of the affine seed vector difference value. The affine seed vector difference value for each control point may be set to be the same. Alternatively, the affine sheet vector difference value may be set differently for each control point.

As described above, an affine seed vector of a merge candidate or an affine seed vector prediction candidate may be derived from an affine seed vector of an affine neighboring block, and an affine seed vector of the current block may be derived using the derived affine seed vector of the merge candidate or the affine seed vector prediction candidate. Alternatively, after searching affine neighboring blocks according to a predetermined scan order, the affine seed vector of the current block may be derived from the affine seed vector of an affine neighboring block found first.

Hereinafter, a method of deriving an affine seed vector of the current block, a merge candidate, or an affine seed vector prediction candidate from an affine seed vector of an affine neighboring block will be described in detail. In the embodiments described below, it may be understood that deriving an affine seed vector of the current block is deriving an affine seed vector of a merge candidate or deriving an affine seed vector of an affine seed vector prediction candidate.

Figure 12:
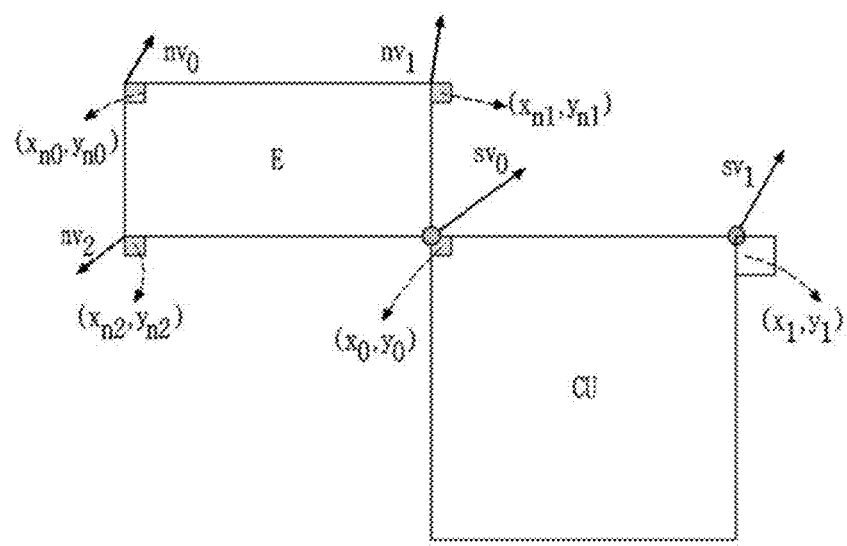
FIG. 12 is a view showing an example of deriving an affine seed vector of a current block based on an affine seed vector of an affine neighboring block.

FIG. 12 is a view showing an example of deriving an affine seed vector of a current block based on an affine seed vector of an affine neighboring block.

When a first affine seed vector nv0 for the top-left control point and a second affine seed vector nv1 for the top-right control point are stored for an affine neighboring block, a third affine seed vector nv2 for the bottom-left control point of the affine neighboring block may be derived based on the first affine seed vector and the second affine seed vector. Equation 4 shows an example of deriving the third affine seed vector.

$$nv_{2x} = \frac{(nv_{1x} - nv_{0x})}{(x_{n1} - x_{n0})}(x_{n2} - x_{n0}) - \frac{(nv_{1y} - nv_{0y})}{(x_{n1} - x_{n0})}(y_{n2} - y_{n0}) + nv_{0x}$$

$$nv_{2y} = \frac{(nv_{1y} - nv_{0y})}{(x_{n1} - x_{n0})}(x_{n2} - x_{n0}) - \frac{(nv_{1x} - nv_{0x})}{(x_{n1} - x_{n0})}(y_{n2} - y_{n0}) + nv_{0y}$$

[Equation 4]

In Equation 4, (nv0x, nv0y) denotes a first affine seed vector nv0, (nv1x, nv1y) denotes a second affine seed vector nv1, and (nv2x, nv2y) denotes a third affine seed vector nv2. In addition, (xn0, xn0) denotes the position of the first control point, (xn1, xn1) denotes the position of the second control point, and (xn2, xn2) denotes the position of the third control point.

Thereafter, an affine seed vector of the current block may be derived using the first affine seed vector, the second affine seed vector, and the third affine seed vector. Equation 5 shows an example of deriving the first affine seed vector v0 of the current block, and Equation 6 shows an example of deriving the second affine seed vector v1 of the current block.

$$v_{0x} = \frac{(nv_{1x} - nv_{0x})}{(x_{n1} - x_{n0})}(x_0 - x_{n0}) - \frac{(nv_{2x} - nv_{0x})}{(y_{n2} - x_{n0})}(y_0 - y_{n0}) + nv_{0x}$$

$$v_{0y} = \frac{(nv_{1y} - nv_{0y})}{(x_{n1} - x_{n0})}(x_0 - x_{n0}) - \frac{(nv_{2y} - nv_{0y})}{(y_{n2} - x_{n0})}(y_0 - y_{n0}) + nv_{0y}$$

[Equation 5]

$$v_{1x} = \frac{(nv_{1x} - nv_{0x})}{(x_{n1} - x_{n0})}(x_1 - x_{n0}) - \frac{(nv_{2x} - nv_{0x})}{(y_{n2} - x_{n0})}(y_1 - y_{n0}) + nv_{0x}$$

$$v_{1y} = \frac{(nv_{1y} - nv_{0y})}{(x_{n1} - x_{n0})}(x_1 - x_{n0}) - \frac{(nv_{2y} - nv_{0y})}{(y_{n2} - x_{n0})}(y_1 - y_{n0}) + nv_{0y}$$

[Equation 6]

In Equations 5 and 6, (v0x, v0y) denotes the first affine seed vector sv0 of the current block, and (v1x, v1y) denotes the second affine seed vector sv1 of the current block. In addition, (x0, y0) denotes the position of the first control point, and (x1, y1) denotes the position of the second control point. For example, the first control point indicates the top-left corner of the current block, and the second control point indicates the top-right corner of the current block.

In the example described above, it has been described that affine seed vectors of the current block are derived using three affine seed vectors for an affine neighboring block. As another example, the affine seed vectors of the current block may be derived using only two of the affine seed vectors of an affine neighboring block.

Alternatively, the affine seed vectors of the current block may be derived using a fourth affine seed vector for the bottom-right corner, instead of the first affine seed vector of the top-left corner, the second affine seed vector of the top-right corner, or the third affine seed vector of the bottom-left corner of an affine neighboring block.

Particularly, when the top boundary of the current block is in contact with the top boundary of a coding tree unit, and it is desired to use an affine seed vector for a top control point (e.g., the top-left corner or the top-right corner) of an affine neighboring block adjacent to the top of the current block (hereinafter, referred to as a top affine neighboring block), these should be stored in the memory in advance, and a problem of increase in the number of line buffers may occur. Accordingly, when the top boundary of the current block is in contact with the top boundary of the coding tree unit, it may be set to use an affine seed vector of a bottom control point (e.g., the bottom-left corner or the bottom-right corner), instead of the affine seed vector of the top control point, for the top affine neighboring block. For example, affine seed vectors of the current block may be derived using the third affine seed vector for the bottom-left corner and the fourth affine seed vector for the bottom-right corner of the top affine neighboring block. At this point, the affine seed vectors for the bottom corners may be copied from the affine seed vectors for the top corners or derived from the affine seed vectors for the top corners. For example, the first affine seed vector, the second affine seed vector, or the third affine seed vector may be converted into or substitute for the fourth affine seed vector for the bottom-right corner.

Equations 7 and 8 show an example of deriving the first affine seed vector and the second affine seed vector of the current block using the third affine seed vector for the bottom-left control point and the fourth affine seed vector for the bottom-right control point of a neighboring affine vector.

$$v_{0x} = \frac{(nv_{3x} - nv_{2x})}{(x_{n3} - x_{n2})}(x_0 - x_{n2}) - \frac{(nv_{3y} - nv_{2y})}{(x_{n3} - x_{n2})}(y_0 - y_{n2}) + nv_{2x}$$

$$v_{0y} = \frac{(nv_{3y} - nv_{2y})}{(x_{n3} - x_{n2})}(x_0 - x_{n2}) - \frac{(nv_{3x} - nv_{2x})}{(x_{n3} - x_{n2})}(y_0 - y_{n2}) + nv_{2y}$$

[Equation 7]

$$v_{1x} = \frac{(nv_{3x} - nv_{3x})}{(x_{n3} - x_{n2})}(x_1 - x_{n2}) - \frac{(nv_{3y} - nv_{2y})}{(x_{n3} - x_{n2})}(y_1 - y_{n2}) + nv_{2x}$$

$$v_{1y} = \frac{(nv_{3y} - nv_{2y})}{(x_{n3} - x_{n2})}(x_1 - x_{n2}) - \frac{(nv_{3x} - nv_{2x})}{(x_{n3} - x_{n2})}(y_1 - y_{n2}) + nv_{2y}$$

[Equation 8]

In Equations 7 and 8, (xn2, yn2) denotes the coordinates of the bottom-left control point of an affine neighboring block, and (xn3, yn3) denotes the coordinates of the bottom-right control point of the affine neighboring block. (x0, y0) denotes the coordinates of the top-left control point of the current block, and (x1, y1) denotes the coordinates of the top-right control point of the current block. (nv2x, nv2y) denotes the affine seed vector of the bottom-left control point of an affine neighboring block (i.e., the third affine seed vector), and (nv3x, nv3y) denotes the affine seed vector of the bottom-right control point of the affine neighboring block (i.e., the fourth affine seed vector). (v0x, v0y) denotes the affine seed vector of the top-left control point of the current block (i.e., the first affine seed vector), and (v1x, v1y) denotes the affine seed vector of the top-right control point of the current block (i.e., the second affine seed vector).

The division operation included in Equations 7 and 8 may be changed to a shift operation. The shift operation may be performed based on a value derived by the width between the bottom-left control point and the bottom-right control point (i.e., (xn3−xn2)).

As shown in the example described above, affine seed vectors of the current block may be derived from affine seed vectors of an affine neighboring block that has been encoded/decoded. To this end, affine seed vectors of the affine neighboring block that has been encoded/decoded should be stored in the memory. However, as the affine seed vectors of the affine neighboring block are stored in the memory in addition to translational motion vectors (i.e., affine vectors) of subblocks included in the affine neighboring block, there is a problem of increasing the memory usage. In order to solve this problem, the affine seed vector of the current block may be derived using the motion vector of a subblock adjacent to the control point of the affine neighboring block, instead of the affine seed vector of the affine neighboring block. That is, a motion vector of a subblock adjacent to the control point of an affine neighboring block may be set as the affine seed vector of the affine neighboring block. Here, the subblock is a block having a size/shape predefined in the encoder and the decoder, and may be a block having a basic size/shape for storing a motion vector. For example, the subblock may be a square block of a 4×4 size. Alternatively, a motion vector for a specific sample position may be set as the affine seed vector of the affine neighboring block.

Figure 13:
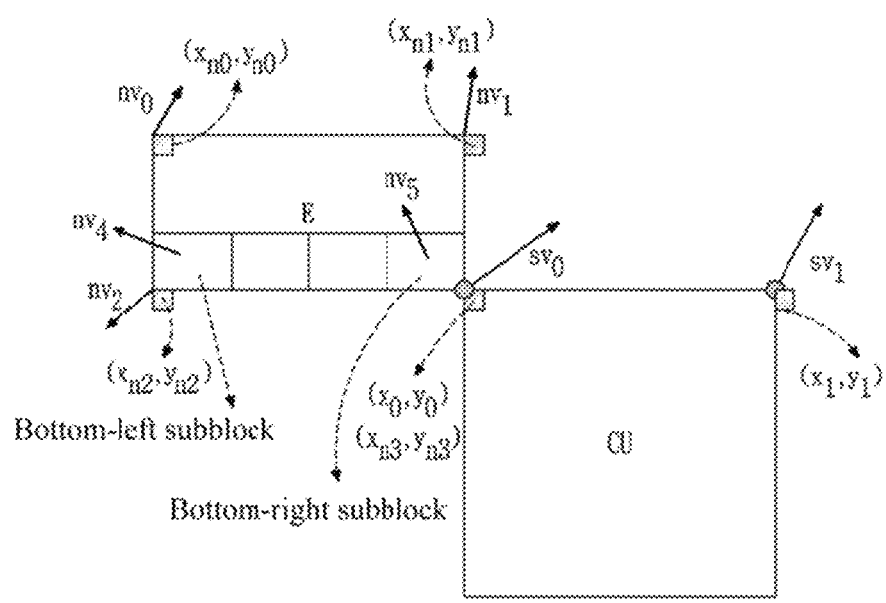
FIG. 13 is a view showing an example of setting a motion vector of a subblock as an affine seed vector of an affine neighboring block.

FIG. 13 is a view showing an example of setting a motion vector of a subblock as an affine seed vector of an affine neighboring block.

A motion vector of a subblock adjacent to a control point may be set as an affine seed vector of the control point. For example, in the example shown in FIG. 13, a motion vector (nv4x, nv4y) of a subblock (bottom-left subblock) adjacent to the bottom-left corner of an affine neighboring block may be set as the affine seed vector (nv2x, nv2x) of the bottom-left control point, and a motion vector (nv5x, nv5y) of a subblock (bottom-right subblock) adjacent to the bottom-right corner may be set as the affine seed vector (nv3x, nv3y) of the control point at the bottom-right corner. Here, the bottom-left subblock may mean a subblock including a sample (e.g., a sample at the position of (xn2, yn2-1)) adjacent to the bottom-left control point (xn2, yn2) in the neighboring affine block, and the bottom-right subblock may mean a block including a sample (e.g., a sample at the position of (xn3−1, yn3−1)) adjacent to the bottom-right control point (xn3, yn3) in the neighboring affine block. When affine seed vectors of the current block are derived based on Equations 7 and 8, the third affine seed vector of the affine neighboring block may be replaced with the motion vector of the bottom-left subblock, and the fourth affine seed vector may be replaced with the motion vector of the bottom-right subblock.

Hereinafter, in the embodiment described below, a subblock used as the affine seed vector of an affine neighboring block will be referred to as an affine subblock.

According to an embodiment of the present disclosure, an affine subblock may be determined based on a sample at a specific position. For example, a subblock including a sample at a specific position may be set as an affine subblock. Hereinafter, a sample at a specific position will be referred to as an affine reference sample. In addition, a reference sample used for determining an affine subblock of the bottom-left control point is referred to as a bottom-left reference sample, and a reference sample used for determining an affine subblock of the bottom-right control point is referred to as a bottom-right reference sample.

The bottom-left reference sample and the bottom-right reference sample may be selected from samples included in the affine neighboring block. For example, at least one among the top-left sample, the bottom-left sample, the top-right sample, and the bottom-left sample of the bottom-left subblock may be set as the bottom-left reference sample, and at least one among the top-left sample, the bottom-left sample, the top-right sample, and the bottom-left sample of the bottom-right subblock may be set as the bottom-right reference sample. Accordingly, motion vectors of the bottom-left subblock including the bottom-left reference sample and the bottom-right subblock including the bottom-right reference sample may be set as an affine seed vector for the bottom-left control point and an affine seed vector for the bottom-right control point, respectively.

As another example, at least one among the bottom-left reference sample and the bottom-right reference sample may be set as a sample positioned outside the affine neighboring block. This will be described in detail with reference to FIGS. 14 to 16.

Figure 14:
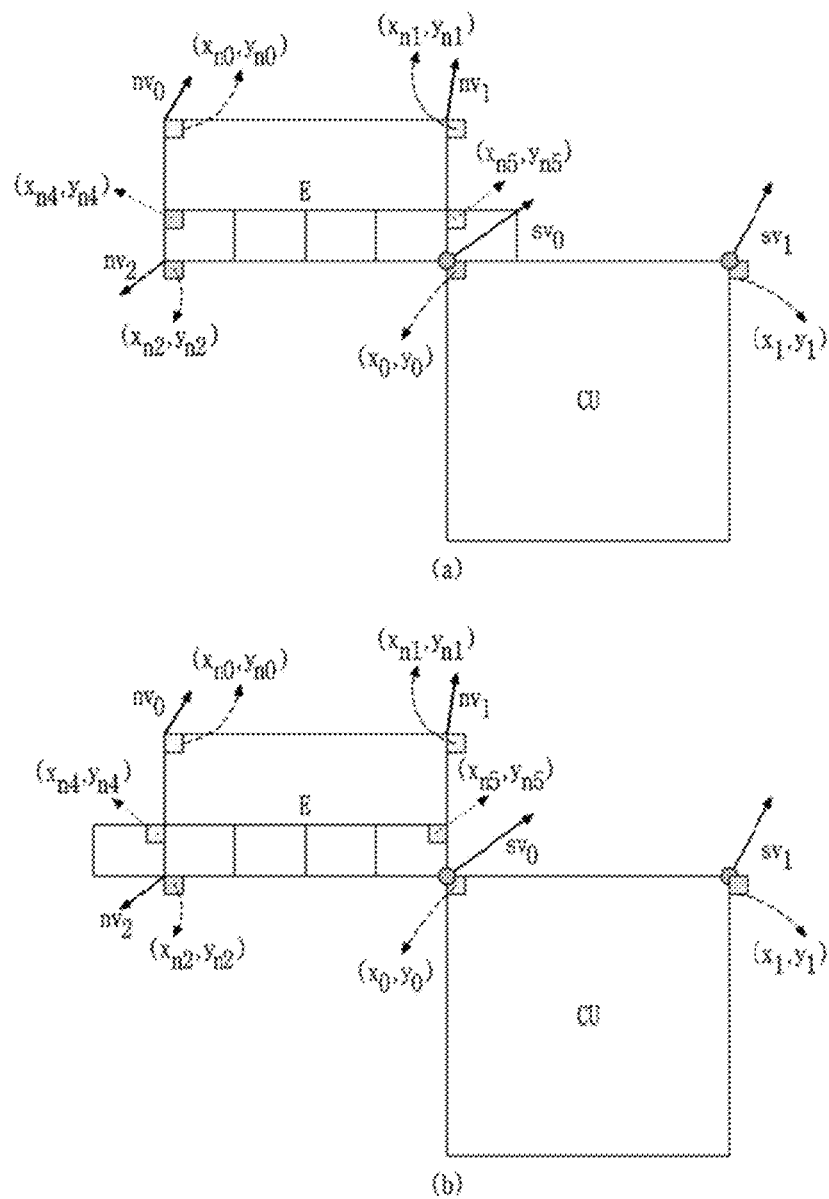
FIGS. 14 to 16 are views showing positions of reference samples.
Figure 15:
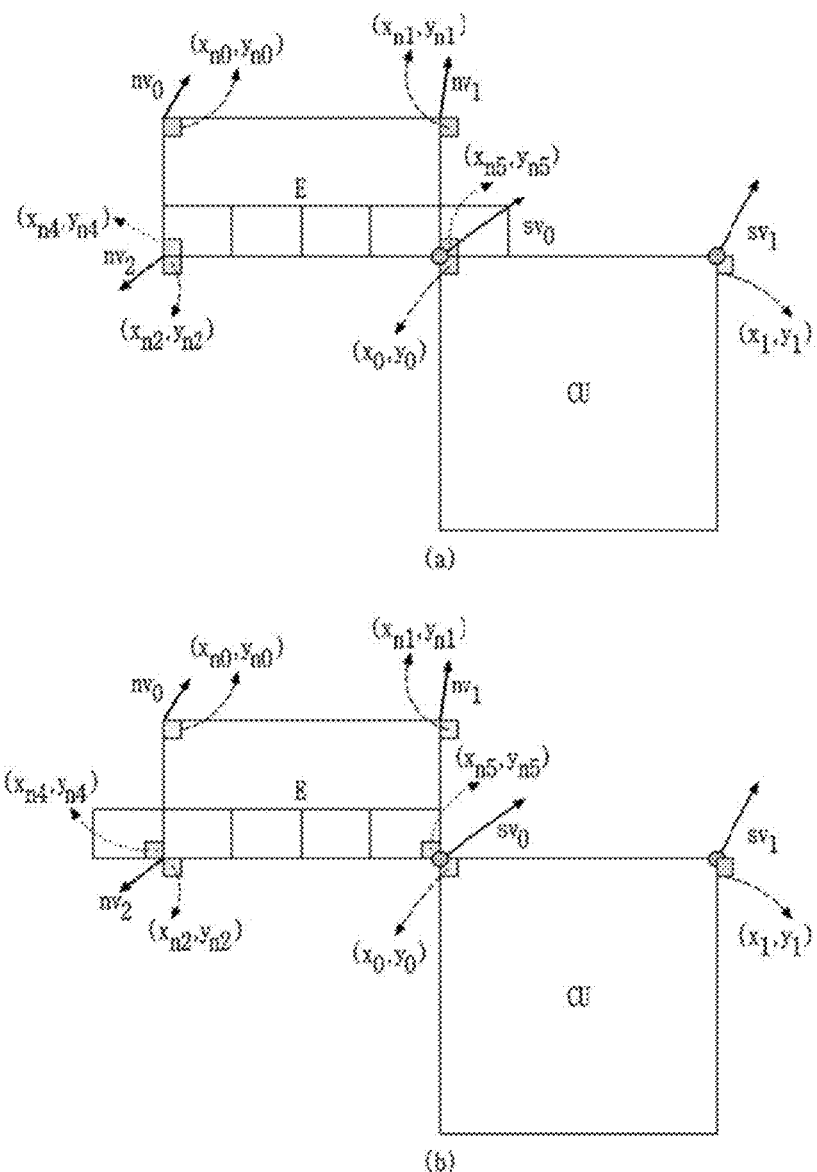
Figure 16:
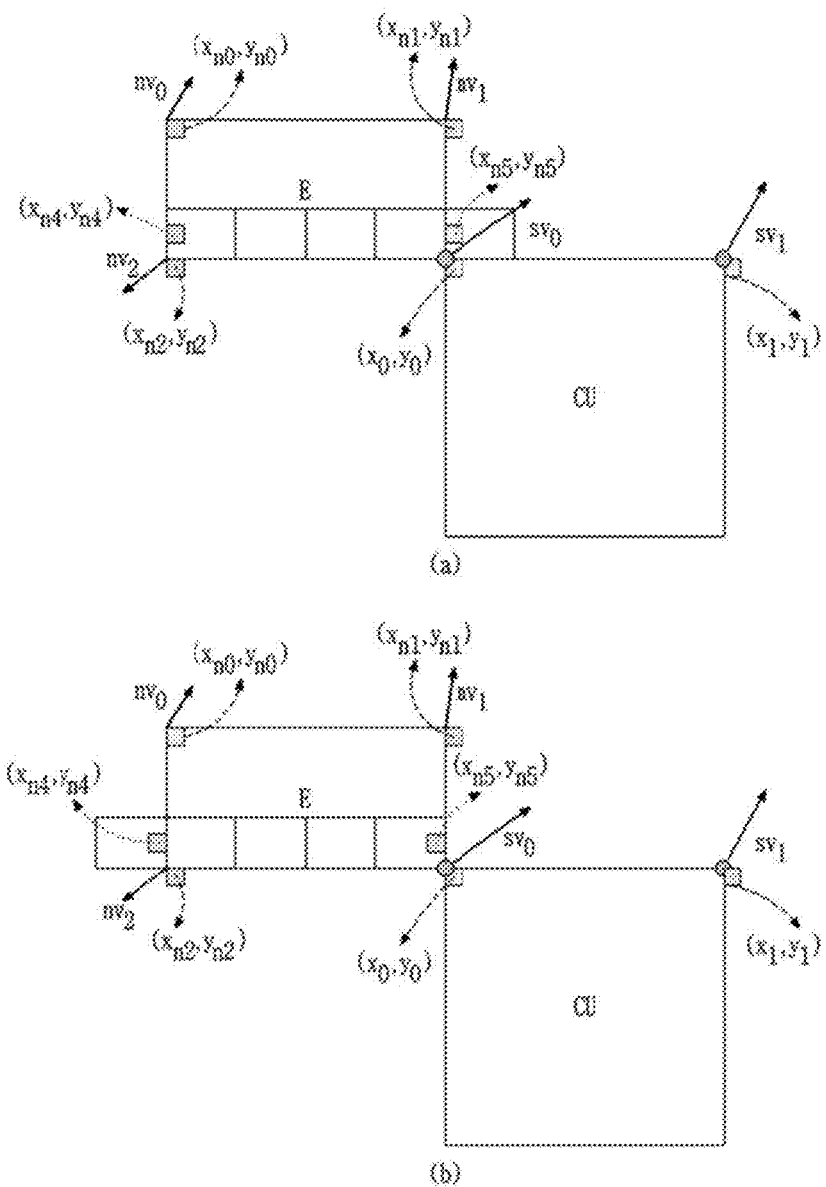

FIGS. 14 to 16 are views showing positions of reference samples.

As shown in the example of FIG. 14(a), the top-left sample of the bottom-left subblock may be set as the reference sample (xn4, yn4) for the bottom-left control point. Accordingly, the bottom-left subblock including the reference sample (xn4 and yn4) may be set as the affine subblock for the bottom-left control point.

A sample positioned on the right side of the top-right sample of the bottom-right subblock may be set as the reference sample (xn5, yn5) for the bottom-right control point. Accordingly, a subblock adjacent to the right side of the bottom-right subblock including the reference sample (xn5 and yn5) may be set as an affine subblock for the bottom-right control point.

Alternatively, as shown in the example of FIG. 14(b), a sample positioned on the left side of the top-left sample of the bottom-left subblock may be set as the reference sample (xn4, yn4) for the bottom-left control point. Accordingly, a subblock adjacent to the left side of the bottom-left subblock including the reference sample (xn4 and yn4) may be set as the affine subblock for the bottom-left control point.

The top-right sample of the bottom-right subblock may be set as the reference sample (xn5, yn5) for the bottom-right control point. Accordingly, the bottom-right subblock including the reference sample (xn5 and yn5) may be set as the affine subblock for the bottom-right control point.

Alternatively, as shown in the example of FIG. 15(a), the bottom-left sample of the bottom-left subblock may be set as the reference sample (xn4, yn4) for the bottom-left control point. Accordingly, the bottom-left subblock including the reference sample (xn4 and yn4) may be set as the affine subblock for the bottom-left control point.

A sample positioned on the right side of the bottom-right sample of the bottom-right subblock may be set as the reference sample (xn5, yn5) for the bottom-right control point. Accordingly, a subblock adjacent to the right side of the bottom-right subblock including the reference sample (xn5 and yn5) may be set as the affine subblock for the bottom-right control point.

Alternatively, as shown in the example of FIG. 15(b), a sample positioned on the left side of the bottom-left sample of the bottom-left subblock may be set as the reference sample (xn4, yn4) for the bottom-left control point. Accordingly, a subblock adjacent to the left side of the bottom-left subblock including the reference sample (xn4 and yn4) may be set as the affine subblock for the bottom-left control point.

The bottom-right sample of the bottom-right subblock may be set as the reference sample (xn5, yn5) for the bottom-right control point. Accordingly, the bottom-right subblock including the reference sample (xn5 and yn5) may be set as the affine subblock for the bottom-right control point.

Alternatively, as shown in the example of FIG. 16(a), a sample positioned between the top-left sample and bottom-left sample of the bottom-left subblock (e.g., a middle-left sample) may be set as the reference sample (xn4, yn4) for the bottom-left control point. Accordingly, the bottom-left subblock including the reference sample (xn4 and yn4) may be set as the affine subblock for the bottom-left control point.

A sample positioned on the right side of a sample positioned between the top-right sample and the bottom-right sample of the bottom-right subblock (e.g., a middle-right sample) may be set as the reference sample (xn5, yn5) for the bottom-right control point. Accordingly, a subblock adjacent to the right side of the bottom-right subblock including the reference sample (xn5 and yn5) may be set as the affine subblock for the bottom-right control point.

Alternatively, as shown in the example of FIG. 16(b), a sample positioned on the left side of a sample positioned between the top-left sample and the bottom-left sample of the bottom-left subblock may be set as the reference sample (xn4, yn4) for the bottom-left control point. Accordingly, a subblock adjacent to the left side of the bottom-left subblock including the reference sample (xn4 and yn4) may be set as the affine subblock for the bottom-left control point.

A sample positioned between the top-right sample and the bottom-right sample of the bottom-right subblock may be set as the reference sample (xn5, yn5) for the bottom-right control point. Accordingly, the bottom-right subblock including the reference sample (xn5 and yn5) may be set as the affine subblock for the bottom-right control point.

When the affine seed vectors of the current block are derived based on Equations 7 and 8, the third affine seed vector of an affine neighboring block may be replaced with the motion vector of the affine subblock for the bottom-left control point, and the fourth affine seed vector may be replaced with the motion vector of the affine subblock for the bottom-right control point. In addition, the position of the bottom-left control point may be replaced with the position of the bottom-left reference sample, and the position of the bottom-right control point may be replaced with the position of the bottom-right reference sample.

Unlike the embodiments described with reference to FIGS. 14 to 16, a subblock including a sample adjacent to a reference sample may be set as an affine subblock. Specifically, a sample positioned outside an affine neighboring subblock may be set as a reference sample, and a subblock included in an affine neighboring block may be set as an affine subblock. For example, in the example shown in FIG. 14 (a), the sample positioned on the right side of the top-right sample of the bottom-right subblock may be set as the reference sample (xn5, yn5), and the bottom-right subblock may be set as the affine subblock for the bottom-right corner. Alternatively, in the example shown in FIG. 14 (b), the sample positioned on the left of the top-left sample of the bottom-left subblock may be set as the reference sample (xn4, yn4), and the bottom-left subblock may be set as the affine subblock for the bottom-left corner.

The embodiments described above may be equally applied to FIGS. 15 and 16. That is, in the example shown in FIG. 15 (a) or FIG. 16 (a), the sample positioned on the right side of the bottom-right sample or the middle-right sample of the bottom-right subblock may be set as the reference sample (xn5, yn5), and the bottom-right subblock may be set as the affine subblock for the bottom-right corner. Alternatively, in the example shown in FIG. 15 (b) or FIG. 16 (b), the sample positioned on the left side of the bottom-left sample or the middle-left sample of the bottom-left subblock may be set as the reference sample (xn4, yn4), and the bottom-left subblock may be set as the affine subblock for the bottom-left corner.

As shown in the examples described above, an affine seed vector of an affine neighboring block may be derived using the motion vector of an affine subblock. To this end, in the case of a block that has been encoded/decoded, the motion vector may be stored by the unit of subblock.

As another example, after storing a minimum number of affine seed vectors for an affine neighboring block, a motion vector of an affine subblock may be derived using the stored affine seed vectors.

Equations 9 and 10 show an example of deriving a motion vector of an affine subblock using affine seed vectors of an affine neighboring block.

$$nv_{4x} = \frac{(nv_{1x} - nv_{0x})}{(x_{n1} - x_{n0})}(x_{n4} - x_{n0}) - \frac{(nv_{1y} - nv_{0y})}{(x_{n1} - x_{n0})}(y_{n4} - y_{n0}) + nv_{0x}$$

$$nv_{4y} = \frac{(nv_{1y} - nv_{0y})}{(x_{n1} - x_{n0})}(x_{n4} - x_{n0}) - \frac{(nv_{1x} - nv_{0x})}{(x_{n1} - x_{n0})}(y_{n4} - y_{n0}) + nv_{0y}$$

[Equation 9]

$$nv_{5x} = \frac{(nv_{1x} - nv_{0x})}{(x_{n1} - x_{n0})}(x_{n5} - x_{n0}) - \frac{(nv_{1y} - nv_{0y})}{(x_{n1} - x_{n0})}(y_{n5} - y_{n0}) + nv_{0x}$$

$$nv_{5y} = \frac{(nv_{1y} - nv_{0y})}{(x_{n1} - x_{n0})}(x_{n5} - x_{n0}) - \frac{(nv_{1x} - nv_{0x})}{(x_{n1} - x_{n0})}(y_{n5} - y_{n0}) + nv_{0y}$$

[Equation 10]

In Equations 9 and 10, (nv4x, nv4y) denotes a motion vector of an affine subblock for the bottom-left control point, and (nv5x, nv5y) denotes a motion vector of an affine subblock for the bottom-right control point. Since the motion vector of an affine subblock and the affine seed vector of a control point are set equally, (nv4x, nv4y) may be replaced with affine seed vector (nv2x, nv2y) for the bottom-left control point, or (nv5x, nv5y) may be replaced with affine seed vector (nv3x, nv3y) for the bottom-right control point.

(xn4, yn4) denotes the position of a reference sample for the bottom-left subblock. Alternatively, the center position of the bottom-left subblock or the position of the bottom-left control point may be used instead of this. (xn5, yn5) denotes the position of a reference sample for the bottom-right subblock. Alternatively, the center position of the bottom-right subblock or the position of the bottom-right control point may be used instead of this.

Equations 9 and 10 may be applied when the current block is not in contact with the boundary of a coding tree unit. When the current block is in contact with the top boundary of a coding tree unit, instead of using Equations 9 and 10, a translational motion vector of an affine subblock determined based on the bottom-left reference sample may be set as the third affine seed vector, and a translational motion vector of an affine subblock determined based on the bottom-right reference sample may be set as the fourth affine seed vector.

In Equations 7 and 8, (xn3−xn2) denotes the width between the bottom-left control point and the bottom-right control point. As described above, xn3 may be replaced with the position xn5 of the bottom-right reference sample, and xn2 may be replaced with the position xn4 of the bottom-left reference sample. Hereinafter, (xn3−xn2) or a value obtained by substituting the positions of the above equation with the positions of reference samples (e.g., (xn5-xn4)) is defined as variable Wseed, and the variable is referred to as a sub-seed vector width.

According to the positions of reference samples, a case where the sub-seed vector width is not a power series of 2 (e.g., 2n) may occur. For example, when the bottom-left sample of the bottom-left subblock is set as the bottom-left reference sample, and the bottom-right sample of the bottom-right subblock is set as the bottom-right reference sample, the sub-seed vector width is not a multiple of 2. As described above, when the sub-seed vector width is not a power series of 2, the sub-seed vector width may be transformed to be a power series of 2. The transform may include adding or subtracting an offset to or from the sub-seed vector width, or using a position of a sample adjacent to the reference sample instead of the position of the reference sample. For example, a transformed sub-seed vector width may be derived by adding 1 to the width between the bottom-left reference sample and the bottom-right reference sample. Alternatively, a width between a neighboring reference sample adjacent to the right side of the bottom-right reference sample and a bottom-left reference sample may be set as the transformed sub-seed vector width. Thereafter, an affine seed vector of the current block may be derived by applying the transformed sub-seed vector width to Equations 7 and 8.

The division operation included in Equations 7 and 8 may be changed to a shift operation. The shift operation may be performed based on a value derived by the transformed sub-seed vector width (i.e., a value expressed as a power series of 2).

When the reference sample used for determining the affine subblock does not belong to the affine neighboring block, the affine seed vector of the affine neighboring block may be derived based on a sample adjacent to the reference sample among the samples included in the affine neighboring block. Specifically, a translational motion vector of a subblock including a sample adjacent to the reference sample in the affine neighboring block (hereinafter, referred to as a neighboring reference sample) may be set as the affine seed vector of the affine neighboring block. In this way, a method of deriving an affine seed vector using a neighboring reference sample may be defined as a modified affine merge vector derivation method.

Figure 17:
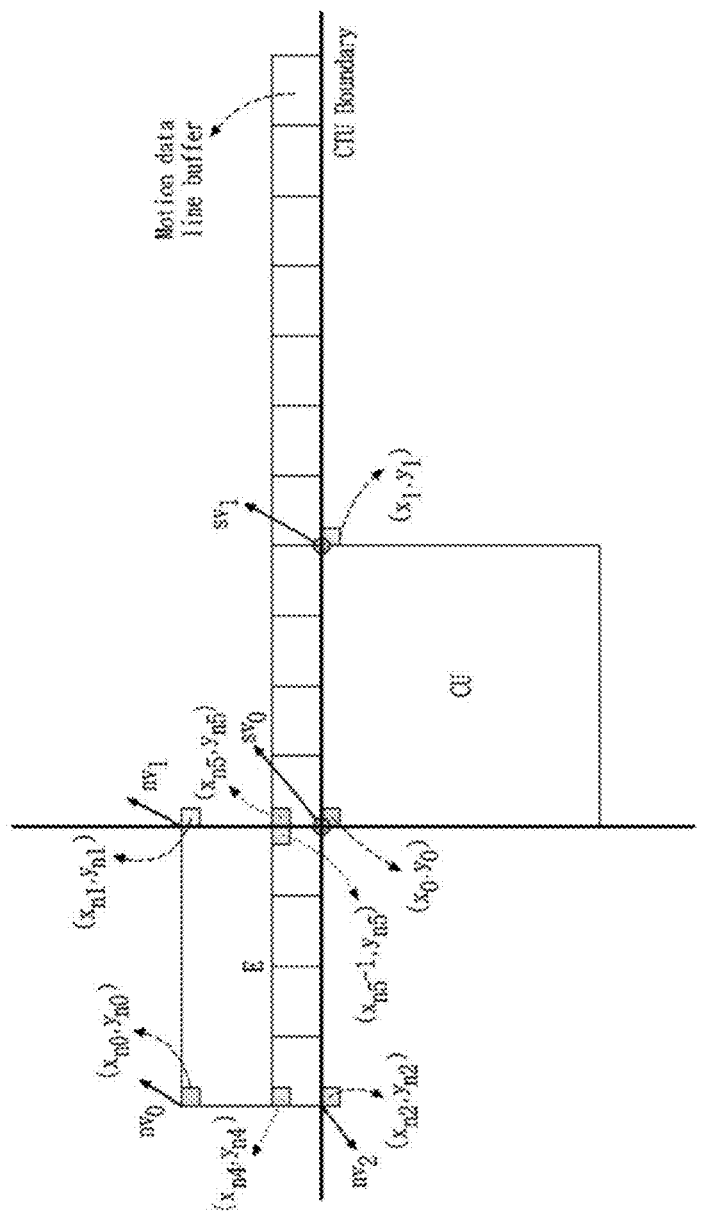
FIG. 17 is a view showing an example of applying a modified affine merge vector derivation method.

FIG. 17 is a view showing an example of applying a modified affine merge vector derivation method.

When the bottom-right reference sample (xn5, yn5) of affine neighboring block E does not belong to the affine neighboring block, an affine seed vector may be derived based on a sample (xn5−1, yn5) adjacent to the left side of the bottom-right reference sample among the samples included in the affine neighboring block. Specifically, a translational motion vector of a subblock including the neighboring reference sample (xn5−1, yn5) may be set as the affine seed vector of the bottom-right control point.

In the example shown in FIG. 17, it is shown that a sample adjacent to the right side of the top-right sample of the bottom-right subblock is the bottom-right reference sample. Even when a sample adjacent to the right side of the bottom-right sample of the bottom-right subblock or a sample adjacent to the right side of the middle-right sample of the bottom-right subblock is set as the bottom-right reference sample, an affine seed vector may be derived based on a sample adjacent to the left side of the neighboring reference sample.

In addition, even when the bottom-left reference sample does not belong to the affine neighboring block, according to the embodiment described above, the affine seed vector may be derived based on a sample adjacent to the right side of the bottom-left reference sample.

As the position of the reference sample and the subblock for deriving an affine seed vector are set differently, the sub-seed vector width may be set to a power series of 2.

A merge candidate, an affine seed vector prediction candidate, or an affine seed vector of the current block may be derived using a neighboring block that has not been encoded in an affine inter mode in the neighborhood of the current block. Specifically, blocks not encoded in the affine inter mode may be combined, and a combination thereof may be set as a merge candidate or an affine seed vector prediction candidate. For example, a combination of at least one among a motion vector of any one among neighboring blocks adjacent to the top-left corner of the current block, a motion vector of any one among neighboring blocks adjacent to the top-right corner of the current block, and a motion vector of any one among neighboring blocks adjacent to the bottom-left corner of the current block may be set as a merge candidate or an affine seed vector prediction candidate. At this point, a motion vector of a neighboring block adjacent to the top-left corner, a motion vector of a neighboring block adjacent to the top-right corner, and a motion vector of a neighboring block adjacent to the bottom-left corner may be set as a first affine seed vector for the top-left control point, a second affine seed vector for the top-right control point, and a third affine seed vector for the bottom-left control point, respectively.

Alternatively, a merge candidate, an affine seed vector prediction candidate, or an affine seed vector of the current block may be derived using a neighboring block that is not encoded in the affine inter mode in the modified affine merge vector derivation method described above. Hereinafter, a neighboring block that is not encoded in the affine inter mode will be referred to as a non-affine neighboring block.

Figure 18:
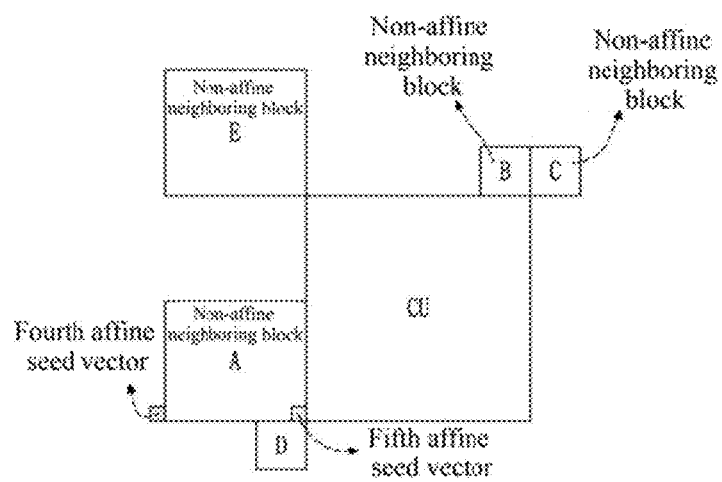
FIG. 18 is a view showing an example of deriving an affine seed vector of a current block based on a non-affine neighboring block.

FIG. 18 is a view showing an example of deriving an affine seed vector of a current block based on a non-affine neighboring block.

In the example shown in FIG. 18, it is assumed that all neighboring blocks adjacent to the current block are non-affine neighboring blocks.

When it is desired to derive an affine seed vector of the current block from non-affine neighboring block A among the neighboring blocks adjacent to the current block, a bottom-left reference sample and a bottom-right reference sample may be set for block A. For example, a sample adjacent to the left side of the bottom-left sample of block A may be set as the bottom-left reference sample, and the bottom-right sample of block A may be set as the bottom-right reference sample. Since the bottom-left reference sample is out of block A, the motion vector of a subblock including a sample adjacent to the right side of the bottom-left reference sample may be set as a third affine seed vector of block A. In addition, the motion vector of a subblock including the bottom-right reference sample may be set as a fourth affine seed vector of block A. Thereafter, a first affine seed vector and a second affine seed vector for the current block may be derived from block A based on Equations 9 and 10.

A method of deriving an affine seed vector from a non-affine neighboring block may be used only when motion compensation prediction for a non-affine neighboring block is performed by the unit of subblock. Here, the prediction technique for performing the motion compensation prediction by the unit of subblock may include at least one among STMVP, ATMVP, Bi-Directional Optical Flow (BIO), Overlapped Block Motion Compensation (OBMC), and Decoder side Motion Vector Refinement (DMVR).

In the embodiment described above, it has been described that when the top boundary of the current block is in contact with the boundary of a coding tree unit, a merge candidate, an affine seed vector prediction candidate, or an affine seed vector of the current block is derived using the third affine seed vector for the bottom-left control point and the fourth affine seed vector for the bottom-right control point of the affine neighboring block positioned on the top of the current block.

As another example, when the top boundary of the current block is in contact with the boundary of a coding tree unit, and a neighboring block positioned on the top of the current block belongs to a coding tree unit different from that of the current block, a merge candidate, an affine seed vector prediction candidate, or an affine seed vector of the current block may be derived using a neighboring block closest to the neighboring block among the blocks included in the coding tree unit to which the current block belongs, instead of the neighboring block.

Figure 19:
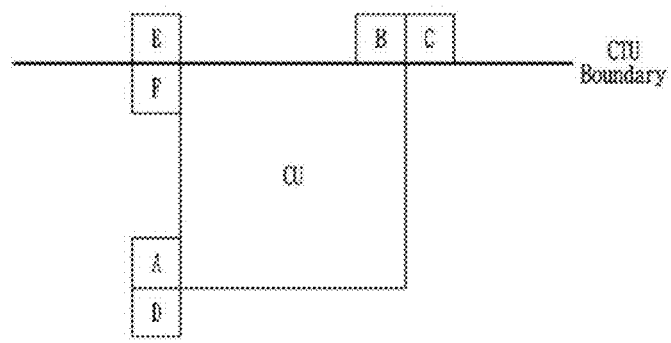
FIG. 19 is a view showing an example of replacing a neighboring block with another neighboring block.

In the example shown in FIG. 19, it is shown that the current block is in contact with the top boundary of a coding tree unit, and blocks B, C and E positioned on the top of the current block belong to a coding tree unit different from that of the current block. Accordingly, instead of using block E, an affine seed vector of the current block may be derived using block F adjacent to block E among the blocks included in the coding tree unit to which the current block belongs.

For the sake of motion compensation prediction of the current block, affine seed vectors of a plurality of blocks may be used. For example, it is possible to select a plurality of merge candidates from the merge candidate list, and derive an affine seed vector or a subblock vector for the current block based on the affine seed vectors of the selected merge candidates. Encoding/decoding the current block using the affine seed vectors of a plurality of blocks may be referred to as a multiple affine merge encoding method.

Information indicating whether or not the multiple affine merge encoding method is applied to the current block may be encoded and transmitted through a bitstream. Alternatively, whether or not to apply the multiple affine merge encoding method to the current block may be determined based on at least one among the number of affine neighboring blocks among the neighboring blocks adjacent to the current block, the number of merge candidates included in the merge candidate list, and the affine motion model of the current block.

Figure 20:
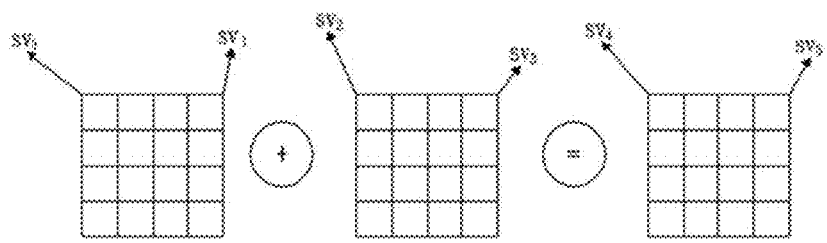
FIGS. 20 and 21 are views showing the flow of a motion compensation prediction method using a plurality of merge candidates.
Figure 21:
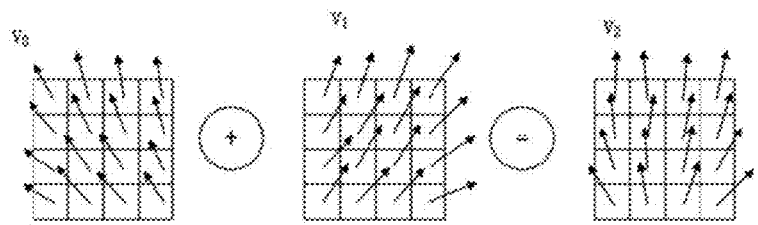

FIGS. 20 and 21 are views showing the flow of a motion compensation prediction method using a plurality of merge candidates.

FIG. 20 a view showing an example of deriving affine seed vectors of the current block using affine seed vectors of a plurality of merge candidates. FIG. 21 is a view showing an example of deriving a motion vector of each subblock using affine seed vectors of a plurality of merge candidates.

The affine seed vectors of the current block may be generated based on a sum, difference, average, or weighted sum operation of affine seed vectors of two merge candidates.

Equations 11 and 12 show an example of deriving an affine seed vector of the current block through summation of affine seed vectors of merge candidates.

$$(sv_{4x}, sv_{4y}) = (sv_{0x}, sv_{0y}) + (sv_{2x}, sv_{2y}) \quad \text{[Equation 11]}$$

$$(sv_{5x}, sv_{5y}) = (sv_{1x}, sv_{1y}) + (sv_{3x}, sv_{3y}) \quad \text{[Equation 12]}$$

In Equations 11 and 12, sv4 denotes a first affine seed vector of the current block, sv0 denotes a first affine seed vector of a first merge candidate, and sv2 denotes a first affine seed vector of a second merge candidate. In addition, sv5 denotes a second affine seed vector of the current block, sv1 denotes a second affine seed vector of the first merge candidate, and sv3 denotes a second affine seed vector of the second merge candidate.

In addition, Equations 13 and 14 show an example of deriving an affine seed vector of the current block through a weighted sum operation of affine seed vectors of merge candidates.

$$(sv_{4x}, sv_{4y}) = (sv_{0x}, sv_{0y}) + ((sv_{2x}, sv_{2y}) >> 1) \quad \text{[Equation 13]}$$

$$(sv_{5x}, sv_{5y}) = (sv_{1x}, sv_{1y}) + ((sv_{3x}, sv_{3y}) >> 1) \quad \text{[Equation 14]}$$

As another example, a first subblock motion vector and a second subblock motion vector may be generated for each subblock in the current block, based on the affine seed vectors of the first merge candidate and the affine seed vectors of the second merge candidate. Thereafter, a final subblock motion vector may be generated based on a sum, difference, average, or weighted sum operation of the first subblock motion vector and the second subblock motion vector.

Equation 15 shows an example of deriving a final subblock motion vector through summation of the first subblock motion vector and the second subblock motion vector.

$$(V_{2x}, V_{2y}) = (V_{0x}, V_{0y}) + (V_{1x}, V_{1y}) \quad \text{[Equation 15]}$$

In Equation 15, V0 denotes a first subblock motion vector, V1 denotes a second subblock motion vector, and V2 denotes a final subblock motion vector.

In addition, Equation 16 shows an example of deriving a final subblock motion vector through a weighted sum operation of the first subblock motion vector and the second subblock motion vector.

$$(V_{2x}, V_{2y}) = (V_{0x}, V_{0y}) + ((v_{1x}, v_{1y}) >> 1) \quad \text{[Equation 16]}$$

Intra prediction is for predicting a current block using reconstructed samples that have been encoded/decoded around the current block. At this point, samples reconstructed before an in-loop filter is applied may be used for intra prediction of the current block.

The intra prediction technique includes matrix-based intra prediction, and general intra prediction considering directionality with respect to neighboring reconstructed samples. Information indicating the intra prediction technique of the current block may be signaled through a bitstream. The information may be a 1-bit flag. Alternatively, the intra prediction technique of the current block may be determined based on at least one among the location, the size, and the shape of the current block, or based on an intra prediction technique of a neighboring block. For example, when the current block exists across a picture boundary, it may be set not to apply the matrix-based intra prediction intra prediction to the current block.

The matrix-based intra prediction intra prediction is a method of acquiring a prediction block of the current block by an encoder and a decoder based on a matrix product between a previously stored matrix and reconstructed samples around the current block. Information for specifying any one among a plurality of previously stored matrixes may be signaled through a bitstream. The decoder may determine a matrix for intra prediction of the current block based on the information and the size of the current block.

The general intra prediction is a method of acquiring a prediction block for the current block based on a non-angular intra prediction mode or an angular intra prediction mode. Hereinafter, a process of performing intra prediction based on general intra prediction will be described in more detail with reference to the drawings.

Figure 22:
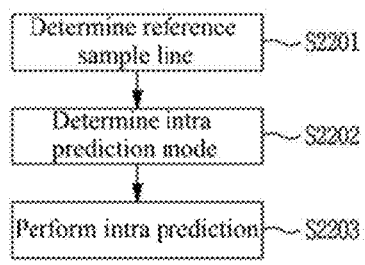
FIG. 22 is a flowchart illustrating an intra prediction method according to an embodiment of the present disclosure.

FIG. 22 is a flowchart illustrating an intra prediction method according to an embodiment of the present disclosure.

A reference sample line of the current block may be determined (S2201). The reference sample line means a set of reference samples included in a k-th line apart from the top and/or the left side of the current block. The reference samples may be derived from reconstructed samples that have been encoded/decoded around the current block.

Index information for identifying the reference sample line of the current block among a plurality of reference sample lines may be signaled through a bitstream. The plurality of reference sample lines may include at least one among a first line, a second line, a third line, and a fourth line on the top and/or left side of the current block. Table 1 shows indexes assigned to the reference sample lines, respectively. In Table 1, it is assumed that the first line, the second line, and the fourth line are used as reference sample line candidates.

TABLE 1

| Index | Reference sample lines |
| --- | --- |
| 0 | First reference sample line |
| 1 | Second reference sample line |
| 2 | Fourth reference sample line |

The reference sample line of the current block may be determined based on at least one among the location, the size, and the shape of the current block, or based on a prediction encoding mode of a neighboring block. For example, when the current block is in contact with the boundary of a picture, a tile, a slice, or a coding tree unit, the first reference sample line may be determined as the reference sample line of the current block.

The reference sample line may include top reference samples positioned on the top of the current block and left reference samples positioned on the left side of the current block. The top reference samples and the left reference samples may be derived from reconstructed samples around the current block. The reconstructed samples may be in a state before the in-loop filter is applied.

Figure 23:
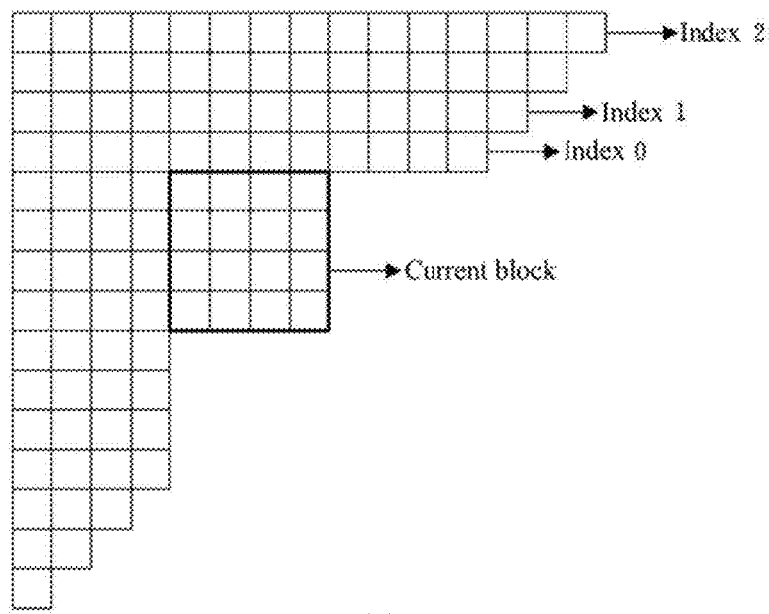
FIG. 23 is a view showing reference samples included in each reference sample line.

FIG. 23 is a view showing reference samples included in each reference sample line.

According to the intra prediction mode of the current block, a prediction sample may be acquired by using at least one among reference samples belonging to a reference sample line.

Next, the intra prediction mode of the current block may be determined (S2202). As for the intra prediction mode of the current block, at least one among a non-angular intra prediction mode and an angular intra prediction mode may be determined as the intra prediction mode of the current block. The non-angular intra prediction mode includes a planar mode and a DC mode, and the angular intra prediction mode includes 33 or 65 modes between the bottom-left diagonal direction and the top-right diagonal direction.

Figure 24:
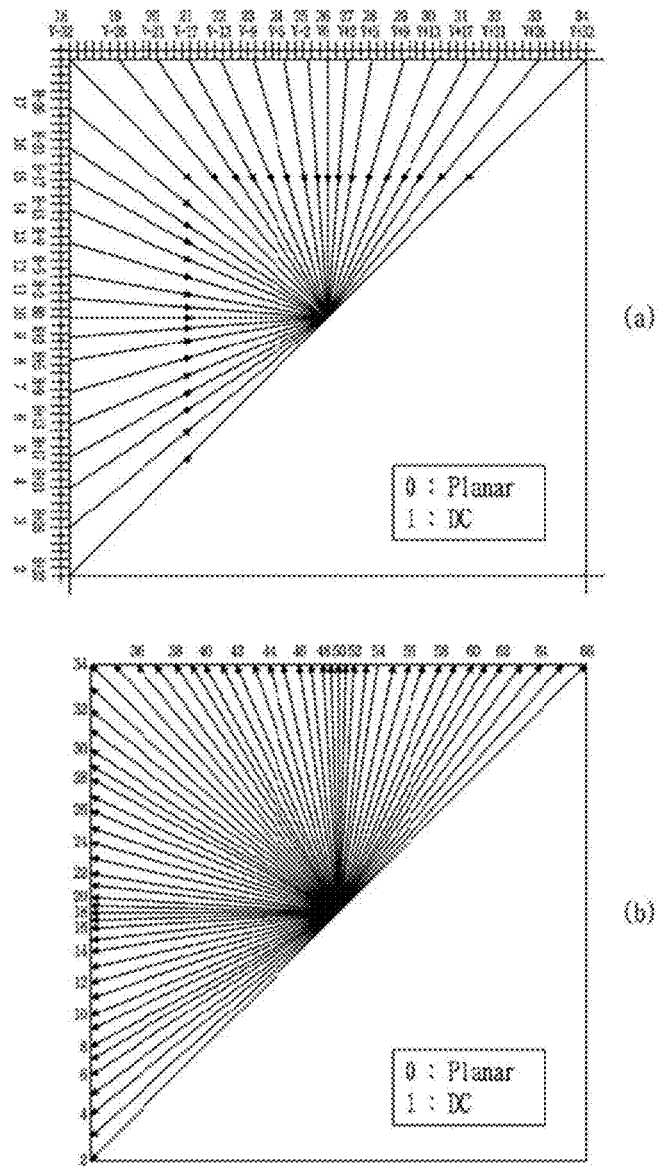
FIG. 24 is a view showing intra prediction modes.

FIG. 24 is a view showing intra prediction modes.

FIG. 24 (a) shows 35 intra prediction modes, and FIG. 24 (b) shows 67 intra prediction modes.

A larger or smaller number of intra prediction modes than those shown in FIG. 24 may be defined.

A Most Probable Mode (MPM) may be set based on the intra prediction mode of a neighboring block adjacent to the current block. Here, the neighboring block may include a left neighboring block adjacent to the left side of the current block and a top neighboring block adjacent to the top of the current block. When the coordinates of the top-left sample of the current block are (0, 0), the left neighboring block may include a sample at the position of (−1, 0), (−1, H−1) or (−1, (H−1)/2). Here, H denotes the height of the current block. The top neighboring block may include a sample at the position of (0, −1), (W−1, −1) or ((W−1)/2, −1). Here, W denotes the width of the current block.

When the neighboring block is encoded by normal intra prediction, the MPM may be derived based on the intra prediction mode of the neighboring block. Specifically, the intra prediction mode of the left neighboring block may be set to variable candIntraPredModeA, and the intra prediction mode of the top neighboring block may be set to variable candIntraPredModeB.

At this point, when the neighboring block is unavailable (e.g., when the neighboring block is not yet encoded/decoded or when the position of the neighboring block is outside the picture boundary), when the neighboring block is encoded by matrix-based intra prediction, when the neighboring block is encoded by inter prediction, or when the neighboring block is included in a coding tree unit different from the current block, variable candIntraPredModeX (here, X is A or B) derived based on the intra prediction mode of the neighboring block may be set as a default mode. Here, the default mode may include at least one among a planar mode, a DC mode, a vertical direction mode, and a horizontal direction mode.

Alternatively, when the neighboring block is encoded by matrix-based intra prediction, an intra prediction mode corresponding to an index value for specifying any one among the matrixes may be set to candIntraPredModeX. To this end, a lookup table showing the mapping relation between index values for specifying a matrix and intra prediction modes may be previously stored in the encoder and the decoder.

MPMs may be derived based on variable candIntraPredModeA and variable candIntraPredModeB. The number of MPMs included in an MPM list may be previously set in the encoder and the decoder. The number of MPMs included in the MPM list may be preset in the encoder and the decoder. For example, the number of MPMs may be 3, 4, 5 or 6. Alternatively, information indicating the number of MPMs may be signaled through a bitstream. Alternatively, the number of MPMs may be determined based on at least one among the prediction encoding mode of the neighboring block and the size and the shape of the current block.

In the embodiments described below, it is assumed that the number of MPMs is three, and the three MPMs will be referred to as MPM, MPM and MPM. When the number of MPMs is more than three, the MPMs may be configured to include three MPMs described in the embodiments described below.

When candIntraPredA and candIntraPredB are the same, and candIntraPredA is a planar mode or a DC mode, MPM and MPM may be set to a planar mode and a DC mode, respectively. MPM may be set to a vertical direction intra prediction mode, a horizontal direction intra prediction mode, or a diagonal direction intra prediction mode. The diagonal direction intra prediction mode may be a bottom-left diagonal direction intra prediction mode, a top-left direction intra prediction mode, or a top-right direction intra prediction mode.

When candIntraPredA and candIntraPredB are the same, and candIntraPredA is an angular intra prediction mode, MPM may be set to be the same as candIntraPredA. MPM and MPM may be set to an intra prediction mode similar to candIntraPredA, respectively. The intra prediction mode similar to candIntraPredA may be an intra prediction mode in which the difference between candIntraPredA and an index is ±1 or ±2. A modulo operation (%) and an offset may be used to derive the intra prediction mode similar to candIntraPredA.

When candIntraPredA and candIntraPredB are different, MPM may be set to be the same as candIntraPredA, and MPM may be set to be the same as candIntraPredB. At this point, when both candIntraPredA and candIntraPredB are the non-angular intra prediction mode, MPM may be set to a vertical direction intra prediction mode, a horizontal direction intra prediction mode, or a diagonal direction intra prediction mode. Alternatively, when at least one among candIntraPredA and candIntraPredB is an angular intra prediction mode, MPM may be set to an intra prediction mode derived by adding or subtracting an offset to or from a planar mode, a DC mode, or one among candIntraPredA and candIntraPredB having a greater value. Here, the offset may be 1 or 2.

An MPM list including a plurality of MPMs is generated, and information indicating whether an MPM that is the same as the intra prediction mode of the current block is included in the MPM list may be signaled through a bitstream. The information is a 1-bit flag and may be referred to as an MPM flag. When the MPM flag indicates that an MPM the same as that of the current block is included in the MPM list, index information identifying one among the MPMs may be signaled through a bitstream. The MPM specified by the index information may be set as the intra prediction mode of the current block. When the MPM flag indicates that an MPM the same as that of the current block is not included in the MPM list, residual mode information indicating any one among residual intra prediction modes other than MPMs may be signaled through a bitstream. The residual mode information indicates an index value corresponding to the intra prediction mode of the current block when indexes are reassigned to the residual intra prediction modes excluding the MPMs. The decoder may arrange the MPMs in ascending order and determine the intra prediction mode of the current block by comparing the residual mode information with the MPMs. For example, when the residual mode information is equal to or smaller than the MPM, the intra prediction mode of the current block may be derived by adding 1 to the residual mode information.

Instead of setting the default mode to MPM, information indicating whether or not the intra prediction mode of the current block is the default mode may be signaled through a bitstream. The information is a 1-bit flag, and the flag may be referred to as a default mode flag. The default mode flag may be signaled only when the MPM flag indicates that an MPM the same as that of the current block is included in the MPM list. As described above, the default mode may include at least one among a planar mode, a DC mode, a vertical direction mode, and a horizontal direction mode. For example, when the planar mode is set as the default mode, the default mode flag may indicate whether or not the intra prediction mode of the current block is a planar mode. When the default mode flag indicates that the intra prediction mode of the current block is not the default mode, one among the MPMs indicated by the index information may be set as the intra prediction mode of the current block.

When a plurality of intra prediction modes is set as default modes, index information indicating any one among the default modes may be further signaled. The intra prediction mode of the current block may be set as the default mode indicated by the index information.

When the index of the reference sample line of the current block is not 0, it may be set not to use the default mode. Accordingly, when the index of the reference sample line is not 0, the default mode flag is not signaled, and the value of the default mode flag may be set to a predefined value (i.e., false).

When the intra prediction mode of the current block is determined, prediction samples may be acquired for the current block based on the determined intra prediction mode (S2203).

When the DC mode is selected, prediction samples are generated for the current block based on an average value of reference samples. Specifically, values of all the samples in a prediction block may be generated based on an average value of the reference samples. The average value may be derived using at least one among top reference samples positioned on the top of the current block and left reference samples positioned on the left side of the current block.

Depending on the shape of the current block, the number or range of the reference samples used for deriving the average value may vary. For example, when the current block is a non-square shaped block of which the width is greater than the height, the average value may be calculated using only the top reference samples. On the other hand, when the current block is a non-square shaped block of which the width is smaller than the height, the average value may be calculated using only the left reference samples. That is, when the width and the height of the current block are different, the average value may be calculated using only reference samples adjacent to the longer one. Alternatively, based on the ratio of width to height of the current block, whether or not to calculate the average value using only the top reference samples or whether or not to calculate the average value using only the left reference samples may be determined.

When the planar mode is selected, a prediction sample may be acquired using a horizontal direction prediction sample and a vertical direction prediction sample. Here, the horizontal direction prediction sample is acquired based on a left reference sample and a right reference sample positioned on a horizontal line the same as that of the prediction sample, and the vertical direction prediction sample is acquired based on a top reference sample and a bottom reference sample positioned on a vertical line the same as that of the prediction sample. Here, the right reference sample may be generated by copying a reference sample adjacent to the top-right corner of the current block, and the bottom reference sample may be generated by copying a reference sample adjacent to the bottom-left corner of the current block. The horizontal direction prediction sample may be acquired based on a weighted sum operation of the left reference sample and the right reference sample, and the vertical direction prediction sample may be acquired based on a weighted sum operation of the top reference sample and the bottom reference sample. At this point, a weighting value assigned to each reference sample may be determined according to the position of the prediction sample. The prediction sample may be acquired based on an average operation or a weighted sum operation of the horizontal direction prediction sample and the vertical direction prediction sample. When the weighted sum operation is performed, weighting values applied to the horizontal direction prediction sample and the vertical direction prediction sample may be determined based on the position of the prediction sample.

When an angular prediction mode is selected, a parameter indicating the prediction direction (or prediction angle) of the selected angular prediction mode may be determined. Table 2 shows intra direction parameter intraPredAng of each intra prediction mode.

TABLE 2

| PredModeIntra | 1 | 2 | 3 | 4 | 5 | 6 | 7 |
|---|---|---|---|---|---|---|---|
| IntraPredAng | — | 32 | 26 | 21 | 17 | 13 | 9 |
| PredModeIntra | 8 | 9 | 10 | 11 | 12 | 13 | 14 |
| IntraPredAng | 5 | 2 | 0 | −2 | −5 | −9 | −13 |
| PredModeIntra | 15 | 16 | 17 | 18 | 19 | 20 | 21 |
| IntraPredAng | −17 | −21 | −26 | −32 | −26 | −21 | −17 |
| PredModeIntra | 22 | 23 | 24 | 25 | 26 | 27 | 28 |
| IntraPredAng | −13 | −9 | −5 | −2 | 0 | 2 | 5 |
| PredModeIntra | 29 | 30 | 31 | 32 | 33 | 34 | |
| IntraPredAng | 9 | 13 | 17 | 21 | 26 | 32 | |

When 35 intra prediction modes are defined, Table 2 shows the intra direction parameter of each intra prediction mode having an index of any one among 2 to 34. When more than 33 angular intra prediction modes are defined, Table 2 is further subdivided to set the intra direction parameter of each angular intra prediction mode.

After arranging top reference samples and left reference samples of the current block in a line, a prediction sample may be acquired based on the value of the intra direction parameter. At this point, when the value of the intra direction parameter is a negative value, the left reference samples and the top reference samples may be arranged in a line.

Figure 25:
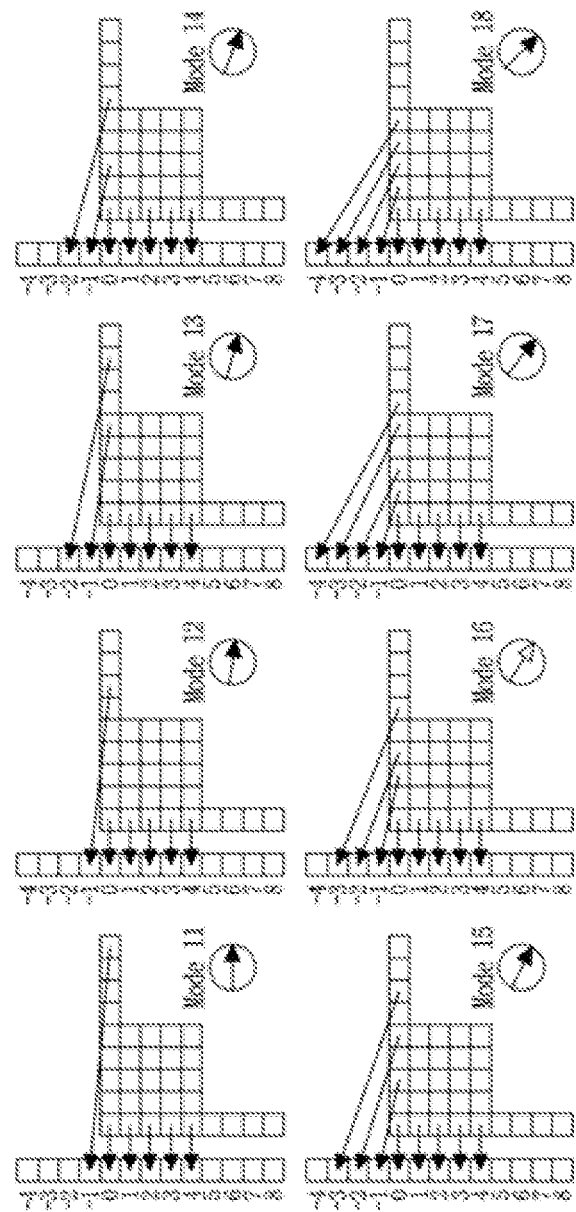
FIGS. 25 and 26 are views showing an example of a one-dimensional array arranging reference samples in a line.
Figure 26:
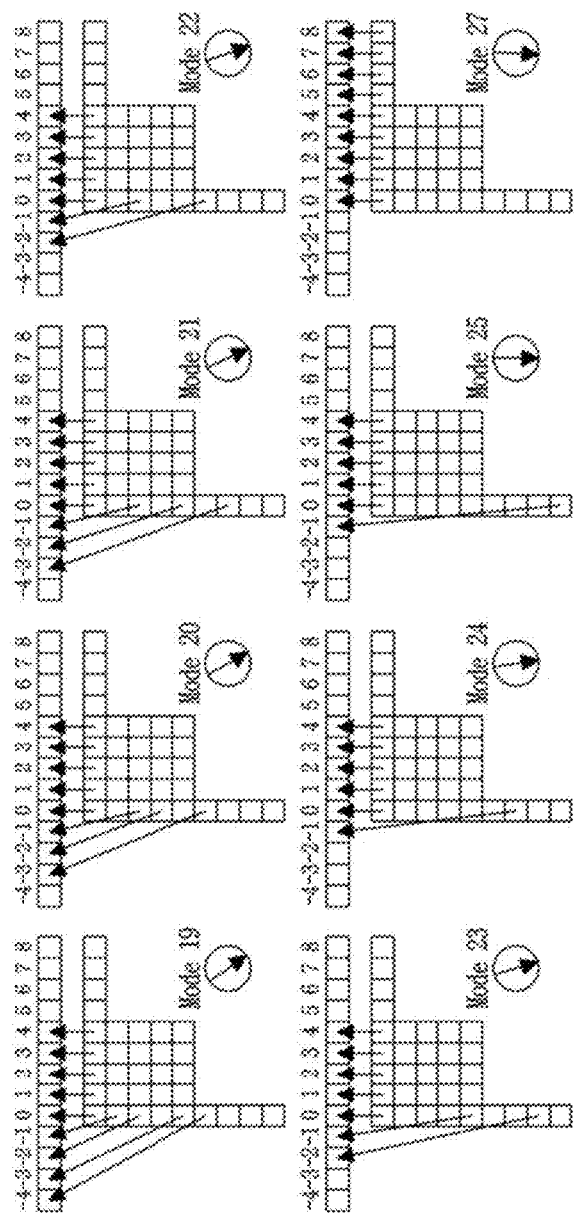

FIGS. 25 and 26 are views showing an example of a one-dimensional array arranging reference samples in a line.

FIG. 25 is a view showing an example of a vertical direction one-dimensional array arranging reference samples in the vertical direction, and FIG. 26 is a view showing an example of a horizontal direction one-dimensional array arranging reference samples in the horizontal direction. The embodiments of FIGS. 25 and 26 will be described on the assumption that 35 intra prediction modes are defined.

When the intra prediction mode index is any one among 11 to 18, a horizontal direction one-dimensional array in which top reference samples are rotated counterclockwise may be applied, and when the intra prediction mode index is any one among 19 to 25, a vertical direction one-dimensional array in which left reference samples are rotated clockwise may be applied. In arranging the reference samples in a line, an intra prediction mode angle may be considered.

A reference sample determination parameter may be determined based on an intra direction parameter. The reference sample determination parameter may include a reference sample index for specifying a reference sample and a weighting value parameter for determining a weighting value applied to the reference sample.

Reference sample index iIdx and weighting value parameter ifact may be acquired through Equations 17 and 18 shown below, respectively.

$$iIdx=(y+1)*P_{ang}/32 \quad \text{[Equation 17]}$$

$$i_{fact}=[(y+1)*P_{ang}]\&31 \quad \text{[Equation 18]}$$

In Equations 17 and 18, $P_{ang}$ denotes an intra direction parameter. The reference sample specified by reference sample index iIdx corresponds to an integer pel.

At least one or more reference samples may be specified to derive a prediction sample. Specifically, the position of a reference sample used for deriving a prediction sample may be specified considering the slope of the prediction mode. For example, a reference sample used for deriving a prediction sample may be specified using reference sample index iIdx.

At this point, when the slope of the intra prediction mode is not expressed by one reference sample, a prediction sample may be generated by interpolating a plurality of reference samples. For example, when the slope of the intra prediction mode is a value between a slope between a prediction sample and a first reference sample and a slope between a prediction sample and a second reference sample, the prediction sample may be acquired by interpolating the first reference sample and the second reference sample. That is, when an angular line following an intra prediction angle does not pass through a reference sample positioned at an integer pel, the prediction sample may be acquired by interpolating reference samples adjacent to the left and right or up and down sides of a position where the angular line passes through.

Equation 19 shows an example of acquiring a prediction sample based on reference samples.

$$P(x,y)=((32-i_{fact})/32)*\text{Ref\_1D}(x+iIdx+1)+(i_{fact}/32)*\text{Ref\_1D}(x+iIdx+2) \quad \text{[Equation 19]}$$

In Equation 19, P denotes a prediction sample, and Ref_1D denotes any one among one-dimensionally arranged reference samples. At this point, the position of a reference sample may be determined by position (x, y) of the prediction sample and index iIdx of the reference sample.

When the slope of the intra prediction mode can be expressed as one reference sample, weighting value parameter $i_{fact}$ is set to 0. Accordingly, Equation 19 may be simplified as shown in Equation 20.

$$P(x,y)=\text{Ref\_1D}(x+iIdx+1) \quad \text{[Equation 20]}$$

Intra prediction for the current block may be performed based on a plurality of intra prediction modes. For example, an intra prediction mode may be derived for each prediction sample, and the prediction sample may be derived based on an intra prediction mode assigned to each prediction sample.

Alternatively, an intra prediction mode may be derived for each region, and intra prediction for each region may be performed based on the intra prediction mode assigned to each region. Here, the region may include at least one sample. At least one among the size and the shape of the region may be adaptively determined based on at least one among the size, the shape, and the intra prediction mode of the current block. Alternatively, at least one among the size and the shape of the region may be predefined in the encoder and the decoder to be independent from the size or the shape of the current block.

Alternatively, intra prediction may be performed based on each of a plurality of intra predictions, and a final prediction sample may be derived based on an average operation or a weighted sum operation of a plurality of prediction samples acquired through the plurality of intra predictions. For example, a first prediction sample may be acquired by performing intra prediction based on a first intra prediction mode, and a second prediction sample may be acquired by performing intra prediction based on a second intra prediction mode. Thereafter, a final prediction sample may be acquired based on an average operation or a weighted sum operation of the first prediction sample and the second prediction sample. At this point, a weighting value assigned to each of the first prediction sample and the second prediction sample may be determined considering at least one among whether or not the first intra prediction mode is a non-angular/angular prediction mode, whether or not the second intra prediction mode is a non-angular/angular prediction mode, and an intra prediction mode of a neighboring block.

The plurality of intra prediction modes may be a combination of a non-angular intra prediction mode and an angular prediction mode, a combination of angular prediction modes, or a combination of non-angular prediction modes.

Figure 27:
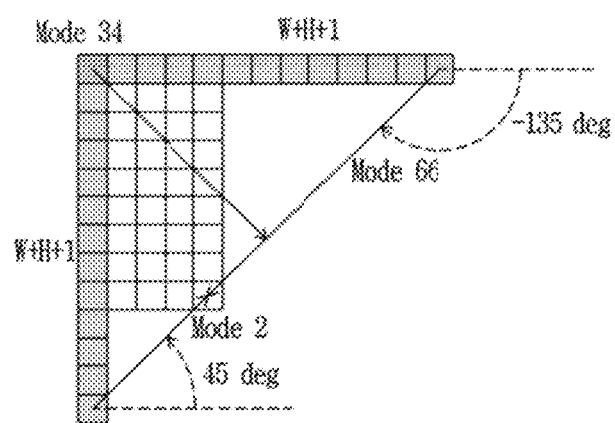
FIG. 27 is a view showing an example of angles formed between angular intra prediction modes and a straight line parallel to the x-axis.

FIG. 27 is a view showing an example of angles formed between angular intra prediction modes and a straight line parallel to the x-axis.

As shown in the example of FIG. 27, the angular prediction modes may exist between the bottom-left diagonal direction and the top-right diagonal direction. Describing in terms of an angle formed by the x-axis and the angular prediction mode, the angular prediction modes may exist between 45 degrees (bottom-left diagonal direction) and −135 degrees (top-right diagonal direction).

When the current block is a non-square shape, according to the intra prediction mode of the current block, there may be a case of deriving a prediction sample by using a reference sample farther from the prediction sample, instead of a reference sample further closer to the prediction sample, among the reference samples positioned on the angular line following the intra prediction angle.

Figure 28:
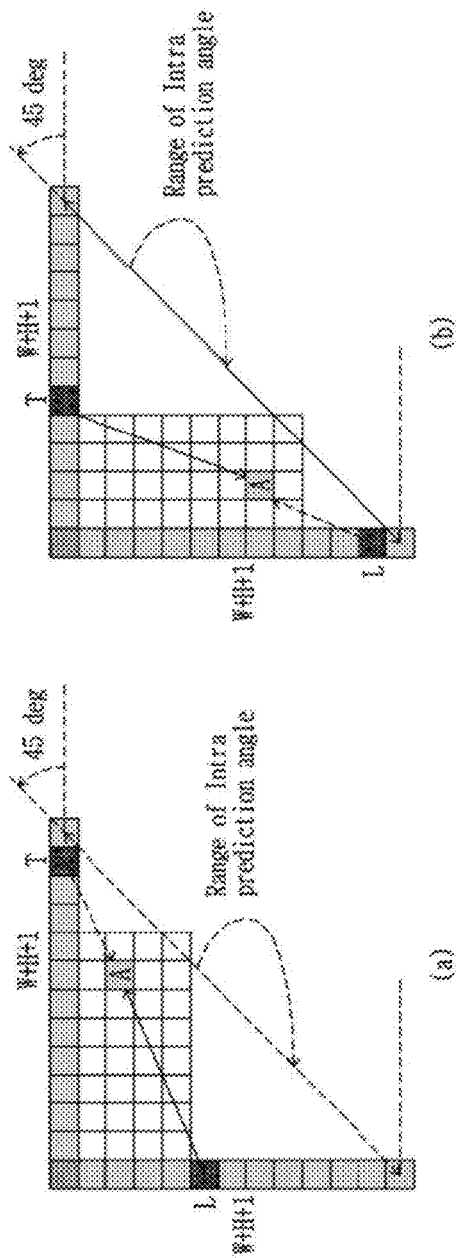
FIG. 28 is a view showing an embodiment of acquiring prediction samples when the current block is a non-square shape.

FIG. 28 is a view showing an embodiment of acquiring prediction samples when the current block is a non-square shape.

For example, as shown in the example of FIG. 28(a), it is assumed that the current block is a non-square shape of which the width is greater than the height, and the intra prediction mode of the current block is an angular intra prediction mode having an angle between 0 and 45 degrees. In the above case, when prediction sample A near the right column of the current block is derived, there may be a case of using left reference sample L far from the prediction sample, instead of top reference sample T close to the prediction sample, among the reference samples positioned on an angular mode following the angle.

As another example, as shown in the example of FIG. 28(b), it is assumed that the current block is a non-square shape of which the height is greater than the width, and the intra prediction mode of the current block is an angular intra prediction mode having an angle between −90 and −135 degrees. In the above case, when prediction sample A near the bottom row of the current block is derived, there may be a case of using top reference sample T far from the prediction sample, instead of left reference sample L close to the prediction sample, among the reference samples positioned on an angular mode following the angle.

To solve the problem described above, when the current block is a non-square shape, the intra prediction mode of the current block may be replaced with an intra prediction mode of the opposite direction. Accordingly, angular prediction modes having an angle greater or smaller than that of the angular prediction modes shown in FIG. 24 may be used for a non-square shaped block. The angular intra prediction mode like this may be defined as a wide-angle intra prediction mode. The wide-angle intra prediction mode represents an angular intra prediction mode that does not belong to the range of 45 to −135 degrees.

Figure 29:
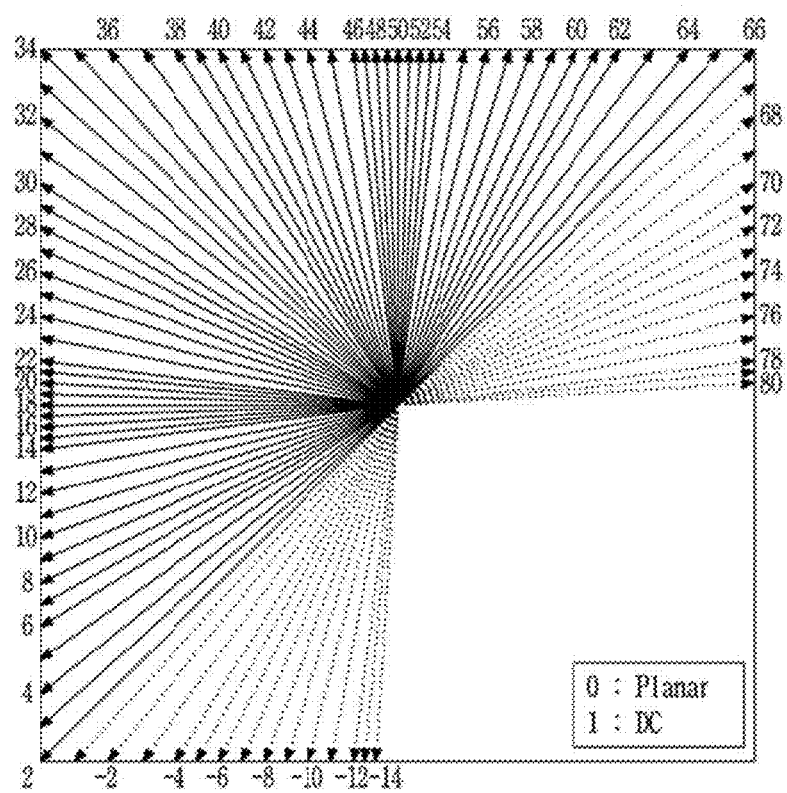
FIG. 29 is a view showing wide-angle intra prediction modes.

FIG. 29 is a view showing wide-angle intra prediction modes.

In the example shown in FIG. 29, intra prediction modes with an index of −1 to −14 and intra prediction modes with an index of 67 to 80 represent wide-angle intra prediction modes.

Although 14 wide-angle intra prediction modes (−1 to −14) having an angle larger than 45 degrees and 14 wide-angle intra prediction modes (67 to 80) having an angle smaller than −135 degrees are shown in FIG. 29, a larger or smaller number of wide-angle intra prediction modes may be defined.

When a wide-angle intra prediction mode is used, the length of top reference samples may be set to 2W+1, and the length of left reference samples may be set to 2H+1.

As a wide-angle intra prediction mode is used, sample A shown in FIG. 28(a) may be predicted using reference sample T, and sample A shown in FIG. 28(b) may be predicted using reference sample L.

By adding existing intra prediction modes and N wide-angle intra prediction modes, a total of 67+N intra prediction modes can be used. For example, Table 3 shows intra direction parameters of intra prediction modes when 20 wide-angle intra prediction modes are defined.

TABLE 3

| PredModeIntra | −10 | −9 | −8 | −7 | −6 | −5 | −4 | −3 | −2 |
|---|---|---|---|---|---|---|---|---|---|
| intraPredAngle | 114 | 93 | 79 | 68 | 60 | 54 | 49 | 45 | 39 |
| PredModeIntra | −1 | 2 | 3 | 4 | 5 | 6 | 7 | 8 | 9 |
| intraPredAngle | 35 | 32 | 29 | 26 | 23 | 21 | 19 | 17 | 15 |

TABLE 3-continued

| PredModeIntra | 10 | 11 | 12 | 13 | 14 | 15 | 16 | 17 | 18 |
|---|---|---|---|---|---|---|---|---|---|
| intraPredAngle | 13 | 11 | 9 | 7 | 5 | 3 | 2 | 1 | 0 |
| PredModeIntra | 19 | 20 | 21 | 22 | 23 | 24 | 25 | 26 | 27 |
| intraPredAngle | −1 | −2 | −3 | −5 | −7 | −9 | −11 | −13 | −15 |
| PredModeIntra | 28 | 29 | 30 | 31 | 32 | 33 | 34 | 35 | 36 |
| intraPredAngle | −17 | −19 | −21 | −23 | −26 | −29 | −32 | −29 | −26 |
| PredModeIntra | 37 | 38 | 39 | 40 | 41 | 42 | 43 | 44 | 45 |
| intraPredAngle | −23 | −21 | −19 | −17 | −15 | −13 | −11 | −9 | −7 |
| PredModeIntra | 46 | 47 | 48 | 49 | 50 | 51 | 52 | 53 | 54 |
| intraPredAngle | −5 | −3 | −2 | −1 | 0 | 1 | 2 | 3 | 5 |
| PredModeIntra | 55 | 56 | 57 | 58 | 59 | 60 | 61 | 62 | 63 |
| intraPredAngle | 7 | 9 | 11 | 13 | 15 | 17 | 19 | 21 | 23 |
| PredModeIntra | 64 | 65 | 66 | 67 | 68 | 69 | 70 | 71 | 72 |
| intraPredAngle | 26 | 29 | 32 | 35 | 39 | 45 | 49 | 54 | 60 |
| PredModeIntra | 73 | 74 | 75 | 76 | | | | | |
| intraPredAngle | 68 | 79 | 93 | 114 | | | | | |

When the current block is a non-square shape and the intra prediction mode of the current block acquired at step S2202 belongs to a transform range, the intra prediction mode of the current block may be transformed into a wide-angle intra prediction mode. The transform range may be determined based on at least one among the size, the shape, and the ratio of the current block. Here, the ratio may represent a ratio of width to height of the current block.

When the current block is a non-square shape of which the width is greater than the height, the transform range may be set from an intra prediction mode index (e.g., 66) of the top-right diagonal direction (an index of the intra prediction mode in the top-right diagonal direction−N). Here, N may be determined based on the ratio of the current block. When the intra prediction mode of the current block belongs to the transform range, the intra prediction mode may be transformed into a wide-angle intra prediction mode. The transform may be subtraction of a predefined value from the intra prediction mode, and the predefined value may be the total number (e.g., 67) of intra prediction modes excluding the wide-angle intra prediction modes.

According to the embodiment described above, 66th to 53rd intra prediction modes may be transformed into −1st to −14th wide-angle intra prediction modes, respectively.

When the current block is a non-square shape of which the height is greater than the width, the transform range may be set from an intra prediction mode index (e.g., 2) of the bottom-left diagonal direction (an index of the intra prediction mode in the bottom-left diagonal direction+M). Here, M may be determined based on the ratio of the current block. When the intra prediction mode of the current block belongs to the transform range, the intra prediction mode may be transformed into a wide-angle intra prediction mode. The transform may be addition of a predefined value to the intra prediction mode, and the predefined value may be the total number (e.g., 65) of angular intra prediction modes excluding the wide-angle intra prediction modes.

According to the embodiment described above, 2nd to 15th intra prediction modes may be transformed into 67th to 80th wide-angle intra prediction modes, respectively.

Hereinafter, intra prediction modes belonging to the transform range will be referred to as wide-angle intra replacement prediction modes.

The transform range may be determined based on the ratio of the current block. For example, Tables 4 and 5 show a transform range when 35 intra prediction modes and 67 intra prediction modes are defined excluding the wide-angle intra prediction modes, respectively.

TABLE 4

| Condition | Replaced Intra Prediction Modes |
|---|---|
| W/H = 2 | Modes 2, 3, 4 |
| W/H > 2 | Modes 2, 3, 4, 5, 6 |
| W/H = 1 | None |
| H/W = 1/2 | Modes 32, 33, 34 |
| H/W < 1/2 | Modes 30, 31, 32, 33, 34 |

TABLE 5

| Condition | Replaced Intra Prediction Modes |
|---|---|
| W/H = 2 | Modes 2, 3, 4, 5, 6, 7 |
| W/H > 2 | Modes 2, 3, 4, 5, 6, 7, 8, 9, 10, 11 |
| W/H = 1 | None |
| H/W = 1/2 | Modes 61, 62, 63, 64, 65, 66 |
| H/W < 1/2 | Modes 57, 58, 59, 60, 61, 62, 63, 64, 65, 66 |

As shown in the examples of Tables 4 and 5, the number of wide-angle intra replacement prediction modes belonging to the transform range may vary according to the ratio of the current block.

As the wide-angle intra prediction modes are used in addition to the existing intra prediction modes, resources required for encoding the wide-angle intra prediction modes increase, and thus encoding efficiency may be lowered. Accordingly, the encoding efficiency may be improved by encoding replacement intra prediction modes for the wide-angle intra prediction modes, instead of encoding the wide-angle intra prediction modes as they are.

For example, when the current block is encoded using the 67th wide-angle intra prediction mode, the 2nd intra prediction mode, which is the replacement intra prediction mode of the 67th wide-angle intra prediction mode, may be encoded using the intra prediction mode of the current block. In addition, when the current block is encoded using the −1st wide-angle intra prediction mode, the 66th intra prediction mode, which is the replacement intra prediction mode of the −1st wide-angle intra prediction mode, may be encoded using the intra prediction mode of the current block.

The decoder may decode the intra prediction mode of the current block and determine whether the decoded intra prediction mode belongs to the transform range. When the decoded intra prediction mode is a wide-angle replacement intra prediction mode, the intra prediction mode may be transformed into the wide-angle intra prediction mode.

Alternatively, when the current block is encoded using the wide-angle intra prediction mode, the wide-angle intra prediction mode may be encoded as it is.

Encoding the intra prediction mode may be performed based on the MPM list described above. Hereinafter, a method of configuring the MPM list will be described in detail. In the embodiments described below, it is assumed that 10 wide-angle intra prediction modes (−1 to −10) with an angle greater than 45 degrees and 10 wide-angle intra prediction modes (67 to 76) with an angle smaller than −135 degrees are defined.

When a neighboring block is encoded using a wide-angle intra prediction mode, the MPM may be set based on a wide-angle replacement intra prediction mode corresponding to the wide-angle intra prediction mode. For example, when a neighboring block is encoded using a wide-angle intra prediction mode, variable candIntraPredX (X is A or B) may be set to the wide-angle replacement intra prediction mode.

Alternatively, a method of deriving an MPM may be determined according to the shape of the current block. For example, when the current block is a square shape of which the width is the same as the height, candIntraPredX may be set to the wide-angle replacement intra prediction mode. On the other hand, when the current block is a non-square shape, candIntraPredX may be set to the wide-angle intra prediction mode.

Alternatively, whether or not to set candIntraPredX to the wide-angle intra prediction mode may be determined based on whether the wide-angle intra prediction mode of a neighboring block may be applied to the current block. For example, when the current block is a non-square shape of which the width is greater than the height, a wide-angle intra prediction mode of which the index is larger than that of the intra prediction mode of the top-right diagonal direction is set as candIntraPredX as it is. However, a wide-angle replacement intra prediction mode corresponding thereto is set as candIntraPredX for a wide-angle intra prediction mode of which the index is smaller than that of the intra prediction mode of the bottom-left diagonal direction. On the other hand, when the current block is a non-square shape of which the height is greater than the width, a wide-angle intra prediction mode of which the index is smaller than that of the intra prediction mode of the bottom-left diagonal direction is set as candIntraPredX as it is. However, a wide-angle replacement intra prediction mode corresponding thereto is set as candIntraPredX for a wide-angle intra prediction mode of which the index is larger than that of the intra prediction mode of the top-right diagonal direction.

That is, whether or not to derive the MPM using the wide-angle intra prediction mode as it is, or whether or not to derive the MPM using the wide-angle replacement intra prediction mode may be determined according to whether the neighboring block encoded in the wide-angle intra prediction mode has a shape the same as or similar to that of the current block.

Alternatively, the wide-angle intra prediction mode of the neighboring block may be set as candIntraPredX regardless of the shape of the current block.

In summary, candIntraPredX may be set to a wide-angle intra prediction mode or a wide-angle replacement intra prediction mode of a neighboring block.

The MPM may be derived based on candIntraPredA and candIntraPredB. In this case, the MPM may be derived in an intra prediction mode similar to candIntraPredA or candIntraPredB. The intra prediction mode similar to candIntraPredA or candIntraPredB may be derived based on a modulo operation and an offset. At this point, the constant and the offset used for the modulo operation may be determined differently according to the shape of the current block.

Table 6 shows an example of deriving an MPM according to the shape of the current block.

TABLE 6 i) If cuWidth is equal to cuHeight
candModeList[0] = candIntraPredModeA
candModeList[1] = 2 + ((candIntraPredModeA + 61) % 64)
candModeList[2] = 2 + ((candIntraPredModeA − 1) % 64)
ii) otherwise (i.e., cuWidth is not equal to cuHeight)
candModeList[0] = candIntraPredModeA
candModeList[1] = 2 + ((candIntraPredModeA + 81) % 84)
candModeList[2] = 2 + ((candIntraPredModeA − 1) % 84)

It is assumed that candIntraPredA and candIntraPredB are the same, and candIntraPredA is an angular intra prediction mode. When the current block is a square shape, an intra prediction mode similar to candIntraPredA may be obtained on the basis of a modular operation based on a value obtained by subtracting 1 from the total number of angular intra prediction modes excluding wide-angle intra prediction modes. For example, when the number of angular intra prediction modes other than the wide-angle intra prediction modes is 65, the MPM may be derived on the basis of a value derived based on candIntraPredA and a modulo operation of 64. On the other hand, when the current block is a non-square shape, an intra prediction mode similar to candIntraPredA may be obtained on the basis of a modular operation based on a value obtained by subtracting 1 from the total number of angular intra prediction modes including wide-angle intra prediction modes. For example, when the number of wide-angle intra prediction modes is 20, the MPM may be derived on the basis of a value derived based on candIntraPredA and a modulo operation of 84.

As the constant used for the modulo operation is set differently according to the shape of the current block, whether the wide-angle intra prediction mode may be set to an angular intra prediction mode similar to candIntraPredA may be determined. For example, the wide-angle intra prediction mode may not be set as an angular intra prediction mode similar to candIntraPredA in a modulo operation using 64, whereas the wide-angle intra prediction mode may be set as an angular intra prediction mode similar to candIntraPredA in a modulo operation using 84.

Alternatively, when candIntraPredA and candIntraPredB are the same, the MPM may be derived considering the shape of the current block and whether candIntraPredA is a wide-angle intra prediction mode.

Table 7 shows an example of deriving an MPM according to the shape of the current block.

TABLE 7

- If candIntraPredModeB is equal to candIntraPredModeA,
the following applies:
-- If candIntraPredModeA is less than 2 (i.e., equal
to INTRA_PLANAR or INTRA_DC),
candModeList[x] with x = 0...2 is derived as follows:
candModeList[0] = INTRA_PLANAR
candModeList[1] = INTRA_DC
candModeList[2] = INTRA_ANGULAR50
-- otherwise candModeList[x] with x = 0.. 2 is derived as follows:
i) If cuWidth is equal to cuHeight
1. if candIntrapredA is smaller than 0 or
candIntraPredModeA is greater than 66
candModeList[0] = INTRA_PLANAR
candModeList[1] = INTRA_DC
candModeList[2] = INTRA_ANGULAR50

TABLE 7-continued

```
2. otherwise if candIntraPredA >= 0 && candIntraPredModeA < 67)
candModeList[0] = candIntraPredModeA
candModeList[1] = 2 + ((candIntraPredModeA + 61) % 64)
candModeList[2] = 2 + ((candIntraPredModeA − 1) % 64)
ii) otherwise if cuWidth is greater than cuHeight
candModeList[0] = candIntraPredModeA
candModeList[1] = 2 + ((candIntraPredModeA + 81) % 84)
candModeList[2] = 2 + ((candIntraPredModeA − 1) % 84)
iii) otherwise (i.e., cuWidth is greater than cuHeight)
candModeList[0] = candIntraPredModeA
candModeList[1] = 2 + ((candIntraPredModeA + 81) % 84)
candModeList[2] = −8 + ((candIntraPredModeA − 1) % 84)
- Otherwise (candIntraPredModeB is not equal
to candIntraPredModeA), the following applies:
-- candModeList[0] and candModeList[1] are derived as follows:
candModeList[0] = candIntraPredModeA
candModeList[1] = candIntraPredModeB
-- If neither of candModeList[0] and candModeList[1]
is equal to INTRA_PLANAR,
candModeList[2] is set to INTRA_PLANAR
-- Otherwise, if neither of candModeList[0] and
candModeList[1] is equal to INTRA_DC,
candModeList[2] is set equal to INTRA_DC,
-- Otherwise, candModeList[2] is set to INTRA_ANGULAR 50.
```

It is assumed that candIntraPredA and candIntraPredB are the same.

When the current block is a square shape and candIntraPredA is a wide-angle intra prediction mode, MPMs may be set to default modes. For example, MPM, MPM, and MPM may be set to a planar mode, a DC mode, and a vertical intra prediction mode, respectively.

When the current block is a square shape and candIntraPredA is not a wide-angle intra prediction mode, but an angular intra prediction mode, MPMs may be set to candIntraPredA and an angular intra prediction mode similar thereto. For example, MPM[0] may be set to candIntraPredA, and MPM[1] and MPM[2] may be set to candIntraPredA and an angular intra prediction mode similar thereto.

When the current block is a non-square shape and candIntraPredA is an angular intra prediction mode, MPMs may be set to candIntraPredA and an angular intra prediction mode similar thereto. For example, MPM[0] may be set to candIntraPredA, and MPM[1] and MPM[2] may be set to candIntraPredA and an angular intra prediction mode similar thereto.

The angular intra prediction mode similar to candIntraPredA may be derived using a modulo operation and an offset. At this point, the constant used for the modulo operation may vary according to the shape of the current block. In addition, the offset used for deriving an angular intra prediction mode similar to candIntraPredA may be set differently according to the shape of the current block. For example, when the current block is a non-square shape of which the width is greater than the height, an angular intra prediction mode similar to candIntraPredA may be derived using offset 2. On the other hand, when the current block is a non-square shape of which the height is greater than the width, an angular intra prediction mode similar to candIntraPredA may be derived using offsets 2 and −8.

Alternatively, MPMs may be derived considering whether candIntraPredX is a wide-angle intra prediction mode having a largest or smallest index.

Table 8 shows an example of deriving an MPM considering the index of the wide-angle intra prediction mode.

TABLE 8

```
- If candIntraPredModeB is equal to candIntraPredModeA,
the following applies:
-- If candIntraPredModeA is less than 2 (i.e., equal
to INTRA_PLANAR or INTRA_DC),
candModeList[x] with x = 0... 2 is derived as follows:
candModeList[0] = INTRA_PLANAR
candModeList[1] = INTRA_DC
candModeList[2] = INTRA_ANGULAR50
-- otherwise candModeList[x] with x = 0.. 2 is derived as follows:
i) If (candIntraPredModeA < 0 && candIntraPredModeA != −10)
candModeList[0] = candIntraPredModeA
candModeList[1] = 2 + ((candIntraPredModeA − 3) % 84)
candModeList[2] = 2 + ((candIntraPredModeA − 1) % 84)
ii) otherwise, if (candIntraPredModeA = −10)
candModeList[0] = candIntraPredModeA
candModeList[1] = −1
candModeList[2] = −9
iii) otherwise, if (candIntraPredModeA > 67 &&
candIntraPredModeA < 76)
candModeList[0] = candIntraPredModeA
candModeList[1] = 2 + ((candIntraPredModeA + 81) % 84)
candModeList[2] = 2 + ((candIntraPredModeA − 1) % 84)
iv) otherwise, candIntraPredModeA is equal to 67
candModeList[0] = candIntraPredModeA
candModeList[1] = 66
candModeList[2] = 68
v) otherwise, candIntraPredModeA is equal to 77
candModeList[0] = candIntraPredModeA
candModeList[1] = 76
candModeList[2] = 67
vi) otherwise, if (candIntraPredModeA >= 0 &&
candIntraPredModeA < 67)
candModeList[0] = candIntraPredModeA
candModeList[1] = 2 + ((candIntraPredModeA + 61) % 64)
candModeList[2] = 2 + ((candIntraPredModeA − 1) % 64)
- Otherwise (candIntraPredModeB is not equal
to candIntraPredModeA), the following applies:
-- candModeList[0] and candModeList[1] are derived as follows:
candModeList[0] = candIntraPredModeA
candModeList[1] = candIntraPredModeB
-- If neither of candModeList[0] and candModeList[1]
is equal to INTRA_PLANAR,
candModeList[2] is set to INTRA_PLANAR
-- Otherwise, if neither of candModeList[0] and
candModeList[1] is equal to INTRA_DC,
candModeList[2] is set equal to INTRA_DC,
-- Otherwise, candModeList[2] is set to INTRA_ANGULAR 50.
```

It is assumed that candIntraPredA and candIntraPredB are the same. For convenience of explanation, wide-angle intra prediction modes having an index value smaller than that of the intra prediction mode of the bottom-left diagonal direction are referred to as bottom direction wide-angle intra prediction modes, and wide-angle intra prediction modes having an index value larger than that of the intra prediction mode of the top-right diagonal direction are referred to as right direction wide-angle intra prediction modes.

When candIntraPredA is a bottom direction wide-angle intra prediction mode, MPMs may be set to candIntraPredA and an angular intra prediction mode similar thereto. At this point, when candIntraPredA is a bottom direction wide-angle intra prediction mode having the smallest value, the MPM may be set to a bottom direction wide-angle intra prediction mode having a predefined index value. Here, the predefined index may be an index having the largest value among the indexes of the bottom direction wide-angle intra prediction modes. For example, when candIntraPredA is −10, MPM[0], MPM[1], and MPM[2] may be set to −10, −1, and −9, respectively.

When candIntraPredA is a right direction wide-angle intra prediction mode, MPMs may be set to candIntraPredA and an angular intra prediction mode similar thereto. At this point, when candIntraPredA is a right direction wide-angle intra prediction mode having the largest value, the MPM may be set to a right direction wide-angle intra prediction mode having a predefined index value. Here, the predefined index may be an index having the smallest value among the indexes of the right direction wide-angle intra prediction modes. For example, when candIntraPredA is 77, MPM[0], MPM[1], and MPM[2] may be set to 77, 76, and 67, respectively.

Alternatively, when an index derived by subtracting or adding 1 from or to the index of candIntraPredA is smaller than the smallest value or greater than the largest value among the indexes of the intra prediction modes, the MPM may be set to the default mode. Here, the default mode may include at least one among a planar mode, a DC mode, a vertical intra prediction mode, a horizontal intra prediction mode, and a diagonal intra prediction mode.

Alternatively, when an index derived by subtracting or adding 1 from or to the index of candIntraPredA is smaller than the smallest value or greater than the largest value among the indexes of the intra prediction modes, the MPM may be set to an intra prediction mode opposite to candIntraPredA or an intra prediction mode similar to the intra prediction mode opposite to the candIntraPredA.

Alternatively, MPM candidates may be derived considering the shape of the current block and the shape of a neighboring block. For example, the method of deriving MPMs when both the current block and the neighboring block are non-square shapes may be different from the method of deriving MPMs when the current block is a square shape and the neighboring block is a non-square shape.

MPMs in the MPM list may be rearranged (or reordered) considering at least one among the size of the current block, the shape of the current block, the size of the neighboring block, and the shape of the neighboring block. Here, the rearrangement indicates reassignment of the indexes assigned to each of the MPMs. For example, a smaller index may be assigned to an MPM the same as the intra prediction mode of a neighboring block having a size or a shape the same as that of the current block.

It is assumed that MPM[0] and MPM[1] are set to intra prediction mode candIntraPredA of the left neighboring block and intra prediction mode candIntraPredB of the top neighboring block, respectively.

When the current block and the top neighboring block are non-square shapes of which the width is greater than the height, MPMs may be rearranged so that the intra prediction mode candIntraPredB of the top neighboring block may have a smaller index. That is, candIntraPredB may be rearranged to MPM[0] and candIntraPredA may be rearranged to MPM[1].

Alternatively, when the current block and the top neighboring block are non-square shapes of which the height is greater than the width, MPMs may be rearranged so that the intra prediction mode candIntraPredB of the top neighboring block has a smaller index. That is, candIntraPredB may be rearranged to MPM[0] and candIntraPredA may be rearranged to MPM[1].

Alternatively, when the current block and the top neighboring block are square shapes, MPMs may be rearranged so that the intra prediction mode candIntraPredB of the top neighboring block has a smaller index. That is, candIntraPredB may be rearranged to MPM[0] and candIntraPredA may be rearranged to MPM[1].

Instead of rearranging the MPMs, when candIntraPredX is initially assigned to the MPM, at least one among the size of the current block, the shape of the current block, the size of the neighboring block, and the shape of the neighboring block may be considered.

MPMs may be rearranged based on the size or the shape of the current block. For example, when the current block is a non-square shape of which the width is greater than the height, the MPMs may be rearranged in descending order. On the other hand, when the current block is a non-square shape of which the height is greater than the width, the MPMs may be rearranged in ascending order.

A derived residual video may be derived by subtracting a prediction video from an original video. At this point, when the residual video is changed to the frequency domain, subjective video quality of the video is not significantly lowered although the high-frequency components among the frequency components are removed. Accordingly, when values of the high-frequency components are converted to be small or the values of the high-frequency components are set to 0, there is an effect of increasing the compression efficiency without generating significant visual distortion. By reflecting this characteristic, the current block may be transformed to decompose a residual video into two-dimensional frequency components. The transform may be performed using a transform technique such as Discrete Cosine Transform (DST) or Discrete Sine Transform (DST).

The DCT decomposes (or transforms) a residual video into two-dimensional frequency components using a cosine transform, and the DST decomposes (or transforms) a residual video into two-dimensional frequency components using a sine transform. As a result of transforming the residual video, the frequency components may be expressed as a basis video. For example, when DCT transform is performed on a block of an N×N size, as many basic pattern components as N2 may be acquired. The size of each of the basic pattern components included in a block of an N×N size may be acquired through the transform. According to a transform technique used therefor, the size of the basic pattern component may be referred to as a DCT coefficient or a DST coefficient.

Transform technique DCT is mainly used to transform a video in which many non-zero low-frequency components are distributed. The transform technique DST is mainly used for videos in which many high-frequency components are distributed.

The residual video may be transformed using a transform technique other than the DCT or the DST.

Hereinafter, transform of a residual video into two-dimensional frequency components will be referred to as two-dimensional video transform. In addition, the size of the basic pattern components acquired as a result of the transform is referred to as a transform coefficient. For example, the transform coefficient may mean a DCT coefficient or a DST coefficient. When both first transform and second transform described below are applied, the transform coefficient may mean the size of a basic pattern component generated as a result of the second transform.

The transform technique may be determined for each block. The transform technique may be determined based on at least one among the prediction encoding mode of the current block, the size of the current block, and the size of the current block. For example, when the current block is encoded in the intra prediction mode and the size of the current block is smaller than N×N, transform may be performed using the transform technique DST. On the other hand, when the above conditions are not satisfied, transform may be performed using the transform technique DCT.

The two-dimensional video transform may not be performed for some blocks of the residual video. Not performing the two-dimensional video transform may be referred to as a transform skip. When the transform skip is applied, quantization may be applied to residual coefficients that have not been transformed.

After the current block is transformed using DCT or DST, the transformed current block may be transformed again. At this point, the transform based on DCT or DST may be defined as a first transform, and transforming again a block to which the first transform is applied may be defined as a second transform.

The first transform may be performed using any one among a plurality of transform core candidates. For example, the first transform may be performed using any one among DCT2, DCT8, or DCT7.

Different transform cores may be used for the horizontal direction and the vertical direction. Information indicating combination of a transform core of the horizontal direction and a transform core of the vertical direction may be signaled through a bitstream.

Units for performing the first transform and the second transform may be different. For example, the first transform may be performed on an 8×8 block, and the second transform may be performed on a subblock of a 4×4 size among the transformed 8×8 block. At this point, the transform coefficients of the residual regions that has not been performed the second transform may be set to 0.

Alternatively, the first transform may be performed on a 4×4 block, and the second transform may be performed on a region of an 8×8 size including the transformed 4×4 block.

Information indicating whether or not the second transform has been performed may be signaled through a bitstream.

The decoder may perform an inverse transform of the second transform (a second inverse transform), and may perform an inverse transform of the first transform (a first inverse transform) on a result of the inverse transform. As a result of performing the second inverse transform and the first inverse transform, residual signals for the current block may be acquired.

Quantization is for reducing the energy of a block, and the quantization process includes a process of dividing a transform coefficient by a specific constant value. The constant value may be derived by a quantization parameter, and the quantization parameter may be defined as a value between 1 and 63.

When the encoder performs transform and quantization, the decoder may acquire a residual block through inverse quantization and inverse transform. The decoder may acquire a reconstructed block for the current block by adding a prediction block and the residual block.

When a reconstructed block of the current block is acquired, loss of information occurring in the quantization and encoding process may be reduced through in-loop filtering. An in-loop filter may include at least one among a deblocking filter, a sample adaptive offset filter (SAO), and an adaptive loop filter (ALF). Hereinafter, a reconstructed block before the in-loop filter is applied is referred to as a first reconstructed block, and a reconstructed block after the in-loop filter is applied is referred to as a second reconstructed block.

The second reconstructed block may be acquired by applying at least one among the deblocking filter, the SAO, and the ALF to the first reconstructed block. At this point, the SAO or the ALF may be applied after the deblocking filter is applied.

The deblocking filter is for mitigating degradation of video quality (blocking artifact) at the boundary of a block, which occurs as quantization is performed on individual blocks. In order to apply the deblocking filter, a block strength (BS) between the first reconstructed block and a neighboring reconstructed block may be determined.

Figure 30:
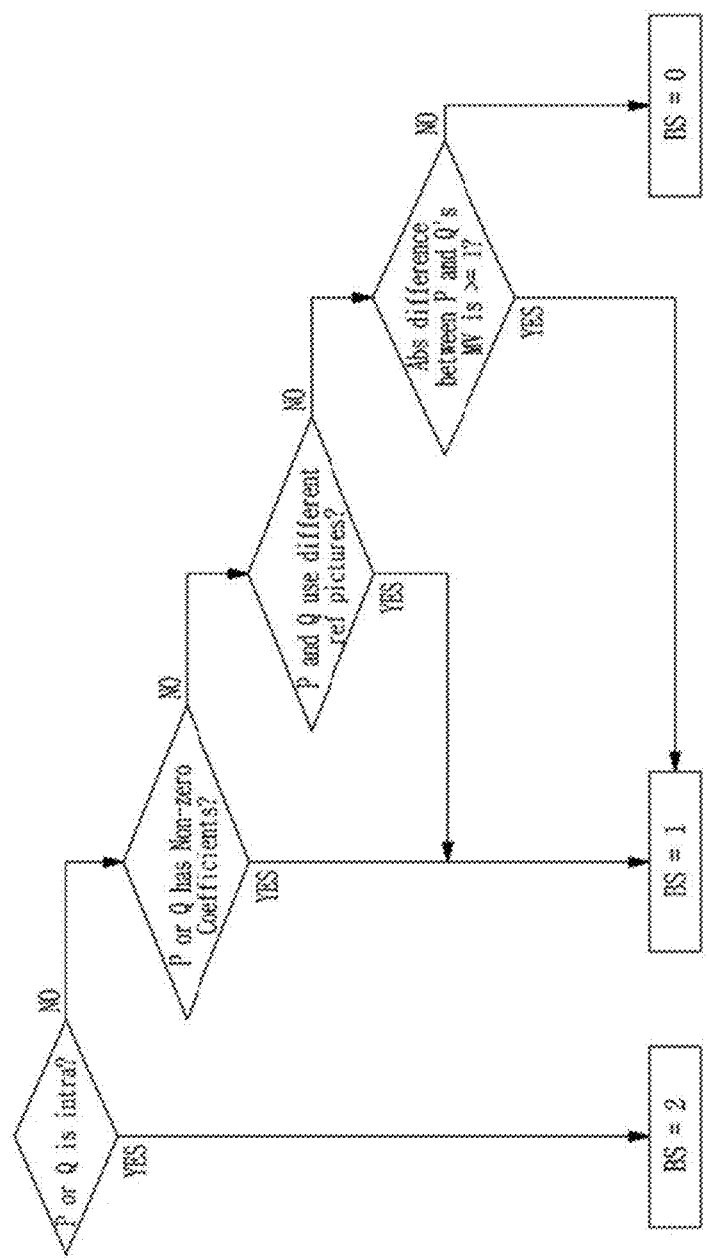
FIG. 30 is a flowchart illustrating a process of determining block strength.

FIG. 30 is a flowchart illustrating a process of determining block strength.

In the example shown in FIG. 30, P denotes a first reconstructed block, and Q denotes a neighboring reconstructed block. Here, the neighboring reconstructed block may be a block adjacent to the left side or the top side of the current block.

In the example shown in FIG. 30, it is shown that the block strength is determined considering the prediction encoding modes of P and Q, whether a non-zero transform coefficient is included, whether inter prediction is performed using the same reference picture, and whether the difference value of motion vectors is larger than or equal to a threshold value.

Whether or not to apply the deblocking filter may be determined based on the block strength. For example, when the block strength is 0, filtering may not be performed.

The SAO is for mitigating a ringing phenomenon (ringing artifact) that occurs as quantization is performed in the frequency domain. The SAO may be performed by adding or subtracting an offset determined considering the pattern of the first reconstructed video. The method of determining the offset includes an edge offset (EO) or a band offset. EO denotes a method of determining an offset of a current sample according to the pattern of surrounding pixels. BO denotes a method of applying a common offset to a set of pixels having similar brightness values in a region. Specifically, pixel brightness may be divided into 32 equal sections, and pixels having similar brightness values may be set as one set. For example, four adjacent bands among 32 bands may be set as one group, and the same offset value may be applied to the samples belonging to the four bands.

The ALF is a method of generating a second reconstructed video by applying a filter having a predefined size/shape to the first reconstructed video or a reconstructed video to which a deblocking filter has been applied. Equation 21 shows an example of applying the ALF.

$$R'(i, j) = \sum_{k=-\frac{N}{2}}^{\frac{N}{2}} \sum_{l=-\frac{N}{2}}^{\frac{N}{2}} f(k, l) \cdot R(i+k, j+l) \quad \text{[Equation 21]}$$

Any one among predefined filter candidates may be selected by the unit of a picture, a coding tree unit, a coding block, a prediction block, or a transform block. Each of the filter candidates may be different in either the size or the shape.

Figure 31:
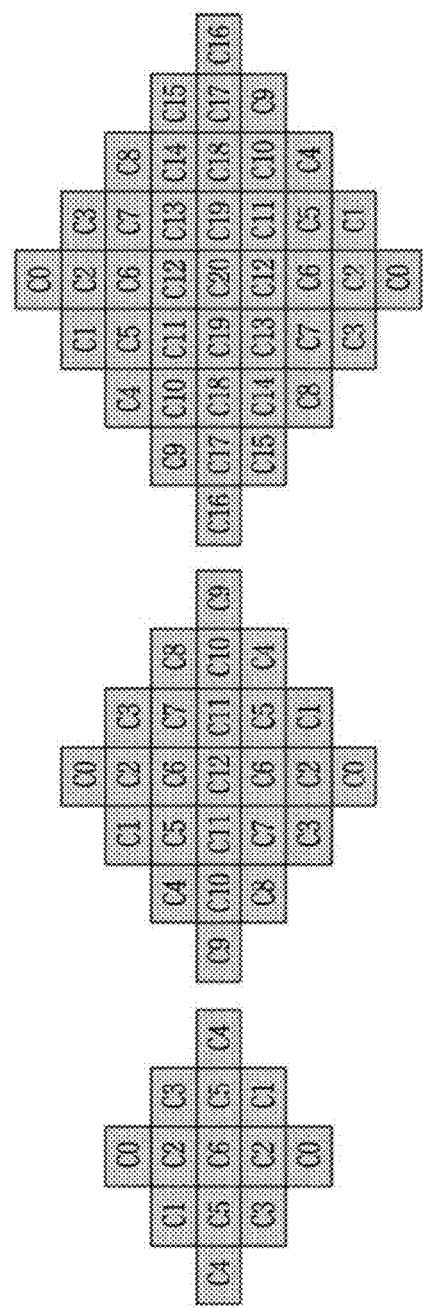
FIG. 31 is a view showing predefined filter candidates.

FIG. 31 is a view showing predefined filter candidates.

As shown in the example of FIG. 31, at least one among 5×5, 7×7 and 9×9 diamond shapes may be selected.

Only a diamond shape of a 5×5 size may be used for a chroma component.

For the sake of real-time or low-delay encoding of high-resolution videos such as panoramic videos, 360-degree videos, or 4K/8K UHD (Ultra High Definition) videos, a method of partitioning a picture into a plurality of regions and encoding/decoding the plurality of regions in parallel may be considered. To this end, a picture may be partitioned into tiles, i.e., a basic unit of parallel encoding/decoding, and the tiles may be processed in parallel.

The tiles may be constrained to have a rectangular shape. In encoding/decoding a tile, data of the other tiles are not used. A probability table of context adaptive binary arithmetic coding (CABAC) context may be initialized by the unit of tile, and it may be set not to apply an in-loop filter at the boundaries of the tiles.

Figure 32:
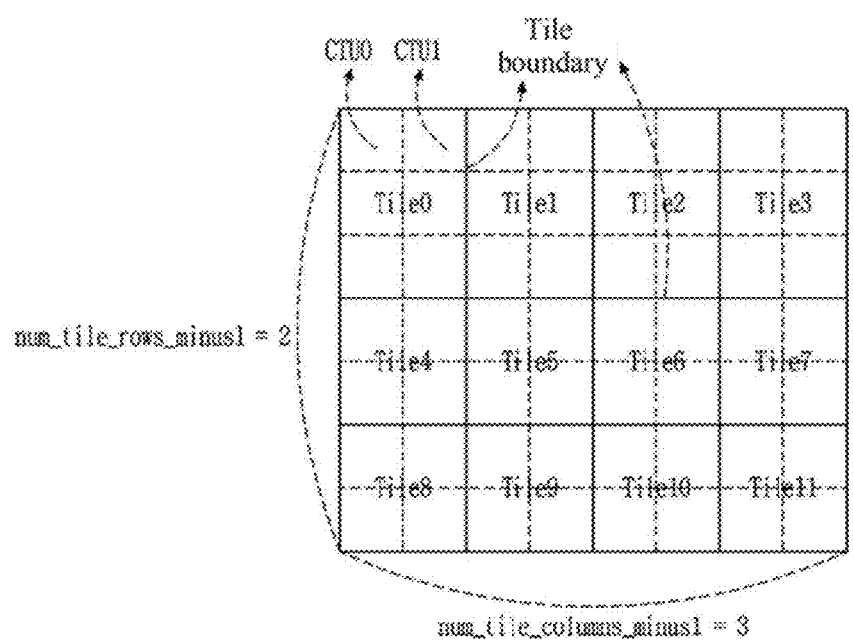
FIG. 32 is a view showing an example of partitioning a picture into a plurality of tiles.

FIG. 32 is a view showing an example of partitioning a picture into a plurality of tiles.

A tile includes at least one coding tree unit, and the boundary of a tile overlaps with the boundary of the coding tree unit.

As shown in the example of FIG. 32, a picture may be partitioned into a plurality of tile sets. Information for partitioning a picture into a plurality of tile sets may be signaled through a bitstream.

According to the partitioning type of a picture, tiles may have the same size in all regions except the picture boundaries.

Alternatively, a picture may be partitioned so that the tiles adjacent in the horizontal direction may have the same height, or the picture may be partitioned so that the tiles adjacent in the vertical direction may have the same width.

As a picture is partitioned using at least one among a vertical line and a horizontal line crossing the picture, each of the tiles belongs to a different column and/or row. In the embodiment described below, a column to which a tile belongs is referred to as a tile column, and a row to which a tile belongs is referred to as a tile row.

Information for determining a shape of partitioning a picture into tiles may be signaled through a bitstream. The information may be encoded and signaled through a picture parameter set or a sequence parameter set. The information is for determining the number of tiles in a picture, and may include information indicating the number of tile rows and information indicating the number of tile columns. For example, syntax element num_tile_columns_minus1 indicates a value obtained by subtracting 1 from the number of tile columns, and syntax element num_tile_rows_minus1 indicates a value obtained by subtracting 1 from the number of tile rows.

In the example shown in FIG. 32, since the number of tile columns is 4 and the number of tile rows is 3, num_tile_columns_minus1 may be 3, and num_tile_rows_minus1 may be 2.

When a picture is partitioned into a plurality of tiles, information indicating the size of a tile may be signaled through a bitstream. For example, when a picture is partitioned into a plurality of tile columns, information indicating the width of each tile column is signaled through a bitstream, and when the picture is partitioned into a plurality of tile rows, information indicating the height of each tile row is signaled through a bitstream. For example, syntax element column_width_minus1 indicating the width of the tile column may be encoded and signaled for each tile column, and syntax element row_height_minus1 indicating the height of the tile row may be encoded and signaled for each tile row.

Column_width_minus1 may indicate a value obtained by subtracting 1 from the width of a tile column, and row_height_minus1 may indicate a value obtained by subtracting 1 from the height of a tile row.

Encoding of column_width_minus1 may be omitted for the last tile column, and encoding of row_height_minus1 may be omitted for the last tile row. The width of the last tile column and the height of the last row may be derived considering a picture size.

The decoder may determine a tile size based on column_width_minus1 and row_height_minus1.

TABLE 9

```
...
if (tile_enabled_flag) {
  num_tile_columns_minus1                         ue(v)
  num_tile_rows_minus1                            ue(v)
  uniform_spacing_flag                            u(1)
  if (!uniform_spacing_flag) {
    for (i = 0; i < num_tile_columns_minus1: i++)
      column_width_minus1[i]                      ue(v)
    for (i = 0; i < num_tile_rows_minus1: i++)
      row_height_minus1[i]                        ue(v)
  }
  loop_filter_across_tiles_enabled_flag           u(1)
}
...
```

Table 9 shows a syntax table for partitioning a picture into tiles.

Referring to Table 9, syntax element num_tile_columns_minus1 indicating the number of tile columns and syntax element num_tile_rows_minus1 indicating the number of tile rows may be signaled.

Next, syntax element uniform_spacing_flag indicating whether a picture is partitioned into tiles of equal size may be signaled. When the uniform_spacing_flag is true, tiles in the remaining area excluding the picture boundaries may be partitioned in equal size.

When the uniform_spacing_flag is false, syntax element column_width_minus1 indicating the width of each tile column and syntax element row_height_minus1 indicating the height of each tile row may be signaled.

Syntax element loop_filter_across_tiles_enabled_flag indicates whether it is allowed to use a loop filter at the tile boundaries.

A tile column having the smallest width among the tile columns may be referred to as a minimum width tile, and a tile row having the smallest height among the tile rows may be referred to as a minimum height tile. Information indicating the width of the minimum width tile and information indicating the height of the minimum height tile may be signaled through a bitstream. For example, syntax element min_column_width_minus1 indicates a value obtained by subtracting 1 from the width of the minimum width tile, and syntax element min_row_height_minus1 indicates a value obtained by subtracting 1 from the height of the minimum height tile.

Information indicating a value of difference with the minimum tile width may be signaled for each tile column. For example, syntax element diff_column_width indicates a value of difference in width between the current tile column and the minimum tile column. The value of difference in width may be expressed as a value of difference in the number of coding tree unit columns. The decoder may derive the width of the current tile by adding the width of the minimum width tile derived based on m column_width_minus1 and the value of difference in width derived based on the diff_column_width.

In addition, information indicating a value of difference with the minimum tile height may be signaled for each tile row. For example, syntax element diff_row_height indicates a value of difference in height between the current tile row and the minimum tile row. The value of difference in height may be expressed as a value of difference in the number of coding tree unit rows. The decoder may derive the height of the current tile by adding the height of the minimum height tile derived based on minow:height_minus1 and the value of difference in height derived based on the diff_row_height.

Table 10 shows a syntax table including information on difference in size.

TABLE 10

```
...
if (tile_enabled_flag) {
   num_tile_columns_minus1                              ue(v)
   num_tile_rows_minus1                                 ue(v)
   uniform_spacing_flag                                 u(1)
   if (!uniform_spacing_flag) {
   min_column_width_minus1
   min_row_height_minus1
      for (i = 0; i < num_tile_columns_minus1: i++)
         diff_column_width[i]                           ue(v)
      for (i = 0; i < num_tile_rows_minus1: i++)
         diff_row_height[i]                             ue(v)
   }
   loop_filter_across_tiles_enabled_flag                u(1)
}
...
```

A picture may be partitioned so that the horizontally adjacent tiles may have different heights, or a picture may be partitioned so that the vertically adjacent tiles may have different widths. The method of partitioning a picture like this may be referred to as a flexible tile partitioning method, and tiles partitioned through the flexible tile partitioning method may be referred to as flexible tiles.

Figure 33:
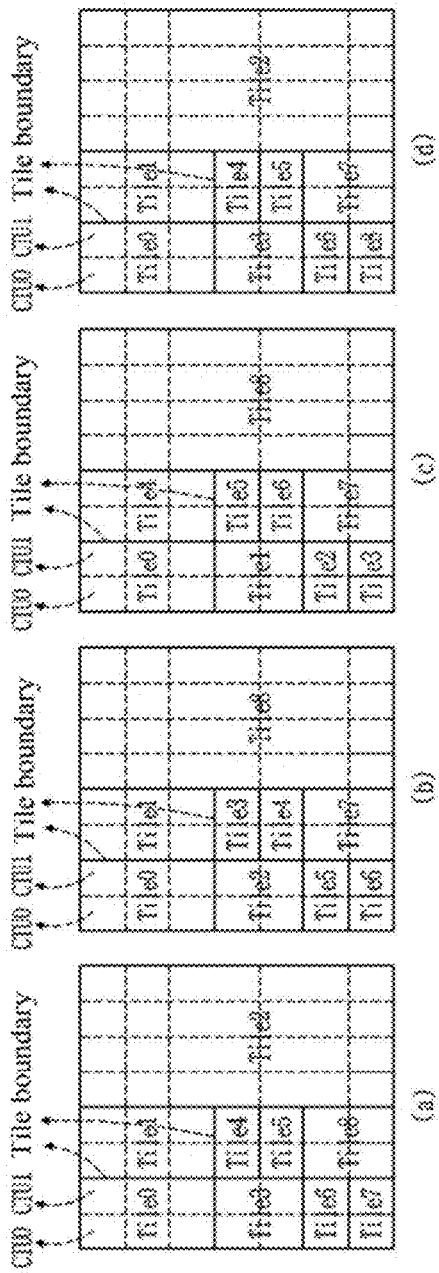
FIG. 33 is a view showing a partitioning pattern of a picture according to a flexible tile technique.

FIG. 33 is a view showing a partitioning pattern of a picture according to a flexible tile technique.

The order of searching the tiles generated by partitioning a picture may follow a predetermined scan order. In addition, an index may be assigned to each of the tiles according to a predetermined scan order.

The scan order of tiles may be any one among a raster scan, a diagonal scan, a vertical direction scan, and a horizontal direction scan. FIGS. 33(a) to 33(d) respectively show examples of assigning an index to each of the tiles according to a raster scan, a diagonal scan, a vertical direction scan, and a horizontal direction scan.

A next scan order may be determined according to the size or the position of the current tile. For example, when the height of the current tile and the height of a tile adjacent to the right side of the current tile are different (e.g., when the height of the right neighboring tile is greater than the height of the current tile), a tile positioned at the leftmost side among the tiles placed on a vertical line the same as that of a tile adjacent to the bottom of the current tile may be determined as a target of scan after the current tile.

The scan order of tiles may be determined by the unit of picture or sequence.

Alternatively, the scan order of tiles may be determined considering the size of the first tile in the picture. For example, when the width of the first tile is greater than the height, the scan order of tiles may be set to horizontal scan. When the height of the first tile is larger than the width, the scan order of tiles may be set to vertical scan. When the width of the first tile is the same as the height, the scan order of tiles may be set to raster scan or diagonal scan.

Information indicating the total number of tiles may be signaled through a bitstream. For example, when a flexible tile technique is applied, syntax element number_of_tiles_in_picture_minus2 derived by subtracting 2 from the total number of tiles in a picture may be signaled. The decoder may recognize the number of tiles included in the current picture based on the number_of_tiles_in_picture_minus2.

Table 11 shows a syntax table including information on the number of tiles.

TABLE 11

| | Descriptor |
|---|---|
| pic_parameter_set_rbsp( ) { | |
| ... | |
|    tiles_enabled_flag | u(1) |
|    ... | |
|    if (tiles_enabled_flag) { | |
|       number_of_tiles_in_picture_minus2 | ue(v) |
|       subtile_width_minus1 | ue(v) |
|       subtile_height_minus1 | ue(v) |
|       for (i = 0; i < number_of_tiles_ in_picture_minus2 + 2; i++) { | |
|          if (i > 0) | |
|             use_previous_tile_size_flag | u(1) |
|          if (use_previous_tile_size_flag == 0) { | |
|             tile_width_minus1[ i ] | ue(v) |
|             tile_height_minus1[ i ] | ue(v) |
|          } | |
|       } | |
|       loop_filter_across_tiles_enabled_flag | u(1) |
|    } | |
| ... | |

In order to reduce the number of bits needed to encode the size of a tile, information indicating the size of a sub-tile may be encoded and signaled. The sub-tile is a basic unit constituting a tile, and each tile may be configured to include at least one sub-tile. The sub-tile may include one or more coding tree units.

For example, syntax element subtile_width_minus1 indicates a value obtained by subtracting 1 from the width of a sub-tile. Syntax element subtile_height_minus1 indicates a value obtained by subtracting 1 from the height of a sub-tile.

Information indicating whether the remaining tiles other than the first tile have a size the same as that of a previous tile may be encoded and signaled. For example, syntax element use_previous_tile_size_flag indicates whether the size of the current tile is the same as the size of a previous tile. When use_previous_tile_size_flag is true, it indicates that the size of the current tile is the same as the size of a previous tile. When use_previous_tile_size_flag is false, information indicating the size of the current tile may be encoded and signaled. For the first tile, encoding of use_previous_tile_size_flag may be omitted, and a value of the flag may be set to false.

Information indicating the tile size may include syntax element tile_width_minus1[i] indicating the width of the i-th tile and syntax element tile_height_minus1[i] indicating the height of the i-th tile.

Information indicating the tile size may indicate a value of difference with the size of a sub-tile. As the size information of a sub-tile is used, efficiency of encoding/decoding may be enhanced by reducing the number of bits needed for encoding the size of each tile. For example, the width of the i-th tile tileWidth may be derived based on Equation 22 shown below, and the height of the i-th tile tileHeight may be derived based on Equation 23 shown below.

$$\text{tileWidth} = (\text{subtile\_width\_minus1} + 1) * (\text{tile\_width\_minus1}[i] + 1) \qquad \text{[Equation 22]}$$

$$\text{tileHeight} = (\text{subtile\_height\_minus1} + 1) * (\text{tile\_height\_minus1}[i] + 1) \qquad \text{[Equation 23]}$$

Alternatively, encoding of sub-tile size information may be omitted, and the size of the i-th tile may be encoded as it is as tile size information. The sub-tile size information may be optionally encoded. Information indicating whether or not the sub-tile size information is encoded may be signaled through a video parameter set, a sequence parameter set, or a picture parameter set.

Information related to the tile size described above may be encoded and signaled as indicating the number of coding tree units. For example, column_width_minus1, min_column_width_minus1, subtile_width_minus1, or tile_width_minus1 may indicate the number of coding tree unit columns included in a tile. In addition, diff_column_width may indicate a value of difference between the number of coding tree unit columns included in the minimum width tile and the number of coding tree unit columns included in the current tile.

In addition, row_height_minus1, min_row_height_minus1, subtile_height_minus1, or tile_height_minus1 may indicate the number of coding tree unit rows included in a tile. In addition, diff_row_height may indicate a value of difference between the number of coding tree unit rows included in the minimum height tile and the number of coding tree unit rows included in the current tile.

The decoder may determine the size of a tile based on the number of coding tree unit columns and/or the number of coding tree unit rows derived based on the syntax elements and the size of the coding tree unit. For example, the width of the i-th tile may be set to (tile_width_minus1[i]+1)* (width of coding tree unit), and the height of the i-th tile may be set to (tile_height_minus1[i]+1)*(height of coding tree unit).

Meanwhile, information indicating the size of the coding tree unit may be signaled through a sequence parameter set or a picture parameter set.

In Table 11, it is described that syntax element use_previous_tile_size_flag indicating whether the size of the current tile is the same as the size of a previous tile is used. As another example, information indicating whether the width of the current tile is the same as the width of a previous tile or information indicating whether the height of the current tile is the same as the height of a previous tile may be encoded and signaled.

Table 12 shows a syntax table including information indicating whether the width of the current tile is the same as the width of a previous tile.

TABLE 12

| | Descriptor |
|---|---|
| pic_parameter_set_rbsp( ) { | |
| ... | |
| tiles_enabled_flag | u(1) |
| ... | |
|   CoveredWidthByTile = 0; | |
|   CoveredHeightByTile = 0; | |
|   PrevWidthByTile = 0; | |
|   PrevHeightByTile = 0; | |
|   if (tiles_enabled_flag) { | |
|     number_of_tiles_in_picture_minus2 | ue(v) |
|     for (i = 0; i < number_of_tiles_ in_picture_minus2 + 2; i++) { | |
|       if (i > 0) | |
|       use_previous_tile_size_flag | u(1) |
|       if (use_previous_tile_size_flag == 0) { | |
|         use_previous_tile_width _flag | ue(v) |
|         if (use_previous_tile_width_flag == 0) { | ue(v) |
|           tile_width_minus1[ i ] | ue(v) |
|           tile_height_minus1[ i ] | ue(v) |
| } else { | |
|         tile_height_minus1[i] | ue(v) |
|       } | |
|     } | |
|     loop_filter_across_tiles_enabled_flag | u(1) |
|   } | |
| ... | |

Syntax element use_previous_tile_width_flag indicates whether the width of the current tile is the same as the width of a previous tile. When the use_previous_tile_width_flag is true, the width of the current tile may be set to be the same as the width of a previous tile. In this case, encoding of the information indicating the width of the current tile may be omitted, and the width of the current tile may be derived from the width of a previous tile.

When the use_previous_tile_width_flag is false, information indicating the width of the current tile may be signaled. For example, tile_width_minus1[i] may indicate a value obtained by subtracting 1 from the width of the i-th tile.

Syntax element use_previous_tile_width_flag may be encoded and signaled only when it is determined that the size of the current tile is different from the size of a previous tile (e.g., when the value of use_previous_tile_size_flag is 0).

Tile_width_minus1[i] may have a value obtained by subtracting 1 from the number of coding tree unit columns included in the i-th tile. The decoder may derive the number of coding tree unit columns belonging to the i-th tile by adding 1 to tile_width_minus1[i], and calculate the tile width by multiplying the derived value by the width of the coding tree unit.

Table 13 shows a syntax table further including information indicating whether the height of the current tile is the same as the height of a previous tile.

TABLE 13

| | Descriptor |
|---|---|
| pic_parameter_set_rbsp( ) { | |
| ... | |
| tiles_enabled_flag | u(1) |
| ... | |
| CoveredWidthByTile = 0; | |
| CoveredHeightByTile = 0; | |
| PrevWidthByTile = 0; | |
| PrevHeightByTile = 0; | |
| if(tiles_enabled_flag) { | |
|   number_of_tiles_in_picture_minus2 | ue(v) |
|   for (i = 0; i < number_of_tiles_ in_picture_minus2 + 2; i++) { | |
|     if (i > 0) | |
|       use_previous_tile_size_flag | u(1) |
|     if (use_previous_tile_size_flag == 0) { | |
|       use_previous_tile_width _flag | ue(v) |
|       if (use_previous_tile_width_flag == 0) { | ue(v) |
|         tile_width_minus1[i] | ue(v) |
|           tile_width_minus1[i] += 1; | |
|       use_previous_tile_height_flag | |
|       if (use_previous_tile_height_flag == 0){ | |
|         tile_height_minus1[i] | ue(v) |
|           tile_height_minus1[i] += 1; | |
|       } | |
|     } else { | |
|       use_previous_tile_height _flag | |
|       if (use_previous_tile_height_flag == 0){ | |
|         tile_height_minus1[i] | ue(v) |
|         tile_height +=1; | |
|       } | |
|     } | |
|     loop_filter_across_tiles_enabled_flag | u(1) |
|   } | |
| ... | |

Syntax element use_previous_tile_height_flag indicates whether the height of the current tile is the same as the height of a previous tile. When the use_previous_tile_height_flag is true, the height of the current tile may be set to be the same as the height of a previous tile. In this case, encoding of information indicating the height of the current tile may be omitted, and the height of the current tile may be derived from the height of a previous tile.

When the use_previous_tile_height_flag is false, information indicating the height of the current tile may be signaled. For example, tile_height_minus1[i] may indicate a value obtained by subtracting 1 from the height of the i-th tile.

Syntax element use_previous_tile_height_flag may be encoded and signaled only when it is determined that the size of the current tile is different from the size of a previous tile (e.g., when the value of use_previous_tile_size_flag is 0). In addition, syntax element use_previous_tile_height_flag may be signaled only when use_previous_tile_width_flag is false.

Table 12 shows an example of a case of using use_previous_tile_width_flag, and Table 13 shows an example of a case using use_previous_tile_width_flag and use_previous_tile_height_flag. Although not shown in the above tables, encoding of use_previous_tile_width_flag may be omitted, and only use_previous_tile_height_flag may be used.

Which one among the use_previous_tile_height_flag and the use_previous_tile_size_flag will be used may be determined based on at least one among a tile scan order, the width and the height of the first tile, and the width and the height of a previous tile. For example, when the tile scan order is vertical direction, the use_previous_tile_height_flag may be used, whereas when the tile scan order is horizontal direction, the use_previous_tile_width_flag may be used. Alternatively, when the first tile or a previous tile is a non-square shape of which the width is greater than the height, the use_previous_tile_width_flag may be used, whereas when the first tile or a previous tile is a non-square shape of which the height greater than the width, the use_previous_tile_height_flag may be used.

While signaling the number of tiles included in a picture, encoding of information related to the tile size may be omitted for the last tile.

Table 14 shows an example in which encoding of tile size information is omitted for the last tile.

TABLE 14

| | Descriptor |
|---|---|
| pic_parameter_set_rbsp( ) { | |
| ... | |
|   tiles_enabled_flag | u(1) |
| ... | |
|   if (tiles_enabled_flag) { | |
|     number_of_tiles_in_picture_minus2 | ue(v) |
|     subtile_width_minus1 | ue(v) |
|     subtile_height_minus1 | ue(v) |
|     for (i = 0; i < number_of_tiles_in_picture_minus2 + 1; i++) { | |
|       if (i > 0) | |
|         use_previous_tile_size_flag | u(1) |
|       if (use_previous_tile_size_flag == 0) { | |
|         tile_width_minus1[i] | ue(v) |
|         tile_height_minus1[i] | ue(v) |
|       } | |
|     } | |
|     loop_filter_across_tiles_enabled_flag | u(1) |
| } | |
| ... | |

When the size of tiles other than the last tile is specified, the remaining region in the picture may be set as the last tile.

For each coding tree unit, an identifier for identifying a tile to which the coding tree unit belongs may be assigned (hereinafter, referred to as a tile ID TileID).

Figure 34:
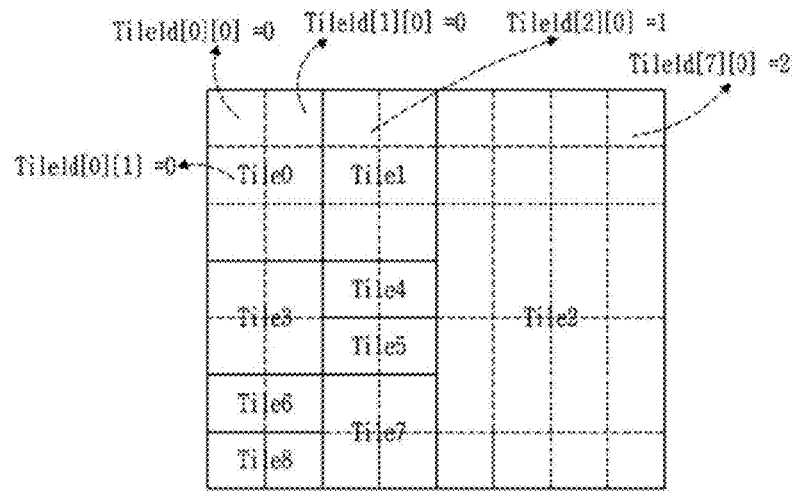
FIG. 34 is a view showing an example of assigning a tile ID to each coding tree unit.

FIG. 34 is a view showing an example of assigning a tile ID to each coding tree unit.

The same tile ID may be assigned to coding tree units belonging to the same tile. Specifically, N-th TileID may be assigned to coding tree units belonging to Tile N.

Variables x and y indicating the position of a coding tree unit in a picture may be determined to determine a tile ID assigned to each coding tree unit. Here, x denotes a value obtained by dividing the x-axis coordinate among the position (x0, y0) of the top-left sample of the coding tree unit by the width of the coding tree unit, and y denotes a value obtained by dividing the y-axis coordinate among the position (x0, y0) of the top-left sample of the coding tree unit by the height of the coding tree unit. Specifically, x and y may be derived by Equations 24 and 25 shown below.

$$x = (x0/(\text{CTU width})) \qquad [\text{Equation 24}]$$

$$y = (y0/(\text{CTU height})) \qquad [\text{Equation 25}]$$

Assigning a tile ID to each coding tree unit may be performed through the process described below.

i) Initialize Tile ID

The tile ID of each coding tree unit may be initialized to a value obtained by subtracting 1 from the number of tiles in a picture.

TABLE 15

If tiles_enabled_flag is equal to 1, the value of
the variable tile_id and the value of the two-
dimensional array TileId are specified as follows:
tile_id = 0
for (y = 0; y < PicHeightInCtbsY; y++)
- for (x = 0; x < PicWidthInCtbsY; x++)
-- TileId[x][y] = number_of_tiles_in_picture_minus2 + 1
tile_height_minus1[number_of_tiles_in_picture_minus2 + 1] = 0
tile_width_minus1[number_of_tiles_in_picture_minus2 + 1] = 0 ii) Derive Tile ID

TABLE 16

The value of the variable tile_id and the value of
the two-dimensional array CTU_tile assignment
are derived as follows:
for(ctu_y = 0; ctu_y < (tile_height_minus1[i] + 1)*
(subtile_height_minus1 + 1) &&
(tile_coordinate_y + ctu_y) < PicHeightInCtbsY; ctu_y++)
- for(ctu_x = 0; ctu_x < (tile_width_minus1[i] + 1)*
(subtile_width_minus1 + 1) &&
(tile_coordinate_x + ctu_x) < PicWidthInCtbsY; ctu_x++)
-- TileId[tile_coordinate_x + ctu_x]
[tile_coordinate_y + ctu_y] = tile_id
tile_id++

In the embodiment described above, it has been described that a flag indicating whether it is allowed to apply an in-loop filter at the boundaries of tiles is signaled through a picture parameter set. However, when it is set not to use an in-loop filter at all tile boundaries, there may occur a problem of lowering the subjective image quality and decreasing the coding efficiency.

Therefore, information indicating whether or not to allow an in-loop filter for each tile may be encoded and signaled.

Figure 35:
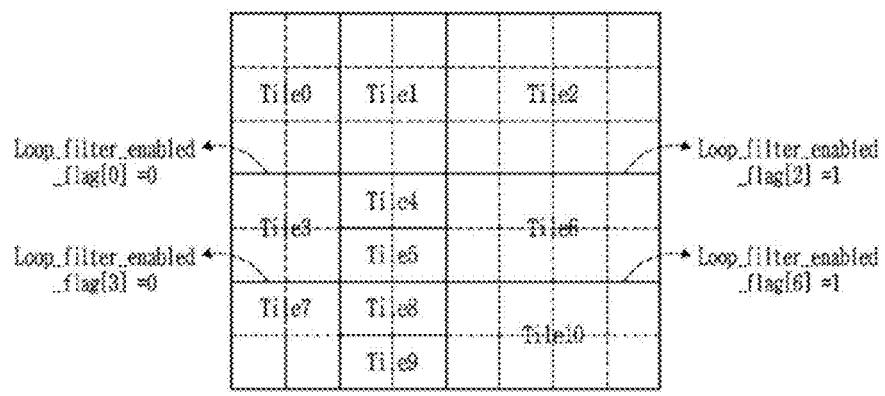
FIG. 35 is a view showing an example of selectively determining whether or not to apply an in-loop filter to each tile.

FIG. 35 is a view showing an example of selectively determining whether or not to apply an in-loop filter to each tile.

As shown in the example of FIG. 35, whether or not to allow an in-loop filter (e.g., a deblocking filter, SAO and/or ALF) at the horizontal or vertical boundary may be determined for each tile.

Table 17 shows an example in which information indicating whether or not to allow an in-loop filter is encoded for each tile.

TABLE 17

| | Descriptor |
|---|---|
| pic_parameter_set_rbsp( ) { | |
| ... | |
| tiles_enabled_flag | u(1) |
| ... | |
| if (tiles_enabled_flag) { | |
| number_of_tiles_in_picture_minus2 | ue(v) |
| subtile_width_minus1 | ue(v) |
| subtile_height_minus1 | ue(v) |
| for (i = 0; i < number_of_tiles_ | |
| in_picture_minus2 + 1; i++) { | |
| if (i > 0) | |
| use_previous_tile_size_flag | u(1) |
| if (use_previous_tile_size_flag == 0) { | |
| tile_width_minus1[ i ] | ue(v) |
| tile_height_minus1[i] | ue(v) |
| } | |
| loop_filter_across_tiles_flag[i] | u(1) |
| } | |
| } | |
| ... | |

In the example of Table 17, syntax element loop_filter_across_tiles_flag[i] indicates whether it is allowed to apply an in-loop filter to the i-th tile. When the value of loop_filter_cross_tiles_flag[i] is 1, it indicates that an in-loop filter may be used at the horizontal and vertical boundaries of a tile of which the tile ID is i. When the value of loop_filter_cross_tiles_flag[i] is 0, it indicates that an in-loop filter may not be used at the horizontal and vertical boundaries of a tile of which the tile ID is i.

Information indicating whether or not to allow an in-loop filter for each of the horizontal and vertical directions may be encoded.

Table 18 shows an example in which information indicating whether or not to allow an in-loop filter is individually encoded for the horizontal direction and the vertical direction.

TABLE 18

| | Descriptor |
|---|---|
| pic_parameter_set_rbsp( ) { | |
| ... | |
| tiles_enabled_flag | u(1) |
| .. | |
| if (tiles_enabled_flag) { | |
| number_of_tiles_in_picture_minus2 | ue(v) |
| subtile_width_minus1 | ue(v) |
| subtile_height_minus1 | ue(v) |
| for (i = 0; i < number_of_tiles_ | |
| in_picture_minus2 + 1; i++) { | |
| if (i > 0) | |
| use_previous_tile_size_flag | u(1) |
| if (use_previous_tile_size_flag == 0) { | |
| tile_width_minus1[ i ] | ue(v) |
| tile_height_minus1[ i ] | ue(v) |
| } | |
| loop_filter_hor_across_tiles_flag[i] | u(1) |
| loop_filter_ver_across_tiles_flag[i] | u(1) |
| } | |
| } | |
| ... | |

In the example of Table 18, syntax element loop_filter_hor_across_tiles_flag[i] indicates whether it is allowed to apply an in-loop filter crossing the i-th tile in the horizontal direction. Syntax element loop_filter_ver_across_tiles_flag[i] indicates whether it is allowed to apply an in-loop filter crossing the i-th tile in the vertical direction.

When the value of the loop_filter_hor_across_tiles_flag[i] is 1, it indicates that an in-loop filter may be used at the horizontal boundary of a tile of which the tile ID is i. When the value of the loop_filter_hor_across_tiles_fag[i] is 0, it indicates that an in-loop filter may not be used at the horizontal boundary of a tile of which the tile ID is i.

When the value of the loop_filter_ver_across_tiles_fag[i] is 1, it indicates that an in-loop filter may be used at the vertical boundary of a tile of which the tile ID is i, and when the value of the loop_filter_ver_across_tiles_flag[i] is 0, it indicates that an in-loop filter may not be used at the vertical boundary of a tile of which the tile ID is i.

Alternatively, information indicating whether an in-loop filter is allowed for a tile group including a plurality of tiles may be encoded and signaled. Whether or not to allow an in-loop filter for a plurality of tiles included in a tile group may be determined by the information.

In order to determine a tile group, at least one among the number of tiles belonging to the tile group, the size of the tile group, and partitioning information of a picture may be signaled through a bitstream. Alternatively, a region of a size predefined in the encoder and the decoder may be set as a tile group.

Encoding of information indicating whether an in-loop filter is allowed may be omitted, and whether or not to allow an in-loop filter may be determined based on at least one among the number of coding tree units included in a tile, the width of the tile, and the height of the tile. For example, when the tile width is smaller than a reference value, an in-loop filter for the horizontal direction may be allowed, and when a tile height is smaller than a reference value, an in-loop filter for the vertical direction may be allowed.

When an in-loop filter is used at a tile boundary, reconstructed data outside the tile may be generated based on the data included in the tile. At this point, a reconstructed video outside the tile may be acquired by padding or interpolating the data included in the tile. Thereafter, an in-loop filter may be applied using the reconstructed data outside the tile.

In an embodiment of the disclosure, a method of decoding and encoding a video signal includes the steps of: generating a merge candidate list for a current block; specifying one among a plurality of merge candidates included in the merge candidate list; deriving a first affine seed vector and a second affine seed vector of the current block based on a first affine seed vector and a second affine seed vector of the specified merge candidate; deriving an affine vector for a subblock in the current block by using the first affine seed vector and the second affine seed vector of the current block; and performing a motion compensation prediction for the subblock based on the affine vector. At this point, the subblock is a region of a size smaller than that of the current block. In addition, the first affine seed vector and the second affine seed vector of the merge candidate may be derived based on motion information of a neighboring block adjacent to the current block.

Optionally, when the neighboring block is included in a coding tree unit different from a coding tree unit of the current block, the first affine seed vector and the second affine seed vector of the merge candidate may be derived based on motion vectors of a bottom-left subblock and a bottom-right subblock of the neighboring block.

Optionally, the bottom-left subblock may include a bottom-left reference sample positioned at a bottom-left corner of the neighboring block, and the bottom-right subblock may include a bottom-right reference sample located at a bottom-left corner of the neighboring block.

Optionally, the first affine seed vector and the second affine seed vector of the merge candidate may be derived based on a value obtained based on a shift operation performed on a value of difference between motion vectors of the bottom-left subblock and the bottom-right subblock using a scaling factor, and the scaling factor may be derived based on a value obtained by adding a horizontal distance between the bottom-left reference sample and the bottom-right reference sample and an offset.

Optionally, the first affine seed vector and the second affine seed vector of the merge candidate may be derived based on a value obtained based on a shift operation performed on a value of difference between motion vectors of the bottom-left subblock and the bottom-right subblock using a scaling factor, and the scaling factor may be derived based on a distance between a neighboring sample adjacent to a right side of the bottom-right reference sample and the bottom-left reference sample.

Optionally, the merge candidate list includes a first merge candidate derived based on a top neighboring block determined as a first available block among top neighboring blocks positioned on a top of the current block, and a second merge candidate derived based on a left neighboring block determined as a first available block among left neighboring blocks positioned on a left side of the current block.

Optionally, when the neighboring block is included in a coding tree unit the same as a coding tree unit of the current block, the first affine seed vector and the second affine seed vector of the merge candidate may be derived based on a first affine seed vector and a second affine seed vector of the neighboring block.

Applying the embodiments described above focusing on a decoding process or an encoding process to an encoding process or a decoding process is included in the scope of the present disclosure. Changing the embodiments described in a predetermined order in an order different from the described order is also included in the scope of the present disclosure.

Although the embodiments above have been described based on a series of steps or flowcharts, this does not limit the time series order of the present disclosure, and may be performed simultaneously or in a different order as needed. In addition, each of the components (e.g., units, modules, etc.) constituting the block diagram in the embodiments described above may be implemented as a hardware device or software, or a plurality of components may be combined to be implemented as a single hardware device or software. The embodiments described above may be implemented in the form of program commands that can be executed through various computer components and recorded in a computer-readable recording medium. The computer-readable recording medium may include program commands, data files, data structures and the like independently or in combination. The computer-readable recording medium includes, for example, magnetic media such as a hard disk, a floppy disk and a magnetic tape, optical recording media such as a CD-ROM and a DVD, magneto-optical media such as a floptical disk, and hardware devices specially configured to store and execute program commands, such as a ROM, a RAM, a flash memory and the like. The hardware devices described above can be configured to operate using one or more software modules to perform the process of the present disclosure, and vice versa.

The present disclosure can be applied to an electronic device that encodes and decodes a video.

What is claimed is:

1. A video decoding method, comprising:
   in response to that a top boundary of a current block is in contact with a top boundary of a coding tree unit of the current block, obtaining a first affine seed vector of a bottom-left corner control point of a top affine neighboring block of a current block and a second affine seed vector of a bottom-right corner control point of the top affine neighboring block;
   deriving a third affine seed vector of the current block and a fourth affine seed vector of the current block based on the first affine seed vector and the second affine seed vector of the top affine neighboring block;
   deriving an affine vector for a subblock in the current block by using the third affine seed vector of the current block and the fourth affine seed vector of the current block, wherein the subblock is a region of a size smaller than that of the current block; and
   performing a motion compensation prediction for the subblock based on the affine vector.

2. The method of claim 1, wherein a sample positioned on a right side of a bottom-right sample of a bottom-right subblock of the top affine neighboring block is set as a reference sample for the bottom-right corner control point, and the bottom-right subblock is set as an affine subblock for the bottom-right corner control point.

3. The method of claim 1, wherein a sample positioned on a left side of a bottom-left sample of a bottom-left subblock of the top affine neighboring block is set as a reference sample for the bottom-left corner control point, and the bottom-left subblock is set as an affine subblock for the bottom-left corner control point.

4. A video encoding method, comprising:
   in response to that a top boundary of a current block is in contact with a top boundary of a coding tree unit of the current block, obtaining a first affine seed vector of a bottom-left corner control point of a top affine neighboring block of a current block and a second affine seed vector of a bottom-right corner control point of the top affine neighboring block;
   deriving a third affine seed vector of the current block and a fourth affine seed vector of the current block based on the first affine seed vector and the second affine seed vector of the top affine neighboring block;
   deriving an affine vector for a subblock in the current block by using the third affine seed vector of the current block and the fourth affine seed vector of the current block, wherein the subblock is a region of a size smaller than that of the current block; and
   performing a motion compensation prediction for the subblock based on the affine vector.

5. The method of claim 4, wherein a sample positioned on a right side of a bottom-right sample of a bottom-right subblock of the top affine neighboring block is set as a reference sample for the bottom-right corner control point, and the bottom-right subblock is set as an affine subblock for the bottom-right corner control point.

6. The method of claim 4, wherein a sample positioned on a left side of a bottom-left sample of a bottom-left subblock of the top affine neighboring block is set as a reference sample for the bottom-left corner control point, and the bottom-left subblock is set as an affine subblock for the bottom-left corner control point.

7. A video decoder configured to perform following operations:
   in response to that a top boundary of a current block is in contact with a top boundary of a coding tree unit of the current block, obtaining a first affine seed vector of a bottom-left corner control point of a top affine neighboring block of a current block and a second affine seed vector of a bottom-right corner control point of the top affine neighboring block;

deriving a third affine seed vector of the current block and a fourth affine seed vector of the current block based on the first affine seed vector and the second affine seed vector of the top affine neighboring block;

deriving an affine vector for a subblock in the current block by using the third affine seed vector of the current block and the fourth affine seed vector of the current block, wherein the subblock is a region of a size smaller than that of the current block; and performing a motion compensation prediction for the subblock based on the affine vector.

8. The video decoder of claim 7, wherein a sample positioned on a right side of a bottom-right sample of a bottom-right subblock of the top affine neighboring block is set as a reference sample for the bottom-right corner control point, and the bottom-right subblock is set as an affine subblock for the bottom-right corner control point.

9. The video decoder of claim 7, wherein a sample positioned on a left side of a bottom-left sample of a bottom-left subblock of the top affine neighboring block is set as a reference sample for the bottom-left corner control point, and the bottom-left subblock is set as an affine subblock for the bottom-left corner control point.

* * * * *